US010392060B2

(12) United States Patent
Dandurand et al.

(10) Patent No.: US 10,392,060 B2
(45) Date of Patent: Aug. 27, 2019

(54) TRACK SYSTEM FOR TRACTION OF A VEHICLE

(71) Applicant: CAMSO INC., Magog (CA)

(72) Inventors: Jules Dandurand, Sherbrooke (CA); Pascal Labbe, Sherbrooke (CA); Jason Davis, Cadyville, NY (US); Daniel Lochnikar, Gunnison, CO (US)

(*) Notice: Subject to any disclaimer, the term of this patent is extended or adjusted under 35 U.S.C. 154(b) by 216 days.

(21) Appl. No.: 15/400,692

(22) Filed: Jan. 6, 2017

(65) Prior Publication Data

US 2017/0197677 A1 Jul. 13, 2017

Related U.S. Application Data

(60) Provisional application No. 62/275,944, filed on Jan. 7, 2016, provisional application No. 62/337,101, filed on May 16, 2016.

(51) Int. Cl.

*B62D 55/24* (2006.01)
*B62M 27/02* (2006.01)

(Continued)

(52) U.S. Cl.

CPC .......... *B62D 55/244* (2013.01); *B62D 55/07* (2013.01); *B62D 55/10* (2013.01); *B62D 55/104* (2013.01);

(Continued)

(58) Field of Classification Search

CPC ...... B60D 55/244; B60D 55/07; B60D 55/14; B60D 55/104; B60D 55/10; B60D 55/27; B62M 2027/027

(Continued)

(56) References Cited

U.S. PATENT DOCUMENTS

| | | | |
|---|---|---|---|
| 2,378,427 A | 6/1945 | Myers | |
| 3,582,154 A * | 6/1971 | Russ, Sr. | B60R 25/007 305/166 |

(Continued)

FOREIGN PATENT DOCUMENTS

| | | |
|---|---|---|
| JP | S55119572 A | 9/1980 |
| JP | S59118580 A | 7/1984 |

(Continued)

OTHER PUBLICATIONS

International Search Report and Written Opinion dated Jul. 2, 2014 in connection with PCT/CA2014/000262.

(Continued)

*Primary Examiner* — S. Joseph Morano
*Assistant Examiner* — Jean W Charleston

(57) ABSTRACT

A track system for traction of a vehicle (e.g., a snowmobile, an all-terrain vehicle (ATV) etc.). The track system comprises a track and a track-engaging assembly for driving and guiding the track around the track-engaging assembly. The track system may have various features to enhance its traction, floatation, and/or other aspects of its performance, including, for example, a lightweight design, enhanced tractive effects, an enhanced heat management capability, an enhanced resistance to lateral skidding (e.g., on a side hill), an adaptive capability to adapt itself to different conditions (e.g., ground conditions, such as different types of snow, soil, etc.; and/or other conditions), an adjustability of a contact area of its track with the ground, and/or other features.

45 Claims, 70 Drawing Sheets

(51) Int. Cl.

| | |
|---|---|
| ***B62D 55/07*** | (2006.01) |
| ***B62D 55/10*** | (2006.01) |
| ***B62D 55/104*** | (2006.01) |
| ***B62D 55/14*** | (2006.01) |
| ***B62D 55/27*** | (2006.01) |

(52) U.S. Cl.
CPC ............. *B62D 55/14* (2013.01); *B62D 55/27* (2013.01); *B62M 27/02* (2013.01); *B62M 2027/027* (2013.01)

(58) Field of Classification Search
USPC ....... 305/157, 158, 165, 178, 179, 180, 181, 305/182
See application file for complete search history.

(56) References Cited

U.S. PATENT DOCUMENTS

| | | | | |
|---|---|---|---|---|
| 3,858,948 | A | 1/1975 | Johnson et al. | |
| 5,709,440 | A | 1/1998 | Lecours | |
| 6,109,705 | A | 8/2000 | Courtemanche | |
| 6,973,988 | B2 * | 12/2005 | Morin .................... | B62M 27/00 180/182 |
| 7,063,396 | B2 | 6/2006 | Dandurand | |
| 7,377,601 | B2 | 5/2008 | Katoh et al. | |
| 7,618,102 | B2 | 11/2009 | Dandurand | |
| 7,784,884 | B2 | 8/2010 | Soucy et al. | |
| 8,708,432 | B2 | 4/2014 | Pard | |
| 8,967,737 | B2 | 3/2015 | Zuchoski et al. | |
| 2008/0007119 | A1 * | 1/2008 | Schindler ............. | B62D 55/244 305/185 |
| 2008/0174176 | A1 | 7/2008 | Berg | |
| 2009/0224598 | A1 | 9/2009 | St-Amant et al. | |
| 2011/0037313 | A1 | 2/2011 | Delisle et al. | |
| 2011/0316330 | A1 | 12/2011 | Doyle | |
| 2013/0134773 | A1 | 5/2013 | Dandurand et al. | |
| 2015/0091373 | A1 * | 4/2015 | Pard ..................... | B62D 55/253 305/179 |
| 2015/0217923 | A1 | 8/2015 | Zuchoski et al. | |
| 2015/0291234 | A1 * | 10/2015 | Zuchoski ............. | B62D 55/065 180/9.62 |

FOREIGN PATENT DOCUMENTS

| | | |
|---|---|---|
| JP | 3416327 B2 | 6/2003 |
| WO | WO2006112577 | 10/2006 |

OTHER PUBLICATIONS

International Search Report and Written Opinion dated Jun. 26, 2014 in connection with PCT/CA2014/000272.

* cited by examiner

TRACK SYSTEM FOR TRACTION OF A VEHICLE

CROSS-REFERENCE TO RELATED APPLICATION

This application claims priority from U.S. Provisional Patent Application 62/275,944 filed on Jan. 7, 2016 and incorporated by reference herein and from U.S. Provisional Patent Application 62/337,101 filed on May 5, 2016 and incorporated by reference herein.

FIELD

The invention relates generally to track systems for traction of vehicles such as snowmobiles, all-terrain vehicles (ATVs), and other off-road vehicles.

BACKGROUND

Certain vehicles may be equipped with track systems which enhance their traction and floatation on soft, slippery and/or irregular grounds (e.g., snow, ice, soil, mud, sand, etc.) on which they operate.

For example, snowmobiles allow efficient travel on snowy and in some cases icy grounds. A snowmobile comprises a track system which engages the ground to provide traction. The track system comprises a track-engaging assembly and a track that moves around the track-engaging assembly and engages the ground to generate traction. The track typically comprises an elastomeric body in which are embedded certain reinforcements, such as transversal stiffening rods providing transversal rigidity to the track, longitudinal cables providing tensional strength, and/or fabric layers. The track-engaging assembly comprises wheels and in some cases slide rails around which the track is driven.

A snowmobile, including its track system, may face a number of challenges while riding. For example, the snowmobile's track may perform very differently on different ground conditions. For instance, the track may perform properly on a given type of snow condition (e.g., deep powder snow) but may not perform as well on another type of snow (e.g., packed snow). This inconsistent performance of the track in different ground conditions can be inconvenient and/or make it difficult to travel efficiently over different types of terrain. Also, the snowmobile may have an undesirable tendency to skid sideways when travelling in a given direction on a slope terrain like a side hill or other inclined ground area. A weight of the track system may also affect the snowmobile's power consumption and/or ride. Excessive heat generated within the snowmobile's track may cause deterioration and/or failure of the track.

Similar considerations may arise for track systems of other types of off-road vehicles (e.g., all-terrain vehicles (ATVs), agricultural vehicles, or other vehicles that travel on uneven grounds) in certain situations.

For these and other reasons, there is a need to improve track systems for traction of vehicles.

SUMMARY

In accordance with various aspects of the invention, there is provided a track system for traction of a vehicle. The track system comprises a track and a track-engaging assembly for driving and guiding the track around the track-engaging assembly. The track system may have various features to enhance its traction, floatation, and/or other aspects of its performance, including, for example, a lightweight design, enhanced tractive effects, an enhanced heat management capability, an enhanced resistance to lateral skidding (e.g., on a side hill), an adaptive capability to adapt itself to different conditions (e.g., ground conditions, such as different types of snow, soil, etc.; and/or other conditions), an adjustability of a contact area of its track with the ground, and/or other features.

For example, in accordance with an aspect of the invention, there is provided a track for traction of a vehicle. The track is movable around a track-engaging assembly comprising a drive wheel to drive the track. The track comprises: a carcass comprising a ground-engaging outer surface for engaging the ground and an inner surface opposite to the ground-engaging outer surface; and a plurality of traction projections projecting from the ground-engaging outer surface. A thickness of the carcass from the ground-engaging outer surface to the inner surface is no more than 0.20 inches, and a ratio of a widthwise rigidity of the carcass over a longitudinal rigidity of the carcass is at least 1.5.

In accordance with another aspect of the invention, there is provided a track for traction of a vehicle. The track is movable around a track-engaging assembly comprising a drive wheel to drive the track. The track comprises: a carcass comprising a ground-engaging outer surface for engaging the ground and an inner surface opposite to the ground-engaging outer surface; and a plurality of traction projections projecting from the ground-engaging outer surface. The track comprises first elastomeric material and second elastomeric material less dense than the first elastomeric material.

In accordance with another aspect of the invention, there is provided a track for traction of a vehicle. The track is movable around a track-engaging assembly comprising a drive wheel to drive the track. The track comprises: a ground-engaging outer surface for engaging the ground and an inner surface opposite to the ground-engaging outer surface; a plurality of traction projections projecting from the ground-engaging outer surface; and a plurality of slide members for sliding against the track-engaging assembly. A spacing of longitudinally-adjacent ones of the slide members in a longitudinal direction of the track is at least one-fifth of a length of the track.

In accordance with another aspect of the invention, there is provided a track for traction of a vehicle. The track is movable around a track-engaging assembly comprising a drive wheel to drive the track. The track comprises a ground-engaging outer surface for engaging the ground and an inner surface opposite to the ground-engaging outer surface; and a plurality of traction projections projecting from the ground-engaging outer surface. Longitudinally-successive ones of the traction projections that succeed one another in a longitudinal direction of the track differ in height.

In accordance with another aspect of the invention, there is provided a track for traction of a vehicle. The track is movable around a track-engaging assembly comprising a drive wheel to drive the track. The track comprises a ground-engaging outer surface for engaging the ground and an inner surface opposite to the ground-engaging outer surface; and a plurality of traction projections projecting from the ground-engaging outer surface. Each traction projection comprises a recess defining a recessed area at a base of the traction projection.

In accordance with another aspect of the invention, there is provided a track for traction of a vehicle. The track is movable around a track-engaging assembly comprising a drive wheel to drive the track. The track comprises: a ground-engaging outer surface for engaging the ground and an inner surface opposite to the ground-engaging outer surface; a plurality of traction projections projecting from the ground-engaging outer surface; and a plurality of drive/guide projections projecting from the inner surface. A spacing of adjacent ones of traction projections in a longitudinal direction of the track is greater than a spacing of adjacent ones of the drive/guide projections in the longitudinal direction of the track.

In accordance with another aspect of the invention, there is provided a track for traction of a vehicle. The track is movable around a track-engaging assembly comprising a drive wheel to drive the track. The track comprises: a ground-engaging outer surface for engaging the ground and an inner surface opposite to the ground-engaging outer surface; a plurality of traction projections projecting from the ground-engaging outer surface; and a plurality of lateral stabilizers projecting from the ground-engaging outer surface to oppose a tendency of the track to skid transversely to a direction of motion of the vehicle.

In accordance with another aspect of the invention, there is provided a track for traction of a vehicle. The track is movable around a track-engaging assembly comprising a drive wheel to drive the track. The track comprises a ground-engaging outer surface for engaging the ground and an inner surface opposite to the ground-engaging outer surface; and a plurality of traction projections projecting from the ground-engaging outer surface. The track comprises uneven surfaces projecting from the ground-engaging outer surface and having a texture to oppose a tendency of the track to skid transversely to a direction of motion of the vehicle.

In accordance with another aspect of the invention, there is provided a track for traction of a vehicle. The track is movable around a track-engaging assembly comprising a drive wheel to drive the track. The track comprises: a ground-engaging outer surface for engaging the ground and an inner surface opposite to the ground-engaging outer surface; and a plurality of traction projections projecting from the ground-engaging outer surface. Each traction projection comprises a containment space to contain ground matter when the traction projection engages the ground.

In accordance with another aspect of the invention, there is provided a track for traction of a vehicle. The track is movable around a track-engaging assembly comprising a drive wheel to drive the track. The track comprises: a ground-engaging outer surface for engaging the ground and an inner surface opposite to the ground-engaging outer surface; and a plurality of traction projections projecting from the ground-engaging outer surface. Each traction projection comprises a containment space to contain ground matter when the traction projection engages the ground. The containment space of the traction projection comprises a plurality of containment voids to contain respective portions of the ground matter.

In accordance with another aspect of the invention, there is provided a track for traction of a vehicle. The track is movable around a track-engaging assembly comprising a drive wheel to drive the track. The track comprises: a ground-engaging outer surface for engaging the ground and an inner surface opposite to the ground-engaging outer surface; and a plurality of traction projections projecting from the ground-engaging outer surface. Each traction projection is configured to scoop and compact ground matter when the traction projection engages the ground.

In accordance with another aspect of the invention, there is provided a track for traction of a vehicle. The track is movable around a track-engaging assembly comprising a drive wheel to drive the track. The track comprises: a ground-engaging outer surface for engaging the ground and an inner surface opposite to the ground-engaging outer surface; and a plurality of traction projections projecting from the ground-engaging outer surface. A component of the track is adaptable in response to a stimulus such that a state of the component of the track is variable in different conditions.

In accordance with another aspect of the invention, there is provided a track for traction of a vehicle. The track is movable around a track-engaging assembly comprising a drive wheel to drive the track. The track comprises: a ground-engaging outer surface for engaging the ground and an inner surface opposite to the ground-engaging outer surface; and a plurality of traction projections projecting from the ground-engaging outer surface. Each traction projection is adaptable in response to a stimulus such that a state of the traction projection is variable in different conditions.

In accordance with another aspect of the invention, there is provided a track for traction of a vehicle. The track system comprises: a track comprising a ground-engaging outer surface for engaging the ground and an inner surface opposite to the ground-engaging outer surface; and a track-engaging assembly for driving and guiding the track around the track-engaging assembly. The track-engaging assembly comprises: a drive wheel configured to drive the track; and an adjustment mechanism configured to change a configuration of the track-engaging assembly in order to vary a size of a contact patch of the track with the ground.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
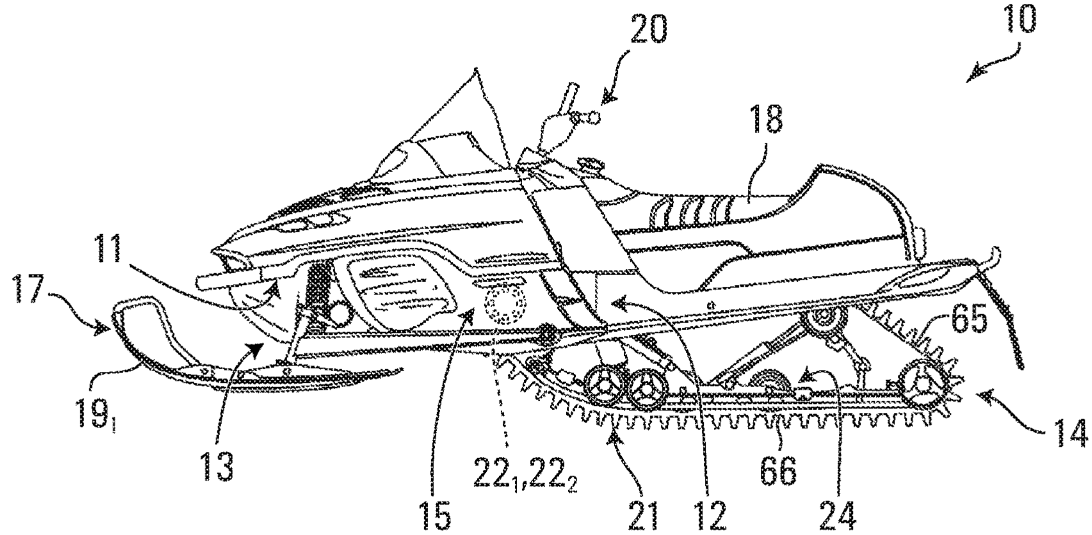
FIG. 1 shows an example of a snowmobile comprising a track system in accordance with an embodiment of the invention.

FIG. 1 shows an example of a tracked vehicle 10 in accordance with an embodiment of the invention. In this embodiment, the vehicle 10 is a snowmobile. The snowmobile 10 is designed for travelling on snow and in some cases ice. The snowmobile 10 comprises a frame 11, a powertrain 12, a track system 14, a ski system 17, a seat 18, and a user interface 20, which enables a user to ride, steer and otherwise control the snowmobile 10.

As further discussed below, in this embodiment, the track system 14 may have various features to enhance its traction, floatation, and/or other aspects of its performance, including, for example, a lightweight design, enhanced tractive effects, an enhanced heat management capability, an enhanced resistance to lateral skidding (e.g., on a side hill), an adaptive capability to adapt itself to different conditions (e.g., ground conditions, such as different types of snow, soil, etc.; and/or other conditions), an adjustability of its contact area with the ground, and/or other features.

The powertrain 12 is configured for generating motive power and transmitting motive power to the track system 14 to propel the snowmobile 10 on the ground. To that end, the powertrain 12 comprises a prime mover 15, which is a source of motive power that comprises one or more motors (e.g., an internal combustion engine, an electric motor, etc.). For example, in this embodiment, the prime mover 15 comprises an internal combustion engine. In other embodiments, the prime mover 15 may comprise another type of motor (e.g., an electric motor) or a combination of different types of motor (e.g., an internal combustion engine and an electric motor). The prime mover 15 is in a driving relationship with the track system 14. That is, the powertrain 12 transmits motive power from the prime mover 15 to the track system 14 in order to drive (i.e., impart motion to) the track system 14.

The ski system 17 is turnable to allow steering of the snowmobile 10. In this embodiment, the ski system 17 comprises a pair of skis 191, 192 connected to the frame 11 via a ski-supporting assembly 13.

The seat 18 accommodates the user of the snowmobile 10. In this case, the seat 18 is a straddle seat and the snowmobile 10 is usable by a single person such that the seat 18 accommodates only that person driving the snowmobile 10. In other cases, the seat 18 may be another type of seat, and/or the snowmobile 10 may be usable by two individuals, namely one person driving the snowmobile 10 and a passenger, such that the seat 18 may accommodate both of these individuals (e.g., behind one another) or the snowmobile 10 may comprise an additional seat for the passenger.

The user interface 20 allows the user to interact with the snowmobile 10 to control the snowmobile 10. More particularly, the user interface 20 comprises an accelerator, a brake control, and a steering device that are operated by the user to control motion of the snowmobile 10 on the ground. In this case, the steering device comprises handlebars, although it may comprise a steering wheel or other type of steering element in other cases. The user interface 20 also comprises an instrument panel (e.g., a dashboard) which provides indicators (e.g., a speedometer indicator, a tachometer indicator, etc.) to convey information to the user.

Figure 2:
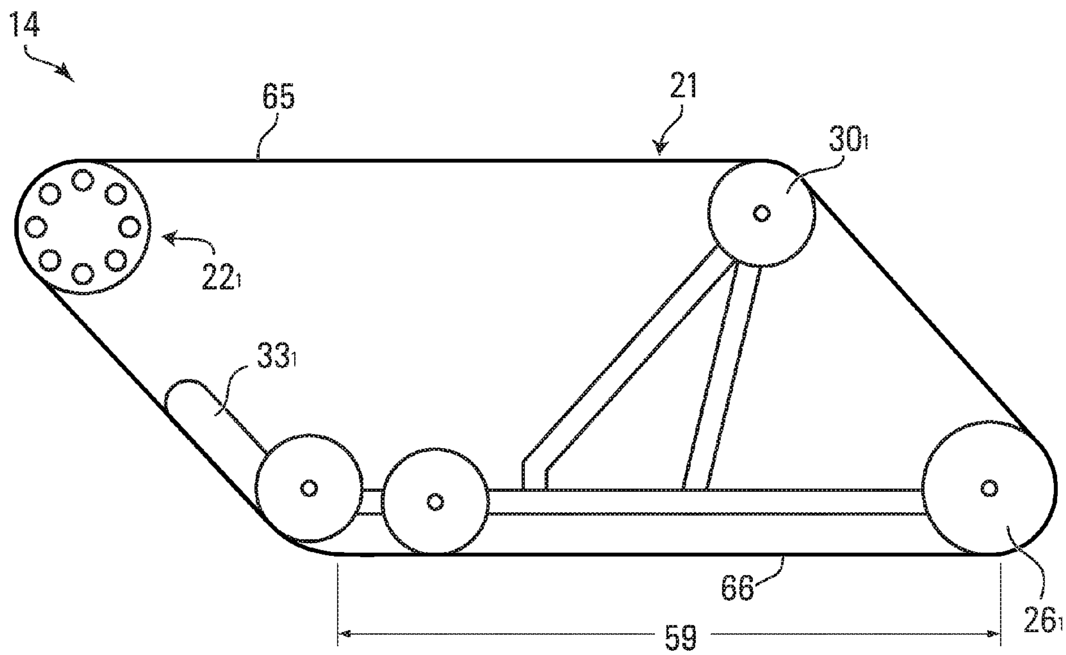
FIG. 2 shows a side view of the track system.
Figure 3:
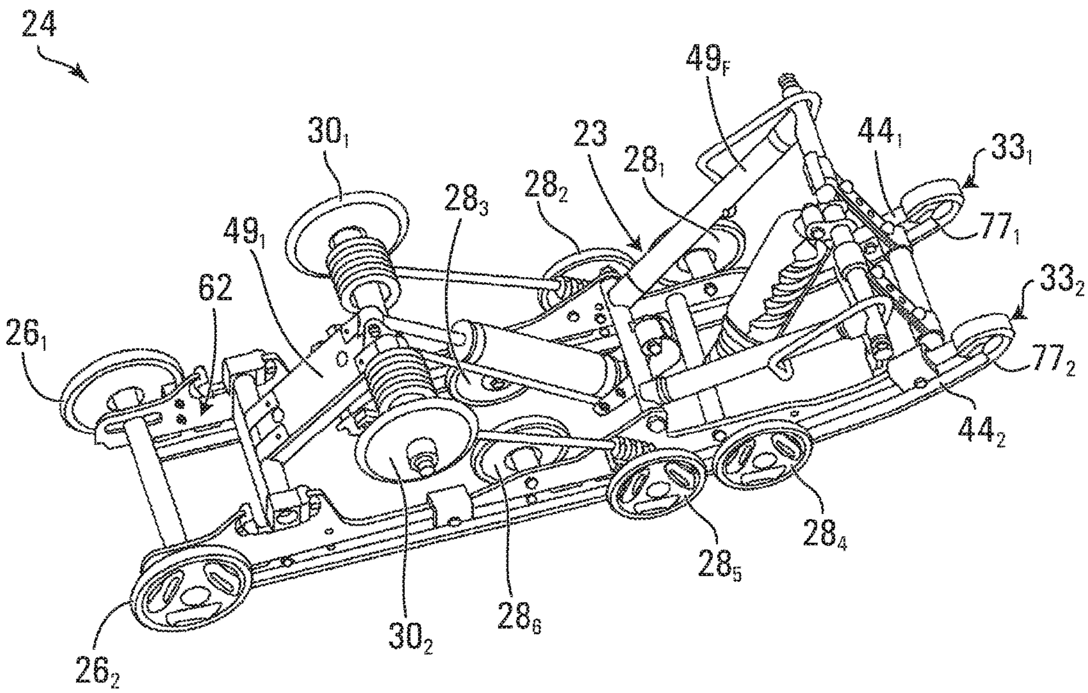
FIG. 3 shows a perspective view of a track-engaging assembly of the track system.
Figure 4:
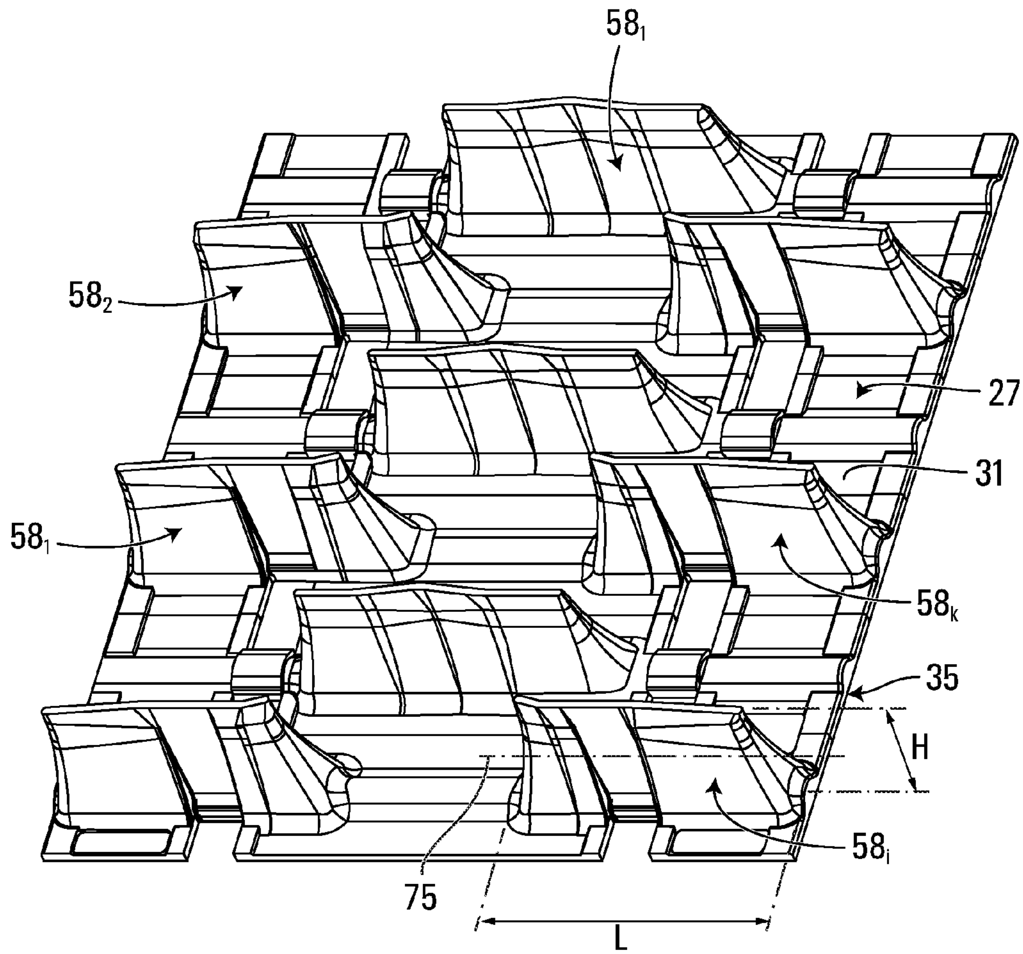
FIGS. 4 to 7 respectively show a perspective view, a plan view, an elevation view, and a longitudinal cross-sectional view of part of a track of the track system.

The track system 14 engages the ground to generate traction for the snowmobile 10. With additional reference to FIGS. 2 and 3, the track system 14 comprises a track 21 and a track-engaging assembly 24 for driving and guiding the track 21 around the track-engaging assembly 24. More particularly, in this embodiment, the track-engaging assembly 24 comprises a frame 23 and a plurality of track-contacting wheels which includes a plurality of drive wheels 22$_1$, 22$_2$ and a plurality of idler wheels that includes rear idler wheels 26$_1$, 26$_2$, lower roller wheels 28$_1$-28$_6$, and upper roller wheels 30$_1$, 30$_2$. As it is disposed between the track 21 and the frame 11 of the snowmobile 10, the track-engaging assembly 24 can be viewed as implementing a suspension for the snowmobile 10. The track system 14 has a longitudinal direction and a first longitudinal end and a second longitudinal end that define a length of the track system 14, a widthwise direction and a width that is defined by a width of the track 21, and a height direction that is normal to its longitudinal direction and its widthwise direction.

The track 21 engages the ground to provide traction to the snowmobile 10. A length of the track 21 allows the track 21 to be mounted around the track-engaging assembly 24. In view of its closed configuration without ends that allows it to be disposed and moved around the track-engaging assembly 24, the track 21 can be referred to as an “endless” track. With additional reference to FIGS. 4 to 7, the track 21 comprises an inner side 25 for facing the track-engaging assembly 24 and a ground-engaging outer side 27 for engaging the ground. A top run 65 of the track 21 extends between the longitudinal ends of the track system 14 and over the track-engaging assembly 24 (including over the wheels 22$_1$, 22$_2$, 26$_1$, 26$_2$, 28$_1$-28$_6$, 30$_1$, 30$_2$), and a bottom run 66 of the track 21 extends between the longitudinal ends of the track system 14 and under the track-engaging assembly 24 (including under the wheels 22$_1$, 22$_2$, 26$_1$, 26$_2$, $28_1$-$28_6$, $30_1$, $30_2$). The bottom run 66 of the track 11 defines an area of contact 59 of the track 21 with the ground which generates traction and bears a majority of a load on the track system 14, and which will be referred to as a "contact patch" of the track 21 with the ground. The track 21 has a longitudinal axis which defines a longitudinal direction of the track 21 (i.e., a direction generally parallel to its longitudinal axis) and transversal directions of the track (i.e., directions transverse to its longitudinal axis), including a widthwise direction of the track (i.e., a lateral direction generally perpendicular to its longitudinal axis). The track 21 has a thickness direction normal to its longitudinal and widthwise directions.

The track 21 is elastomeric, i.e., comprises elastomeric material, to be flexible around the track-engaging assembly 24. The elastomeric material of the track 21 can include any polymeric material with suitable elasticity. In this embodiment, the elastomeric material of the track 21 includes rubber. Various rubber compounds may be used and, in some cases, different rubber compounds may be present in different areas of the track 21. In other embodiments, the elastomeric material of the track 21 may include another elastomer in addition to or instead of rubber (e.g., polyurethane elastomer).

More particularly, the track 21 comprises an endless body 35 underlying its inner side 25 and ground-engaging outer side 27. In view of its underlying nature, the body 35 will be referred to as a "carcass". The carcass 35 is elastomeric in that it comprises elastomeric material 38 which allows the carcass 35 to elastically change in shape and thus the track 21 to flex as it is in motion around the track-engaging assembly 24. The elastomeric material 38 can be any polymeric material with suitable elasticity. In this embodiment, the elastomeric material 38 includes rubber. Various rubber compounds may be used and, in some cases, different rubber compounds may be present in different areas of the carcass 35. In other embodiments, the elastomeric material 38 may include another elastomer in addition to or instead of rubber (e.g., polyurethane elastomer).

Figure 8A:
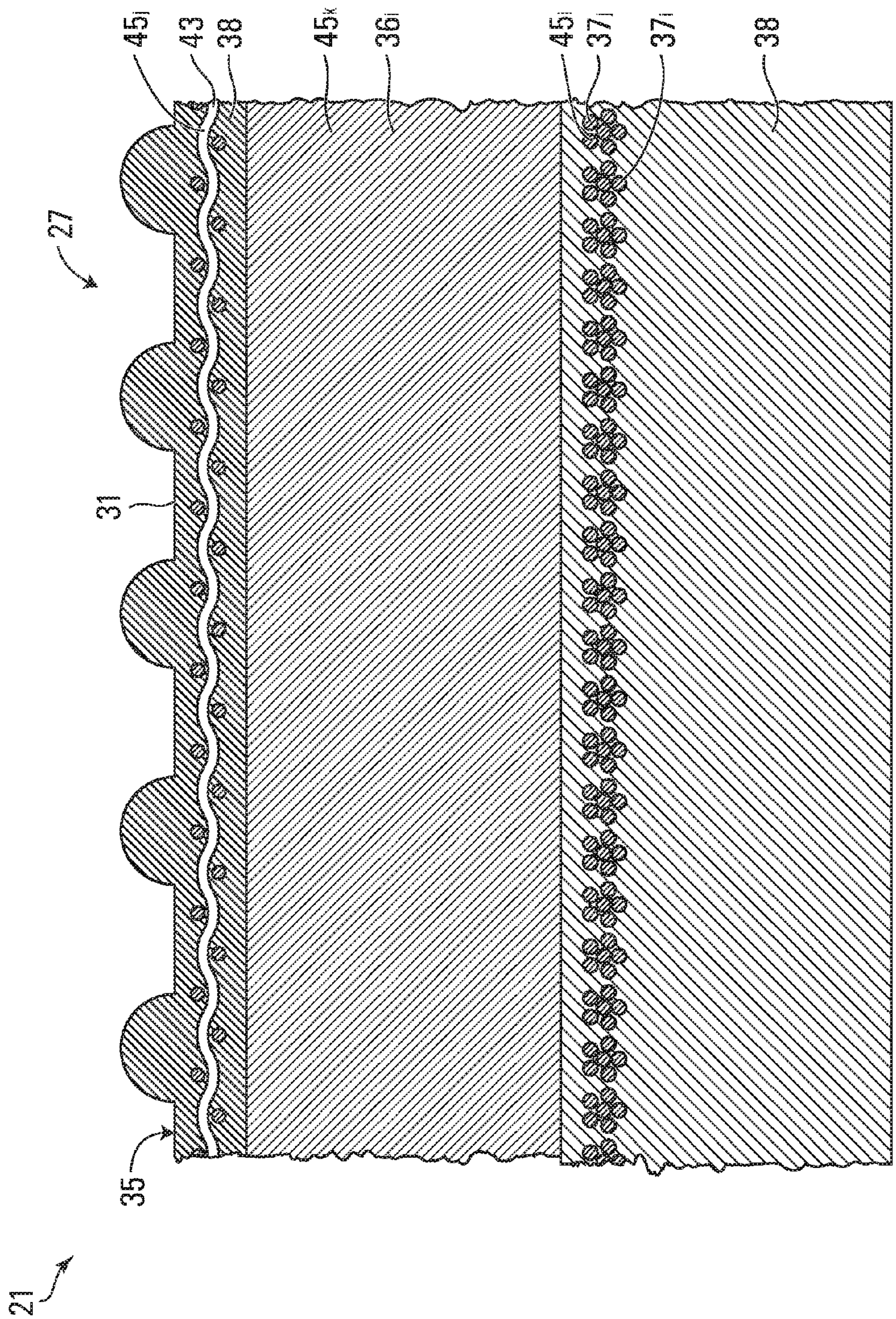
FIG. 8A shows a widthwise cross-sectional view of part of the track.
Figure 8B:
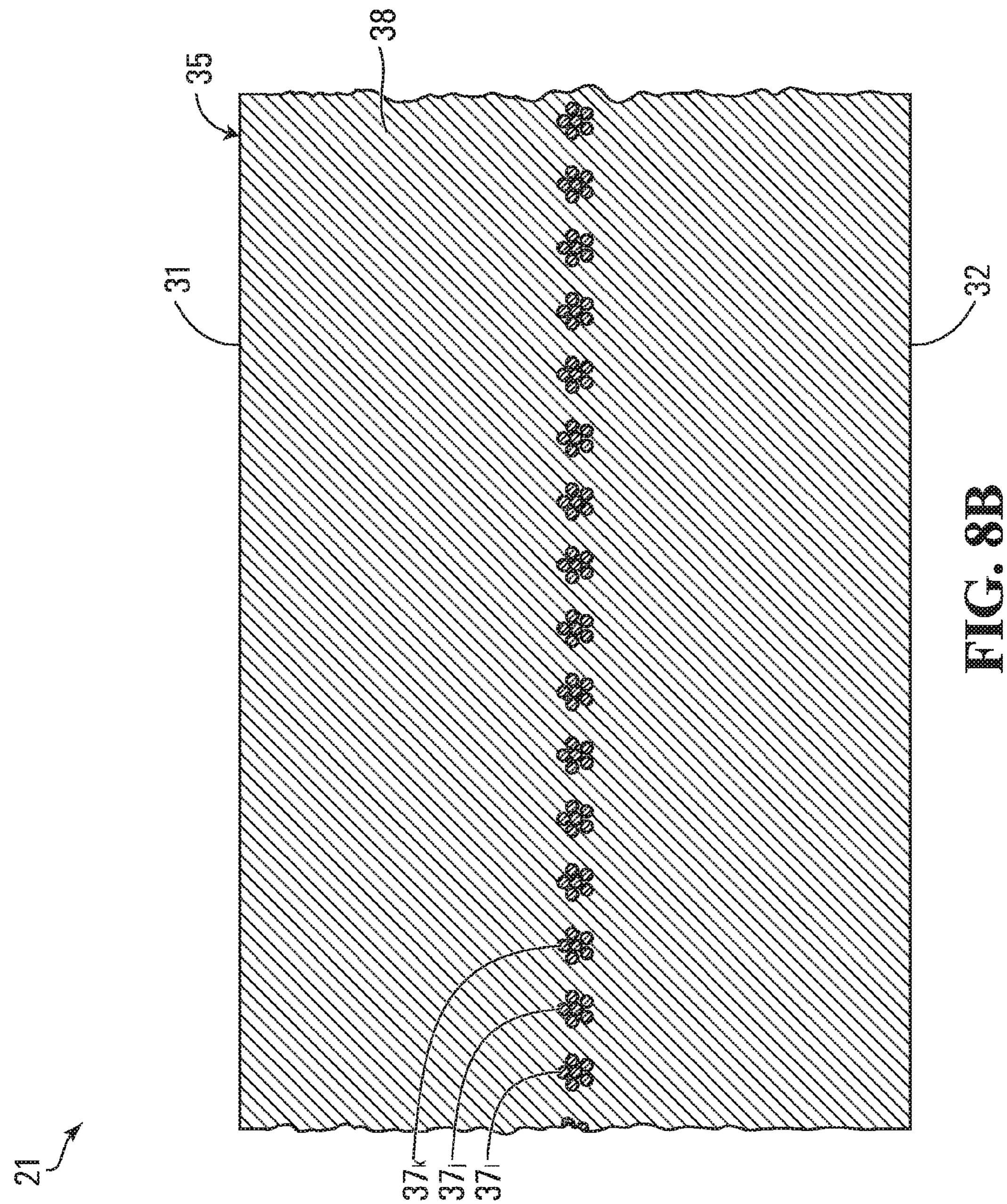
FIG. 8B shows a widthwise cross-sectional view of part of the track in accordance to another embodiment.

In this embodiment, as shown in FIGS. 8A and 8B, the carcass 35 comprises a plurality of reinforcements $45_1$-$45_P$ embedded in its rubber 38. These reinforcements $45_1$-$45_P$ can take on various forms.

For example, in this embodiment, a subset of the reinforcements $45_1$-$45_P$ is a plurality of transversal stiffening rods $36_1$-$36_N$ that extend transversally to the longitudinal direction of the track 21 to provide transversal rigidity to the track 21. More particularly, in this embodiment, the transversal stiffening rods $36_1$-$36_N$ extend in the widthwise direction of the track 21. Each of the transversal stiffening rods $36_1$-$36_N$ may have various shapes and be made of any suitably rigid material (e.g., metal, polymer or composite material).

As another example, in this embodiment, the reinforcements $45_i$, $45_j$ are layers of reinforcing material that is flexible in the longitudinal direction of the track 21.

For instance, in this embodiment, the reinforcement $45_i$ is a layer of reinforcing cables $37_1$-$37_M$ that are adjacent to one another and extend generally in the longitudinal direction of the track 21 to enhance strength in tension of the track 21 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible longitudinally (e.g., fibers or wires of metal, plastic or composite material). In some examples of implementation, respective ones of the reinforcing cables $37_1$-$37_M$ may be constituted by a single continuous cable length wound helically around the track 21. In other examples of implementation, respective ones of the transversal cables $37_1$-$37_M$ may be separate and independent from one another (i.e., unconnected other than by rubber of the track 21).

Also, in this embodiment, the reinforcement $45_j$ is a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 21 to have a reinforcing effect in a transversal direction of the track 21. For instance, the reinforcing fabric 43 may comprise a ply of reinforcing woven fibers (e.g., nylon fibers or other synthetic fibers). For example, the reinforcing fabric 43 may protect the transversal stiffening rods $36_1$-$36_N$, improve cohesion of the track 21, and counter its elongation.

In some embodiments, as shown in FIG. 8B, the carcass 35 may comprise only one type of reinforcement (e.g., the reinforcing cables $37_1$-$37_M$) or any other selected combination of the above-mentioned reinforcements $45_1$-$45_P$.

The carcass 35 may be molded into shape in a molding process during which the rubber 38 is cured. For example, in this embodiment, a mold may be used to consolidate layers of rubber providing the rubber 38 of the carcass 35, the reinforcing cables $37_1$-$37_M$ and the layer of reinforcing fabric 43.

In this embodiment, the track 21 is a one-piece "jointless" track such that the carcass 35 is a one-piece jointless carcass. In other embodiments, the track 21 may be a "jointed" track (i.e., having at least one joint connecting adjacent parts of the track 21) such that the carcass 35 is a jointed carcass (i.e., which has adjacent parts connected by the at least one joint). For example, in some embodiments, the track 21 may comprise a plurality of track sections interconnected to one another at a plurality of joints, in which case each of these track sections includes a respective part of the carcass 35. In other embodiments, the track 21 may be a one-piece track that can be closed like a belt with connectors at both of its longitudinal ends to form a joint.

The ground-engaging outer side 27 of the track 21 comprises a ground-engaging outer surface 31 of the carcass 35 and a plurality of traction projections $58_1$-$58_T$ that project from the ground-engaging outer surface 31 to enhance traction on the ground. The traction projections $58_1$-$58_T$, which can be referred to as "traction lugs" or "traction profiles", may have any suitable shape (e.g., straight shapes, curved shapes, shapes with straight parts and curved parts, etc.).

A height H of a traction projection $58_x$ may have any suitable value. For example, in some embodiments, the height of the traction projection $58_x$ may be at least 2 inches, in some cases at least 3 inches, in some cases at least 4 inches, in some cases at least 5 inches, and in some cases even more. The height of the traction projection $58_x$ may have any other suitable value in other embodiments. The traction projection $58_x$ also has a longitudinal axis 75 and a first longitudinal end $308_1$ and a second longitudinal end $308_2$ that define a length L of the traction projection $58_x$. The longitudinal axis 75 of the traction projection $58_x$ extends transversally to the longitudinal direction of the track 21, in this example in the widthwise direction of the track 21.

In this embodiment, each of the traction projections $58_1$-$58_T$ is an elastomeric traction projection in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of each of the traction projections 58$_1$-58$_T$. In other embodiments, the elastomeric material 41 may include another elastomer in addition to or instead of rubber (e.g., polyurethane elastomer).

The traction projections 58$_1$-58$_T$ may be provided on the ground-engaging outer side 27 in various ways. For example, in this embodiment, the traction projections 58$_1$-58$_T$ are provided on the ground-engaging outer side 27 by being molded with the carcass 35.

The inner side 25 of the track 21 comprises an inner surface 32 of the carcass 35 and a plurality of inner projections 34$_1$-34$_D$ that project from the inner surface 32 and are positioned to contact the track-engaging assembly 24 (e.g., at least some of the wheels 22$_1$, 22$_2$, 26$_1$, 26$_2$, 28$_1$-28$_6$, 30$_1$, 30$_2$) to do at least one of driving (i.e., imparting motion to) the track 21 and guiding the track 21. Since each of them is used to do at least one of driving the track 21 and guiding the track 21, the inner projections 34$_1$-34$_D$ can be referred to as "drive/guide projections" or "drive/guide lugs". In some cases, a drive/guide lug 34$_i$ may interact with a given one of the drive wheels 22$_1$, 22$_2$ to drive the track 21, in which case the drive/guide lug 34$_i$ is a drive lug. In other cases, a drive/guide lug 34$_i$ may interact with a given one of the idler wheels 26$_1$, 26$_2$, 28$_1$-28$_2$, 30$_1$, 30$_2$ and/or another part of the track-engaging assembly 24 to guide the track 21 to maintain proper track alignment and prevent de-tracking without being used to drive the track 21, in which case the drive/guide lug 34$_i$ is a guide lug. In yet other cases, a drive/guide lug 34$_i$ may both (i) interact with a given one of the drive wheels 22$_1$, 22$_3$ to drive the track 21 and (ii) interact with a given one of the idler wheels 26$_1$, 26$_2$, 28$_1$-28$_6$, 30$_1$, 30$_2$ and/or another part of the track-engaging assembly 24 to guide the track 21, in which case the drive/guide lug 34$_i$ is both a drive lug and a guide lug.

In this embodiment, each of the drive/guide lugs 34$_1$-34$_D$ is an elastomeric drive/guide lug in that it comprises elastomeric material 42. The elastomeric material 42 can be any polymeric material with suitable elasticity. More particularly, in this embodiment, the elastomeric material 42 includes rubber. Various rubber compounds may be used and, in some cases, different rubber compounds may be present in different areas of each of the drive/guide lugs 34$_1$-34$_D$. In other embodiments, the elastomeric material 42 may include another elastomer in addition to or instead of rubber (e.g., polyurethane elastomer).

The drive/guide lugs 34$_1$-34$_D$ may be provided on the inner side 25 in various ways. For example, in this embodiment, the drive/guide lugs 34$_1$-34$_D$ are provided on the inner side 25 by being molded with the carcass 35.

In this embodiment, the carcass 35 has a thickness $T_c$ which is relatively small. The thickness $T_c$ of the carcass 35 is measured from the inner surface 32 to the ground-engaging outer surface 31 of the carcass 35 between longitudinally-adjacent ones of the traction projections 58$_1$-58$_T$. For example, in some embodiments, the thickness $T_c$ of the carcass 35 may be no more than 0.25 inches, in some cases no more than 0.22 inches, in some cases no more than 0.20 inches, and in some cases even less (e.g., no more than 0.18 or 0.16 inches). The thickness $T_c$ of the carcass 35 may have any other suitable value in other embodiments.

Elastomeric material of a given portion of the endless track 21, including the elastomeric material 38 of the carcass 35, the elastomeric material 41 of one of the traction projection 58$_1$-58$_T$, and the elastomeric material 42 of one of the drive/guide lugs 34$_1$-34$_D$, has various material properties, including a hardness (e.g., durometers in a Shore A hardness scale) and a modulus of elasticity, which can have any suitable value.

If the elastomeric material of the given portion of the track 21 is constituted of a single elastomer, the hardness of the elastomeric material of the given portion of the track 21 is the hardness of this single elastomer. Alternatively, if the elastomeric material of the given portion of the track 21 is constituted of two or more different elastomers, the hardness of the elastomeric material of the given portion of the track 21 is taken as an average hardness, which is obtained by multiplying a proportion of each elastomer in the elastomeric material of the given portion of the track 21 by that elastomer's hardness and then summing the results. That is, if the elastomeric material of the given portion of the track 21 is constituted of N elastomers, the average hardness is $$A_{avg} = \sum_{i=1}^{N} P_i A_i$$

where $A_i$ is the hardness of elastomer "i" and $P_i$ is the proportion (%) of elastomer "i" in the elastomeric material of the given portion of the track 21. In situations where this calculated value is not an integer and the hardness scale is only in integers, this calculated value rounded to the nearest integer gives the average hardness. An elastomer's hardness can be obtained from a standard ASTM D-2240 test (or equivalent test).

Similarly, if the elastomeric material of the given portion of the track 21 is constituted of a single elastomer, the modulus of elasticity of the elastomeric material of the given portion of the track 21 is the modulus of elasticity of this single elastomer. Alternatively, if the elastomeric material of the given portion of the track 21 is constituted of two or more different elastomers, the modulus of elasticity of the elastomeric material of the given portion of the track 21 is taken as an average modulus of elasticity, which is obtained by multiplying a proportion (%) of each elastomer in the elastomeric material of the given portion of the track 21 by that elastomer's modulus of elasticity and then summing the results. That is, if the elastomeric material of the given portion of the track 21 is constituted of N elastomers, the average modulus of elasticity is $$\lambda_{avg} = \sum_{i=1}^{N} P_i \lambda_i$$

where $\lambda_i$ is the modulus of elasticity of elastomer "i" and $P_i$ is the proportion (%) of elastomer "i" in the elastomeric material of the given portion of the track 21. For instance, in an embodiment in which the elastomeric material of the given portion of the track 21 is constituted of two types of rubbers, say rubber "A" having a modulus of elasticity of 1.9 MPa and being present in a proportion of 15% and rubber "B" having a modulus of elasticity of 6.3 MPa and being present in a proportion of 85%, the average modulus of elasticity of the elastomeric material of the given portion of the track 21 is 5.64 MPa. An elastomer's modulus of elasticity can be obtained from a standard ASTM D-412-A test (or equivalent test) based on a measurement at 100% elongation of the elastomer.

The track-engaging assembly 24 is configured to drive and guide the track 21 around the track-engaging assembly 24.

Each of the drive wheels 22$_1$, 22$_2$ is rotatable by an axle for driving the track 21. That is, power generated by the prime mover 15 and delivered over the powertrain 12 of the snowmobile 10 rotates the axle, which rotates the drive wheels 22$_1$, 22$_2$, which impart motion of the track 21. In this embodiment, each drive wheel 22$_i$ comprises a drive sprocket engaging some of the drive/guide lugs 34$_1$-34$_D$ of the inner side 25 of the track 21 in order to drive the track 21. In other embodiments, the drive wheel 22$_i$ may be configured in various other ways. For example, in embodiments where the track 21 comprises drive holes, the drive wheel 22$_i$ may have teeth that enter these holes in order to drive the track 21. As yet another example, in some embodiments, the drive wheel 22$_i$ may frictionally engage the inner side 25 of the track 21 in order to frictionally drive the track 21. The drive wheels 22$_1$, 22$_2$ may be arranged in other configurations and/or the track system 14 may comprise more or less drive wheels (e.g., a single drive wheel, more than two drive wheels, etc.) in other embodiments.

The idler wheels 26$_1$, 26$_2$, 28$_1$-28$_6$, 30$_1$, 30$_2$ are not driven by power supplied by the prime mover 15, but are rather used to do at least one of guiding the track 21 as it is driven by the drive wheels 22$_1$, 22$_2$, tensioning the track 21, and supporting part of the weight of the snowmobile 10 on the ground via the track 21. More particularly, in this embodiment, the rear idler wheels 26$_1$, 26$_2$ are trailing idler wheels that maintain the track 21 in tension, guide the track 21 as it wraps around them, and can help to support part of the weight of the snowmobile 10 on the ground via the track 21. The lower roller wheels 28$_1$-28$_6$ roll on the inner side 25 of the track 21 along the bottom run 66 of the track 21 to apply the bottom run 66 on the ground. The upper roller wheels 30$_1$, 30$_2$ roll on the inner side 25 of the track 21 along the top run 65 of the track 21 to support and guide the top run 65 as the track 21 moves. The idler wheels 26$_1$, 26$_2$, 28$_1$-28$_6$, 30$_1$, 30$_2$ may be arranged in other configurations and/or the track assembly 14 may comprise more or less idler wheels in other embodiments.

The frame 23 of the track system 14 supports various components of the track-engaging assembly 24, including, in this embodiment, the idler wheels 26$_1$, 26$_2$, 28$_1$-28$_6$, 30$_1$, 30$_2$. More particularly, in this embodiment, the frame 23 comprises an elongate support 62 extending in the longitudinal direction of the track system 14 along the bottom run 66 of the track 21 and frame members 49$_1$-49$_F$ extending upwardly from the elongate support 62.

Figure 17:
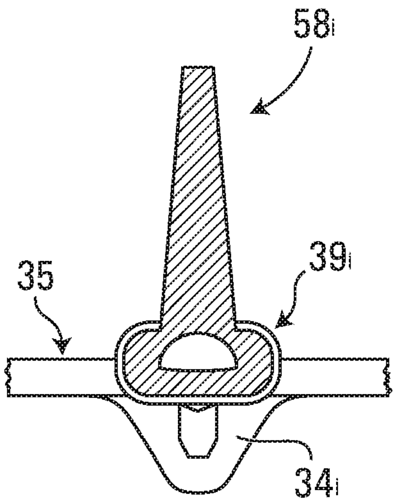
FIG. 17 shows a longitudinal cross-sectional view of part of the track including a slide member of a plurality of slide members.

The elongate support 62 comprises rails 44$_1$, 44$_2$ extending in the longitudinal direction of the track system 14 along the bottom run 66 of the track 21. In this example, the idler wheels 26$_1$, 26$_2$, 28$_1$-28$_6$ are mounted to the rails 44$_1$, 44$_2$. In this embodiment, the elongate support 62 comprises sliding surfaces 77$_1$, 77$_2$ for sliding on the inner side 25 of the track 21 along the bottom run 66 of the track 21. Thus, in this embodiment, the idler wheels 26$_1$, 26$_2$, 28$_1$-28$_6$ and the sliding surfaces 77$_1$, 77$_2$ of the elongate support 62 can contact the bottom run 66 of the track 21 to guide the track 21 and apply it onto the ground for traction. In this example, the sliding surfaces 77$_1$, 77$_2$ can slide against the inner surface 32 of the carcass 35 and can contact respective ones of the drive/guide lugs 34$_1$-34$_D$ to guide the track 21 in motion. Also, in this example, the sliding surfaces 77$_1$, 77$_2$ are curved upwardly in a front region of the track system 14 to guide the track 21 towards the drive wheels 22$_1$, 22$_2$. In some cases, as shown in FIG. 17, the track 21 may comprise slide members 39$_1$-39$_S$ that slide against the sliding surfaces 77$_1$, 77$_2$ to reduce friction. The slide members 39$_1$-39$_S$, which can sometimes be referred to as "clips", may be mounted via holes (i.e., windows) 40$_1$-40$_H$ of the track 21. In other cases, the track 21 may be free of such slide members.

In this embodiment, the elongate support 62 comprises sliders 33$_1$, 33$_2$ mounted to respective ones of the rails 44$_1$, 44$_2$ and comprising respective ones of the sliding surfaces 77$_1$, 77$_2$. In this embodiment, the sliders 33$_1$, 33$_2$ are mechanically interlocked with the rails 44$_1$, 44$_2$. In other embodiments, instead of or in addition to being mechanically interlocked with the rails 44$_1$, 44$_2$, the sliders 33$_1$, 33$_2$ may be fastened to the rails 44$_1$, 44$_2$. For example, in some embodiments, the sliders 33$_1$, 33$_2$ may be fastened to the rails 44$_1$, 44$_2$ by one or more mechanical fasteners (e.g., bolts, screws, etc.), by an adhesive, and/or by any other suitable fastener.

In some examples, each slider 33$_i$ may comprise a low-friction material which may reduce friction between its sliding surface 77$_i$ and the inner side 25 of the track 21. For instance, the slider 33$_i$ may comprise a polymeric material having a low coefficient of friction with the rubber of the track 21. For example, in some embodiments, the slider 33$_i$ may comprise a thermoplastic material (e.g., a Hifax® polypropylene). The slider 33$_i$ may comprise any other suitable material in other embodiments. For instance, in some embodiments, the sliding surface 77$_i$ of the slider 33$_i$ may comprise a coating (e.g., a polytetrafluoroethylene (PTFE) coating) that reduces friction between it and the inner side 25 of the track 21, while a remainder of the slider 33$_i$ may comprise any suitable material (e.g., a metallic material, another polymeric material, etc.).

While in embodiments considered above the sliding surface 77$_i$ is part of the slider 33$_i$ which is separate from and mounted to each rail 44$_i$, in other embodiments, the sliding surface 77$_i$ may be part of the rail 44$_i$. That is, the sliding surface 77$_i$ may be integrally formed (e.g., molded, cast, or machined) as part of the rail 44$_i$.

The frame members 49$_1$-49$_F$ extend upwardly from the elongate support 62 to hold the upper roller wheels 30$_1$, 30$_2$ such that the upper roller wheels 30$_1$, 30$_2$ roll on the inner side 25 of the track 21 along the top run 65 of the track 21.

The track-engaging assembly 24 may be implemented in any other suitable way in other embodiments.

The track system 14, including the track 21, may have various features to enhance its traction, floatation, and/or other aspects of its performance, including, for example, a lightweight design, enhanced tractive effects, an enhanced heat management capability, an enhanced resistance to lateral skidding (e.g., on a side hill), an adaptive capability to adapt itself to different conditions (e.g., ground conditions, such as different types of snow, soil, etc.; and/or other conditions), an adjustability of its contact patch 59, and/or other features. This may be achieved in various ways in various embodiments, examples of which will now be discussed.

1. Lightweight Track

In some embodiments, the track 21 may be designed to reduce a weight of the track 21 while maintaining performance of the track 21. This may help to reduce power consumption, improve riding of the snowmobile 10, and/or enhance other aspects of performance of the snowmobile 10.

1.1 Thin Carcass

Figure 7:
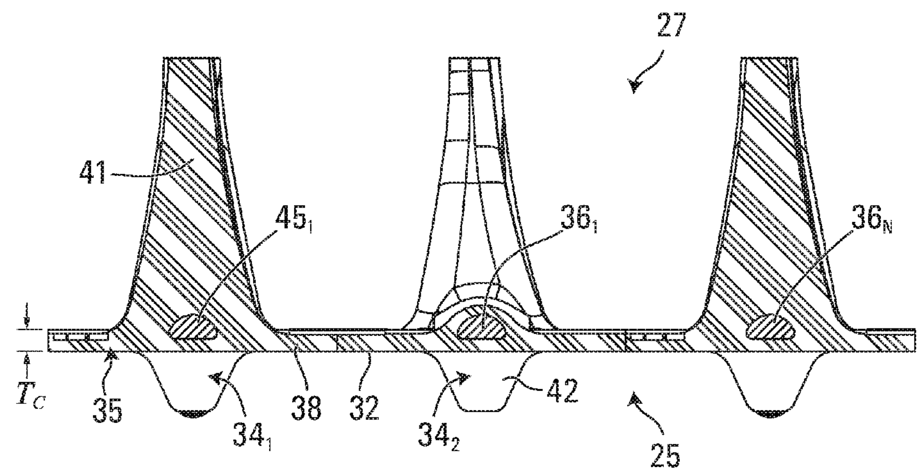

In some embodiments, as shown in FIG. 7, the carcass 35 may be very thin yet remain sufficiently rigid for proper traction and floatation.

For example, in some embodiments, the thickness $T_c$ of the carcass 35 may be no more than 0.20 inches, in some cases no more than 0.18 inches, in some cases no more than 0.16 inches, and in some cases even less (e.g., no more than 0.14 inches). For instance, in some examples of implementation, the thickness $T_c$ of the carcass 35 may be 0.165 inches or less.

Meanwhile, in such embodiments, rigidity characteristics of the carcass 35 allow proper performance of the track 21. For instance, the rigidity characteristics of the carcass 35 may relate to (1) a longitudinal rigidity of the carcass 35, i.e., a rigidity of the carcass 35 in the longitudinal direction of the track 21 which refers to the carcass's resistance to bending about an axis parallel to the widthwise direction of the track 21, and/or (2) a widthwise rigidity of the carcass 35, i.e., a rigidity of the carcass 35 in the widthwise direction of the track 21 which refers to the carcass's resistance to bending about an axis parallel to the longitudinal direction of the track 21.

Figure 9:
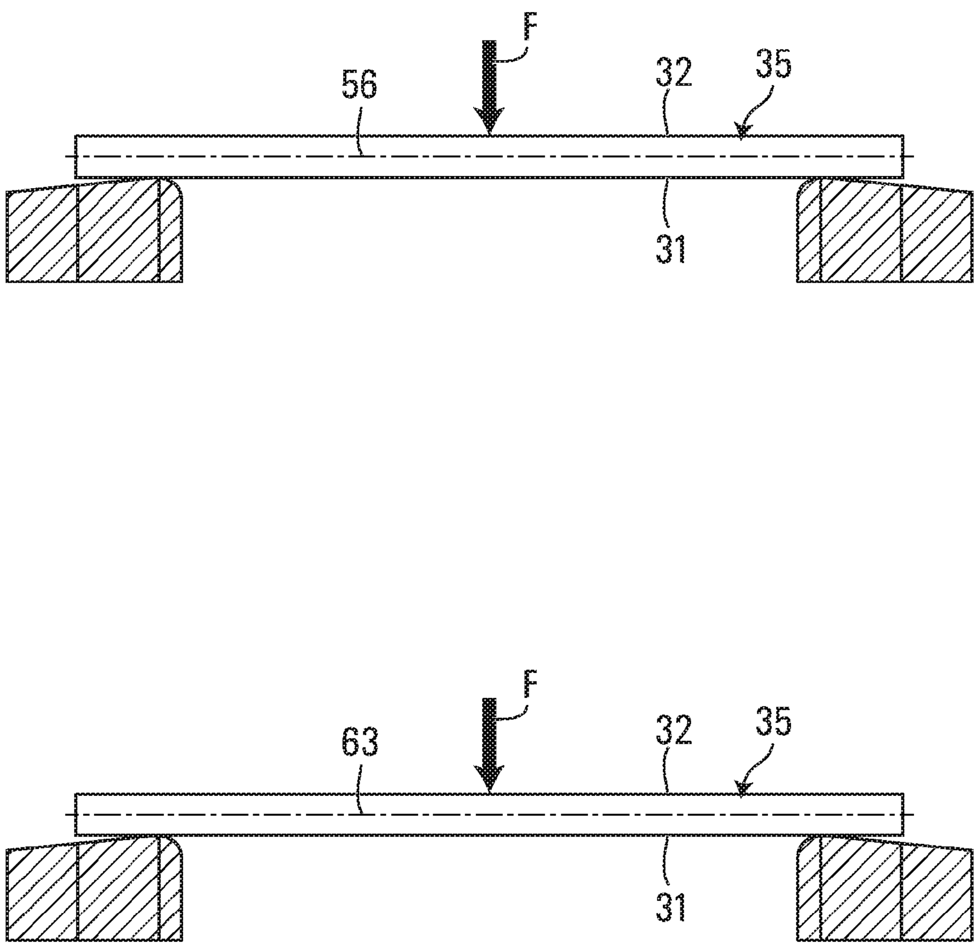
FIG. 9 shows a three-point bending test being performed on a carcass of the track along a widthwise direction of the track and along a longitudinal direction of the track.

To observe the longitudinal rigidity and the widthwise rigidity of the carcass 35 without influence from a remainder of the track 21, as shown in FIG. 9, the carcass 35 can be isolated from the remainder of the track 21 (e.g., by scraping, cutting, or otherwise removing the traction projections $\mathbf{58}_1$-$\mathbf{58}_T$ and the drive/guide lugs $\mathbf{34}_1$-$\mathbf{34}_D$, or by producing the carcass 35 without the traction projections $\mathbf{58}_1$-$\mathbf{58}_T$, the carcass 35, the drive/guide lugs $\mathbf{34}_1$-$\mathbf{34}_D$) and a three-point bending test can be performed on a sample of the carcass 35 to subject the carcass 35 to loading tending to bend the carcass 35 in specified ways (i.e., bend the carcass 35 longitudinally to observe the longitudinal rigidity of the carcass 35 and bend the carcass 35 laterally to observe the widthwise rigidity of the carcass 35) and measure parameters indicative of the longitudinal rigidity and the widthwise rigidity of the carcass 35. For instance in some embodiments, the three-point bending test may be based on conditions defined in a standard test (e.g., ISO 178(2010) but using elastomeric material). For example:

To observe the longitudinal rigidity of the carcass 35, the three-point bending test may be performed to subject the carcass 35 to loading tending to longitudinally bend the carcass 35 until a predetermined deflection of the carcass 35 is reached and measure a bending load at that predetermined deflection of the carcass 35. The predetermined deflection of the carcass 35 may be selected such as to correspond to a predetermined strain of the carcass 35 at a specified point of the carcass 35 (e.g., a point of the inner surface 32 of the carcass 35). For instance, in some embodiments, the predetermined strain of the carcass 35 may between 3% and 5%. The bending load at the predetermined deflection of the carcass 35 may be used to calculate a bending stress at the specified point of the carcass 35. The bending stress at the specified point of the carcass 35 may be calculated as $\sigma=My/I$, where M is the moment about a longitudinal-bending neutral axis 63 of the carcass 35 caused by the bending load, y is the perpendicular distance from the specified point of the carcass 35 to the neutral axis of the carcass 35, and I is the second moment of area about the neutral axis of the carcass 35. The longitudinal rigidity of the carcass 35 can be taken as the bending stress at the predetermined strain (i.e., at the predetermined deflection) of the carcass 35. Alternatively, the longitudinal rigidity of the carcass 35 may be taken as the bending load at the predetermined deflection of the carcass 35;

To observe the widthwise rigidity of the carcass 35, the three-point bending test may be performed to subject the carcass 35 to loading tending to laterally bend the carcass 35 until a predetermined deflection of the carcass 35 is reached and measure a bending load at that predetermined deflection of the carcass 35. The predetermined deflection of the carcass 35 may be selected such as to correspond to a predetermined strain of the carcass 35 at a specified point of the carcass 35 (e.g., a point of the inner surface 32 of the carcass 35). For instance, in some embodiments, the predetermined strain of the carcass 35 may between 3% and 5%. The bending load at the predetermined deflection of the carcass 35 may be used to calculate a bending stress at the specified point of the carcass 35. The bending stress at the specified point of the carcass 35 may be calculated as $\sigma=My/I$, where M is the moment about a lateral-bending neutral axis 57 of the carcass 35 caused by the bending load, y is the perpendicular distance from the specified point of the carcass 35 to the neutral axis of the carcass 35, and I is the second moment of area about the neutral axis of the carcass 35. The widthwise rigidity of the carcass 35 can be taken as the bending stress at the predetermined strain (i.e., at the predetermined deflection) of the carcass 35. Alternatively, the widthwise rigidity of the carcass 35 may be taken as the bending load at the predetermined deflection of the carcass 35.

Thus, in such embodiments where the carcass 35 is very thin, the widthwise rigidity of the carcass 35 may be significantly greater than the longitudinal rigidity of the carcass 35. For instance, a ratio of the widthwise rigidity of the carcass 35 over the longitudinal rigidity of the carcass 35 may be at least 1.5, in some cases at least 2, in some cases at least 2.5, in some cases at least 3, and in some cases even more (e.g., 4, 5, etc.).

As another example, in some embodiments, the carcass 35 being very thin while sufficiently rigid may be such that a ratio of the longitudinal rigidity of the carcass 35 over the thickness $T_c$ of the carcass 35 is relatively high and/or a ratio of the widthwise rigidity of the carcass 35 over the thickness $T_c$ of the carcass 35 is relatively high.

The carcass 35 may be maintained sufficiently rigid in any suitable way in various embodiments. Examples of this are discussed below.

1.1.1 Stiffer Reinforcement

In some embodiments, as shown in FIG. 8A, a reinforcement $\mathbf{45}_x$ embedded in the rubber 38 of the carcass 35 may be stiffer. That is, a bending stiffness of the reinforcement $\mathbf{45}_x$ in the longitudinal direction of the track 21 and/or a bending stiffness of the reinforcement $\mathbf{45}_x$ in the widthwise direction of the track 21 may be relatively high. As shown in FIG. 8A, the reinforcement $\mathbf{45}_x$ may be, for example, a layer of reinforcing material flexible in the longitudinal direction of the track 21, such as a layer of reinforcing cables $\mathbf{37}_1$-$\mathbf{37}_M$ or a layer of reinforcing fabric 43.

The bending stiffness of the reinforcement $\mathbf{45}_x$ in the longitudinal direction of the track 21 may be measured using a three-point bending test performed on a sample of the reinforcement $\mathbf{45}_x$ to subject the reinforcement $\mathbf{45}_x$ to loading tending to bend the reinforcement $\mathbf{45}_x$ in the longitudinal direction of the track 21 until a predetermined deflection of the reinforcement $\mathbf{45}_x$ is reached and measure a bending load at that predetermined deflection of the reinforcement $\mathbf{45}_x$, and calculating the bending stiffness of the reinforcement $45_x$ in the longitudinal direction of the track 21 as a ratio of that bending load over that predetermined deflection.

The bending stiffness of the reinforcement $45_x$ in the longitudinal direction of the track 21 depends on a product of an area moment of inertia (i.e., a second moment of area) of a cross-section of the reinforcement $45_x$ normal to the longitudinal direction of the track 21 and a modulus of elasticity (i.e., Young's modulus) of a material of the reinforcement $45_x$. As such, the bending stiffness of the reinforcement $45_x$ in the longitudinal direction of the track 21 may be increased by increasing the area moment of inertia of the cross-section of the reinforcement $45_x$ normal to the longitudinal direction of the track 21 and/or the modulus of elasticity of the material of the reinforcement $45_x$.

Similarly, the bending stiffness of the reinforcement $45_x$ in the widthwise direction of the track 21 may be measured using a three-point bending test performed on a sample of the reinforcement $45_x$ to subject the reinforcement $45_x$ to loading tending to bend the reinforcement $45_x$ in the widthwise direction of the track 21 until a predetermined deflection of the reinforcement $45_x$ is reached and measure a bending load at that predetermined deflection of the reinforcement $45_x$, and calculating the bending stiffness of the reinforcement $45_x$ in the widthwise direction of the track 21 as a ratio of that bending load over that predetermined deflection.

The bending stiffness of the reinforcement $45_x$ in the widthwise direction of the track 21 depends on a product of an area moment of inertia (i.e., a second moment of area) of a cross-section of the reinforcement $45_x$ normal to the widthwise direction of the track 21 and the modulus of elasticity (i.e., Young's modulus) of the material of the reinforcement $45_x$. As such, the bending stiffness of the reinforcement $45_x$ in the widthwise direction of the track 21 may be increased by increasing the area moment of inertia of the cross-section of the reinforcement $45_x$ normal to the widthwise direction of the track 21 and/or the modulus of elasticity of the material of the reinforcement $45_x$.

For example, in some embodiments, the bending stiffness of the reinforcement $45_x$ in the longitudinal direction of the track 21 may be at least a certain value, and/or the bending stiffness of the reinforcement $45_x$ in the widthwise direction of the track 21 may be at least a certain value.

In some embodiments, a ratio of the bending stiffness of the reinforcement $45_x$ in the longitudinal direction of the track 21 over the bending stiffness of the reinforcement $45_x$ in the widthwise direction of the track 21 may be at least 2, in some cases at least 3, in some cases at least 4, in some cases at least 5, and in some cases even more (e.g., 6, 7, 8 or more).

As another example, in some embodiments, the carcass 35 being very thin while sufficiently rigid may be such that a ratio of the bending stiffness of the reinforcement $45_x$ in the longitudinal direction of the track 21 over the thickness $T_c$ of the carcass 35 is relatively high and/or a ratio of the bending stiffness of the reinforcement $45_x$ in the widthwise direction of the track 21 over the thickness $T_c$ of the carcass 35 is relatively high. For instance, in some embodiments, the ratio of the bending stiffness of the reinforcement $45_x$ in the longitudinal direction of the track 21 over the thickness $T_c$ of the carcass 35 may be at least a certain value, and/or the ratio of the bending stiffness of the reinforcement $45_x$ in the widthwise direction of the track 21 over the thickness $T_c$ of the carcass 35 may be at least a certain value.

As another example, in some embodiments, a ratio of the modulus of elasticity of the reinforcement $45_x$ in the longitudinal direction of the track 21 over the modulus of elasticity of the reinforcement $45_x$ in the widthwise direction of the track 21 may be at least 2, in some cases at least 3, in some cases at least 4, in some cases at least 5, and in some cases even more (e.g., 6, 7, 8 or more). For instance, in some embodiments, the modulus of elasticity of the reinforcement $45_x$ in the longitudinal direction of the track 21 may be at least 200 MPa, in some cases at least 300 MPa, in some cases at least 400 MPa, and in some cases even more, while the modulus of elasticity of the reinforcement $45_x$ in the widthwise direction of the track 21 may be at least 1 GPa, in some cases at least 1.5 GPa, in some cases at least 2.0 GPa, in some cases at least 2.5 GPa, and in some cases even more. Alternatively or additionally, the area moment of inertia of the cross-section of the reinforcement $45_x$ normal to the longitudinal direction of the track 21 and/or the area moment of inertia of the cross-section of the reinforcement $45_x$ normal to the widthwise direction of the track 21 may be at least a certain value. The modulus of elasticity of the reinforcement $45_x$, the area moment of inertia of the cross-section of the reinforcement $45_x$ normal to the longitudinal direction of the track 21, and/or the area moment of inertia of the cross-section of the reinforcement $45_x$ normal to the widthwise direction of the track 21 may have any other suitable values in other embodiments.

As another example, in some embodiments, the carcass 35 being very thin while sufficiently rigid may be such that a ratio of the modulus of elasticity of the reinforcement $45_x$ over the thickness $T_c$ of the carcass 35 is relatively high, a ratio of the area moment of inertia of the cross-section of the reinforcement $45_x$ normal to the longitudinal direction of the track 21 over the thickness $T_c$ of the carcass 35 is relatively high, and/or a ratio of the area moment of inertia of the cross-section of the reinforcement $45_x$ normal to the widthwise direction of the track 21 over the thickness $T_c$ of the carcass 35 is relatively high. For instance, in some embodiments, the ratio of the modulus of elasticity of the reinforcement $45_x$ in the longitudinal direction of the track 21 over the thickness $T_c$ of the carcass 35 may be at least 1 GPa/in, in some cases at least 1.5 GPa/in, in some cases at least 2 GPa/in, and in some cases even more, and the ratio of the modulus of elasticity of the reinforcement $45_x$ in the widthwise direction of the track 21 over the thickness $T_c$ of the carcass 35 may be at least 5 GPa/in, in some cases at least 7 GPa/in, in some cases at least 9 GPa/in, in some cases at least 12 GPa/in, and in some cases even more. Moreover, the ratio of the area moment of inertia of the cross-section of the reinforcement $45_x$ normal to the longitudinal direction of the track 21 over the thickness $T_c$ of the carcass 35 may be at least a certain value, and/or the ratio of the area moment of inertia of the cross-section of the reinforcement $45_x$ normal to the widthwise direction of the track 21 over the thickness $T_c$ of the carcass 35 may be at least a certain value. These ratios may have any other suitable values in other embodiments.

1.1.2 Stiffer Elastomeric Material

In some embodiments, the elastomeric material 38 of the carcass 35 may be stiffer. For example, in some embodiments, the 300% modulus of the elastomeric material 38 of the carcass 35 (i.e., the Young's modulus of the elastomeric material 38 at 300% elongation) may be at least 15 MPa, in some cases at least 20 MPa, in some cases at least 25 MPa, and in some cases even more (e.g., 30 MPa). The modulus of elasticity of the elastomeric material 38 of the carcass 35 may have any other suitable value in other embodiments.

1.1.3 Increased Spacing of Reinforcements

In some embodiments, respective ones of the reinforcements $45_1$-$45_P$ embedded in the elastomeric material 38 of the carcass 35 may be spaced apart from one another significantly in order to increase the longitudinal rigidity and/or the widthwise rigidity of the carcass 35.

Figure 10:
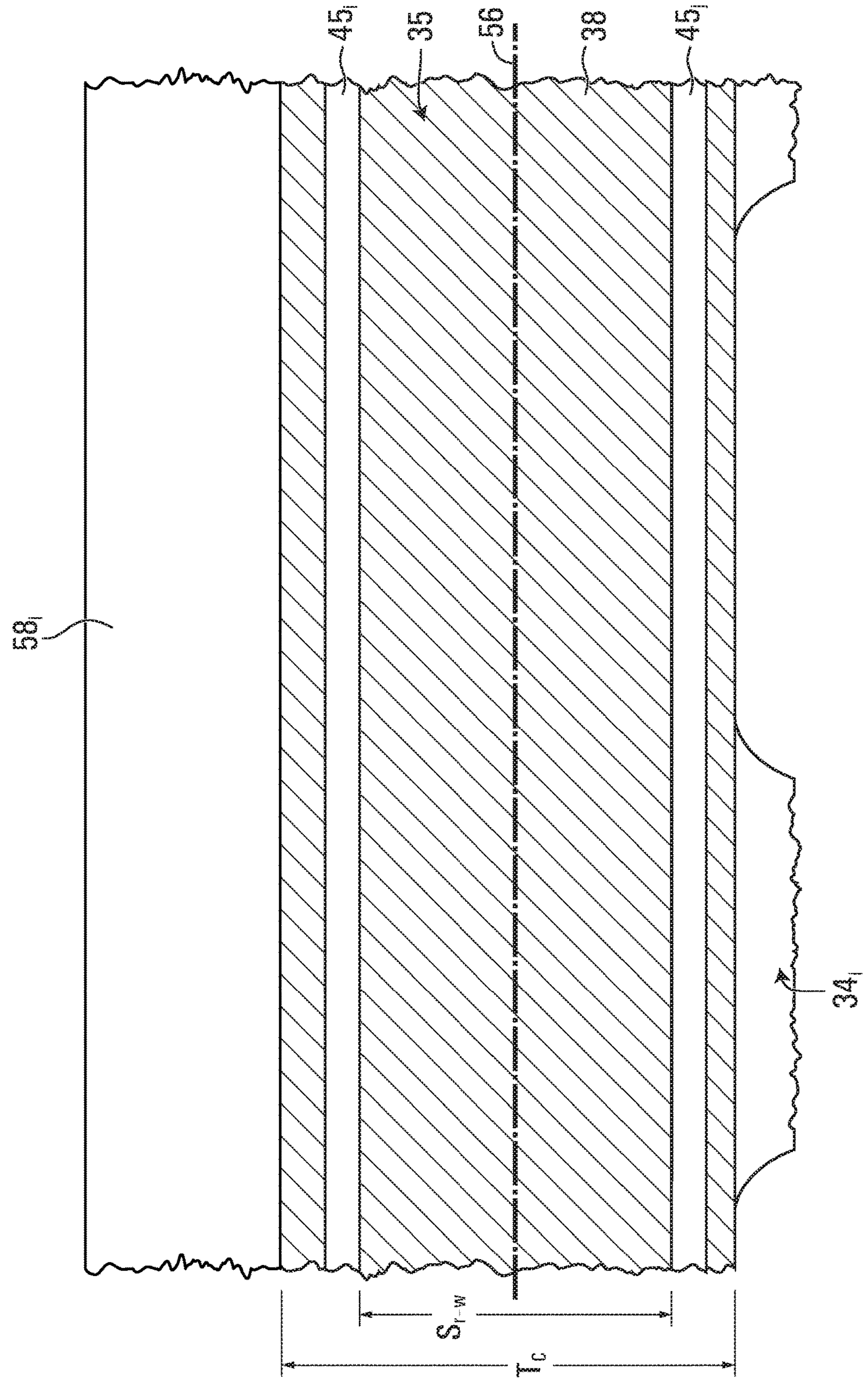
FIG. 10 shows a widthwise cross-sectional view of part of the track in which reinforcements are spaced apart significantly in a height direction of the track.

For example, in some embodiments, as shown in FIG. 10, a reinforcement $45_i$ and a reinforcement $45_j$ that mainly stiffen the track 21 laterally and that are adjacent to one another in the thickness direction of the track 21 (i.e., there is no reinforcement mainly stiffening the track 21 laterally between the reinforcements $45_i$, $45_j$) may be spaced apart significantly in order to increase the track's widthwise rigidity. Each of the reinforcements $45_i$, $45_j$ may thus be spaced apart significantly from the lateral-bending neutral axis 57 of the carcass 35.

For instance, in some embodiments, a ratio of a spacing $S_{r-w}$ of the reinforcements $45_i$, $45_j$ in the thickness direction of the track 21 over the thickness $T_c$ of the carcass 35 may be at least 0.4, in some cases at least 0.5, in some cases at least 0.6, and in some cases even more. As an example, in some embodiments, where the thickness $T_c$ of the carcass 35 is 5 mm, the spacing $S_{r-w}$ of the reinforcements $45_i$, $45_j$ may be at least 2 mm, in some cases at least 2.5 mm, in some cases at least 3 mm, and in some cases even more. The ratio of the spacing $S_{r-w}$ of the reinforcements $45_i$, $45_j$ over the thickness $T_c$ of the carcass 35, the spacing $S_{r-w}$ of the reinforcements $45_i$, $45_j$, and/or the thickness $T_c$ of the carcass 35 may have any other suitable value in other embodiments.

In some embodiments, a stiffness of the reinforcement $45_i$ in the widthwise direction of the track 21 and a stiffness of the reinforcement $45_j$ in the widthwise direction of the track 21 may be substantially identical. For instance, in some cases, the reinforcements $45_i$, $45_j$ may be of a common type or structure. For example, the reinforcements $45_i$, $45_j$ may be substantially identical layers of reinforcing cables or of reinforcing fabric.

Alternatively, in some embodiments, the stiffness of the reinforcement $45_i$ in the widthwise direction of the track 21 and the stiffness of the reinforcement $45_j$ in the widthwise direction of the track 21 may be substantially different. For example, in some cases, the reinforcements $45_i$, $45_j$ may be layers of reinforcing cables that differ from one another (e.g., in terms of cable material, diameter, pitch, etc.). As another example, in some cases, the reinforcements $45_i$, $45_j$ may be layers of reinforcing fabric that differ from one another (e.g., in terms of fabric material, configuration (e.g., weft, warp, bias, etc.), etc.). As yet another example, in some cases, the reinforcements $45_i$, $45_j$ may be respective ones of a layer of reinforcing cable and a layer of reinforcing fabric.

Figure 11:
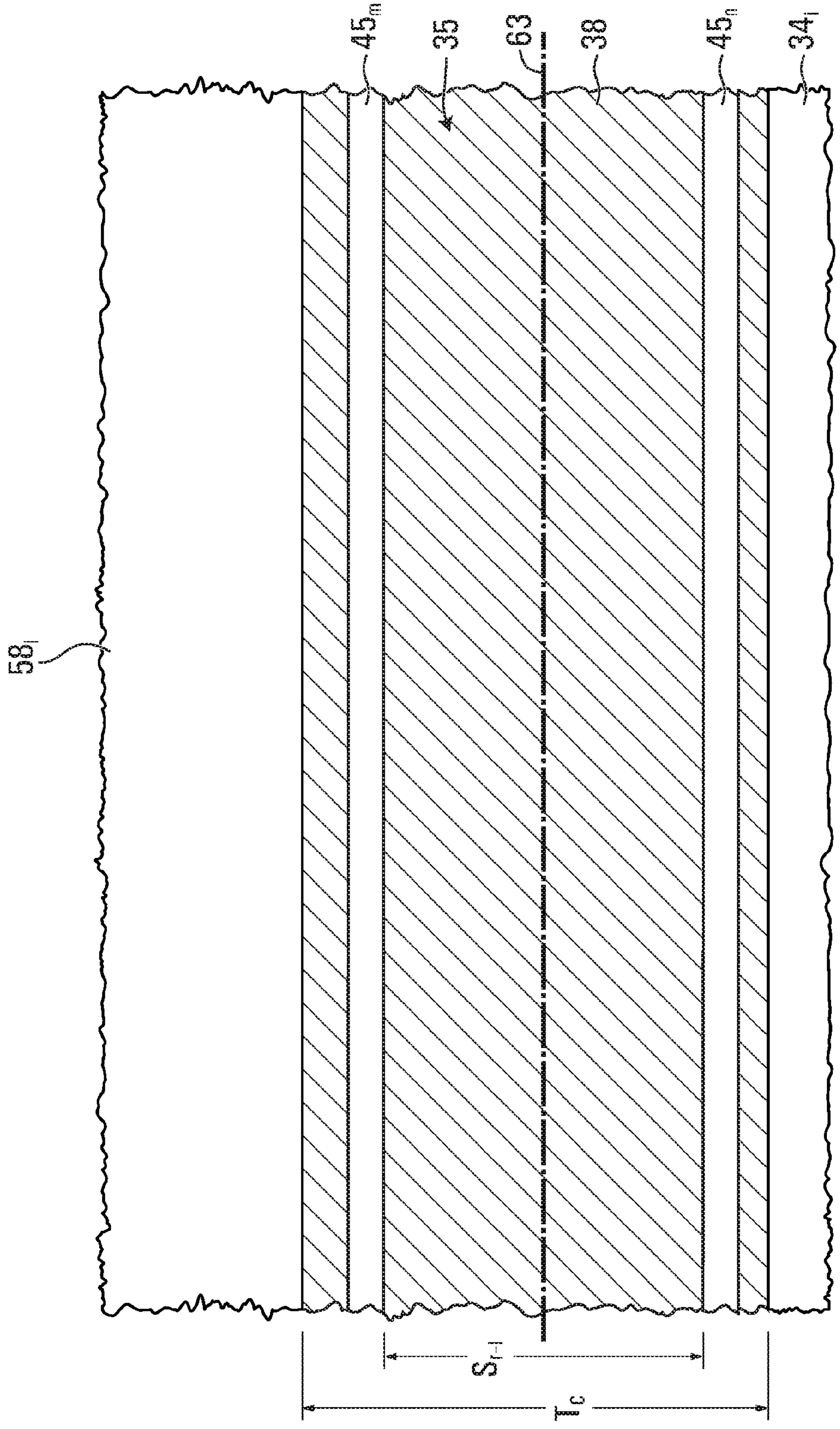
FIG. 11 shows a longitudinal cross-sectional view of part of the track in which reinforcements are spaced apart significantly in the height direction of the track.

In a similar manner, in some embodiments, as shown in FIG. 11, a reinforcement $45_m$ and a reinforcement $45_n$ that mainly stiffen the track 21 longitudinally and that are adjacent to one another in the thickness direction of the track 21 (i.e., there is no reinforcement mainly stiffening the track 21 longitudinally between the reinforcements $45_m$, $45_n$) may be spaced apart significantly in order to increase the track's longitudinal rigidity. Each of the reinforcements $45_m$, $45_n$ may thus be spaced apart significantly from a longitudinal-bending neutral axis 63 of the carcass 35.

For instance, in some embodiments, a ratio of a spacing $S_{r-l}$ of the reinforcements $45_m$, $45_n$ in the thickness direction of the track 21 over the thickness $T_c$ of the carcass 35 may be at least 0.4, in some cases at least 0.5, in some cases at least 0.6, and in some cases even more. As an example, in some embodiments, where the thickness $T_c$ of the carcass 35 is 5 mm, the spacing $S_{r-l}$ of the reinforcements $45_m$, $45_n$ may be at least 2 mm, in some cases at least 2.5 mm, in some cases at least 3 mm, and in some cases even more. The ratio of the spacing $S_{r-l}$ of the reinforcements $45_m$, $45_n$ over the thickness $T_c$ of the carcass 35, the spacing $S_{r-l}$ of the reinforcements $45_m$, $45_n$, and/or the thickness $T_c$ of the carcass 35 may have any other suitable value in other embodiments.

In some embodiments, a stiffness of the reinforcement $45_m$ in the longitudinal direction of the track 21 and a stiffness of the reinforcement $45_n$ in the longitudinal direction of the track 21 may be substantially identical. For instance, in some cases, the reinforcements $45_m$, $45_n$ may be of a common type or structure. For example, the reinforcements $45_m$, $45_n$ may be substantially identical layers of reinforcing cables or of reinforcing fabric.

Alternatively, in some embodiments, the stiffness of the reinforcement $45_m$ in the longitudinal direction of the track 21 and the stiffness of the reinforcement $45_n$ in the longitudinal direction of the track 21 may be substantially different. For example, in some cases, the reinforcements $45_m$, $45_n$ may be layers of reinforcing cables that differ from one another (e.g., in terms of cable material, diameter, pitch, etc.). As another example, in some cases, the reinforcements $45_m$, $45_n$ may be layers of reinforcing fabric that differ from one another (e.g., in terms of fabric material, configuration (e.g., weft, warp, bias, etc.), etc.). As yet another example, in some cases, the reinforcements $45_m$, $45_n$ may be respective ones of a layer of reinforcing cable and a layer of reinforcing fabric.

1.2 Low-density Elastomeric Material

Figure 12:
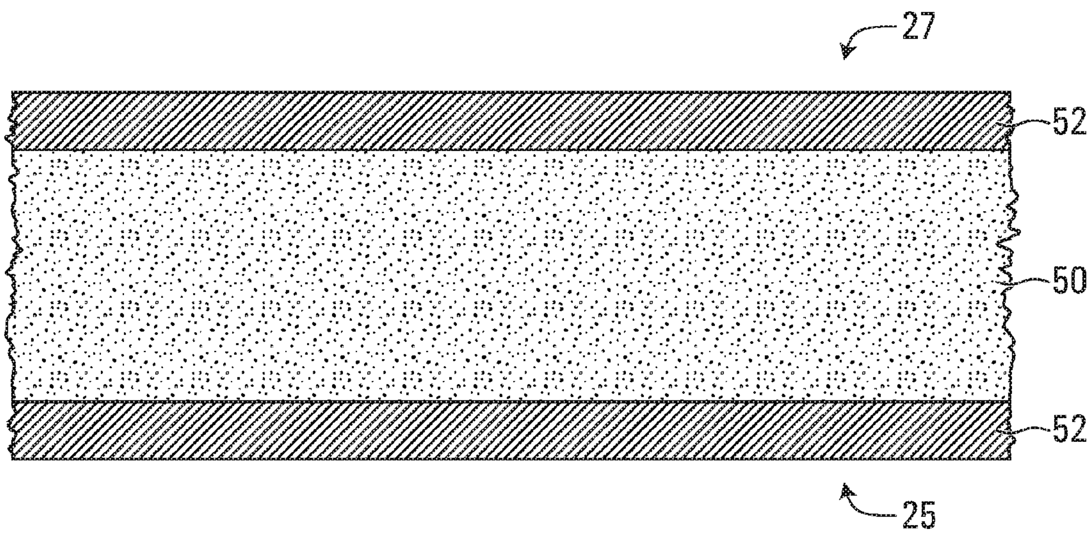
FIG. 12 shows an example of an embodiment in which the track comprises a low-density elastomeric material and a high-density elastomeric material.

In some embodiments, as shown in FIG. 12, the elastomeric material of the track 21 may comprise elastomeric material 50 having a density that is relatively low. This "lower-density" elastomeric material 50 may help to reduce the weight of the track 21.

For example, in this embodiment, in addition to the lower-density elastomeric material 50, the elastomeric material of the track 21 comprises elastomeric material 52 having a density that is relatively higher such that the lower-density elastomeric material 50 is less dense than this "higher-density" elastomeric material 52. For instance, in some embodiments, a ratio of the density of the lower-density elastomeric material 50 over the density of the higher-density elastomeric material 52 may be no more than 0.9, in some cases no more than 0.8, in some cases no more than 0.7, in some cases no more than 0.6, and in some cases even less (e.g., no more than 0.5). This ratio may have any other suitable value in other embodiments.

For instance, in some embodiments, the density of the lower-density elastomeric material 50 may be no more than 1.4 g/cm$^3$, in some cases no more than 1.2 g/cm$^3$, in some cases no more than 1.0 g/cm$^3$, in some cases no more than 0.8 g/cm$^3$ and in some cases even less, and/or the density of the higher-density elastomeric material 52 may be at least 1.4 g/cm$^3$, in some cases at least 1.6 g/cm$^3$, in some cases at least 1.8, in some cases at least 2.0 g/cm$^3$ and in some cases even more. The density of the lower-density elastomeric material 50 and/or the density of the higher-density elastomeric material 52 may have any other suitable value in other embodiments.

More particularly, in this embodiment, the lower-density elastomeric material 50 is internal elastomeric material 54 of the track 21 that is located away from a periphery 56 of the track 21 (i.e., the inner side 25, the ground-engaging outer side 27, and lateral edges $55_1$, $55_2$ of the track 21), such as elastomeric material 38 inside the carcass 35, elastomeric material 41 inside the traction projections $\mathbf{58}_1$-$\mathbf{58}_T$, and/or elastomeric material 42 inside the drive/guide lugs $\mathbf{34}_1$-$\mathbf{34}_D$, while the higher-density elastomeric material 52 is peripheral elastomeric material 60 forming at least part of the periphery 56 of the track 21, such as elastomeric material 62 of the inner side 25 of the track 21, elastomeric material 64 of the ground-engaging outer side 27 of the track 21, and/or elastomeric material 68 of the lateral edges $\mathbf{55}_1$, $\mathbf{55}_2$ of the track 21. This may help to reduce the weight of the track 21 while providing suitable wear resistance and/or other useful properties in external regions of the track 21 that may be expected to wear faster and/or be subject to other particular effects during use.

In this embodiment, the elastomeric material 62 of the inner side 25 of the track 21 comprises an elastomeric material of the inner surface 32 of the carcass 35 and an elastomeric material of an outer surface of the drive/guide lugs $\mathbf{34}_1$-$\mathbf{34}_D$; the elastomeric material 64 of the ground-engaging outer side 27 of the track 21 comprises an elastomeric material of the ground-engaging outer surface 31 of the carcass 35 and an elastomeric material 41 of an outer surface of the traction projections $\mathbf{58}_1$-$\mathbf{58}_T$; and the elastomeric material 38 inside the carcass 35 is part of the internal elastomeric material 54 spaced from the inner surface 32 and the ground-engaging outer surface 31 of the carcass 35. In this example, the internal elastomeric material 54 is thus encapsulated in the elastomeric material 62, 64, 68 of the inner side 25, the ground-engaging outer side 27 and the lateral edges $\mathbf{55}_1$, $\mathbf{55}_2$ of the track 21.

Figure 13A:
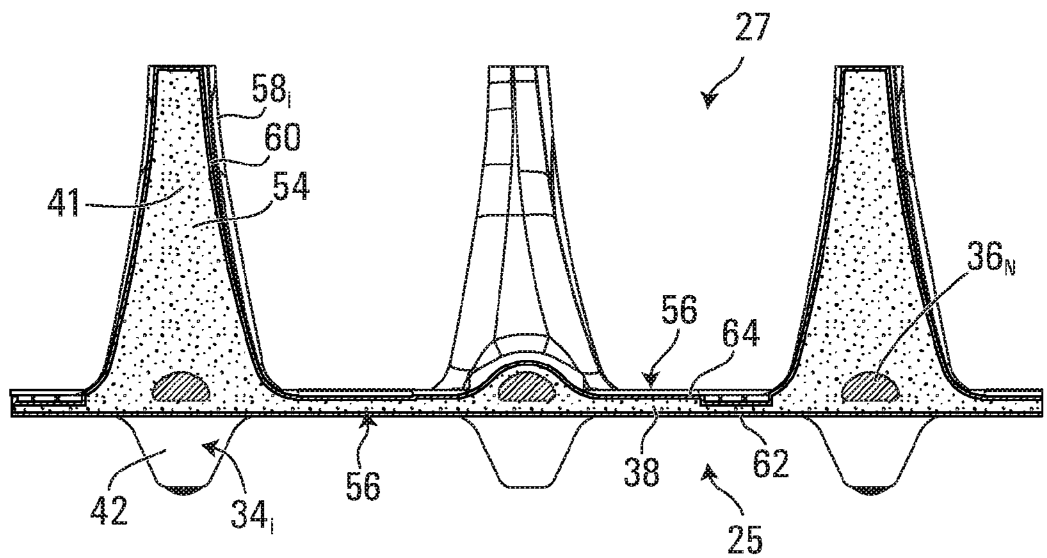
FIG. 13A shows a longitudinal cross-sectional view of the track of FIG. 12
Figure 13B:
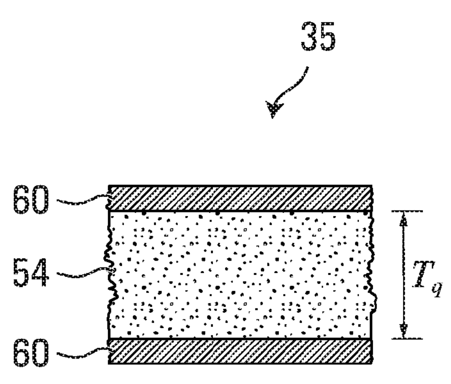
FIG. 13B shows a close-up view of part of the carcass of the track of FIG. 13A.
Figure 14:
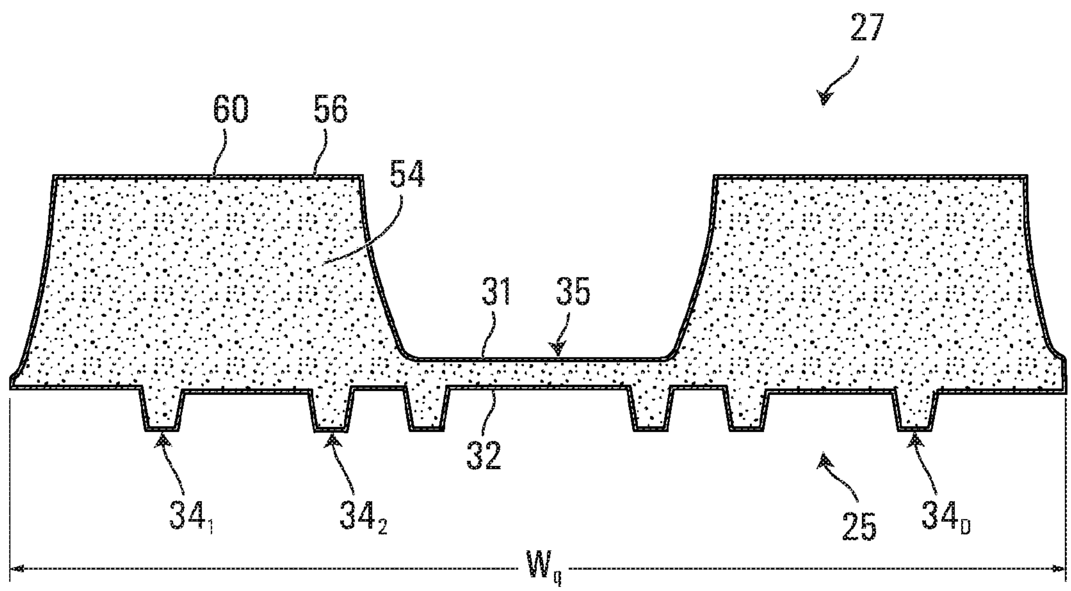
FIG. 14 shows a widthwise cross-sectional view of the track of FIG. 12.

In this embodiment, a quantity of the internal elastomeric material 54 is significant to allow this elastomeric material to occupy more space within the track 21. For example, in some embodiments, as shown in FIGS. 13A, 13B and 14, a thickness $T_q$ of the internal elastomeric material 54 inside the carcass 35 may occupy at least 20% of the thickness $T_c$ of the carcass 35, in some cases at least 30% of the thickness $T_c$ of the carcass 35, in some cases at least 40% of the thickness $T_c$ of the carcass 35, in some cases at least 50% of the thickness $T_c$ of the carcass 35, and in some cases even more (e.g., 60%, 70% or more). In this example of implementation, the thickness $T_q$ of the internal elastomeric material 54 inside the carcass 35 occupies at least a majority, in this case at least three-quarters, of the thickness $T_c$ of the carcass 35. The thickness $T_q$ of the internal elastomeric material 54 inside the carcass 35 may have any other suitable value in other embodiments. As another example, in some embodiments, a width $W_q$ of the internal elastomeric material 54 inside the carcass 35 may occupy at least 20% of a width W of the track 21 (measured between the lateral edges $\mathbf{55}_1$, $\mathbf{55}_2$ of the track 21), in some cases at least 30% of the width W of the track 21, in some cases at least 40% of the width W of the track 22, in some cases at least 50% of the width W of the track 21, and in some cases even more (e.g., 60%, 70% or more). In this example of implementation, the width $W_q$ of the internal elastomeric material 54 inside the carcass 35 occupies at least a majority, in this case at least three-quarters, of the width W of the track 21. In this example, the internal elastomeric material 54 inside the carcass 35 is constituted of a single segment. In other embodiments, the internal elastomeric material 54 inside the carcass 35 may be constituted of separate segments (e.g., two segments) such that its width $W_q$ corresponds to a sum of a width of each of these separate segments. The width $W_q$ of the internal elastomeric material 54 inside the carcass 35 may have any other suitable value in other embodiments. As yet another example, in some embodiments, a weight of the internal elastomeric material 54 inside the carcass 35 may constitute at least 25% of a total weight of elastomeric material of the track 21, in some cases at least 30% of the total weight of elastomeric material of the track 21, in some cases at least 35% of the total weight of elastomeric material of the track 21, in some cases at least 40% of the total weight of elastomeric material of the track 21, and in some cases even more.

This arrangement of the internal elastomeric material 54 inside the carcass 35 and the elastomeric material 62, 64, 68 of the inner side 25, the ground-engaging outer side 27 and the lateral edges $\mathbf{55}_1$, $\mathbf{55}_2$ of the track 21 may be achieved by placing elastomeric components (e.g., sheets or other layers of elastomeric material and/or blocks of elastomeric material previously produced using any suitable process such as calendering, molding, etc.) in a mold and consolidating them. Different elastomeric compounds may be used in the inner side 25, the ground-engaging outer side 27 and/or the lateral edges $\mathbf{55}_1$, $\mathbf{55}_2$ of the track 21 than inside the carcass 35 (e.g., rubber compounds having different base polymers, different concentrations and/or types of carbon black, and/or different contents of sulfur or other vulcanizing agent).

The lower-density elastomeric material 50 may be implemented in any suitable way in various embodiments.

For example, in some embodiments, the lower-density elastomeric material 50 may be cellular elastomeric material (e.g., cellular rubber, a.k.a foam rubber or expanded rubber). The cellular elastomeric material 50 is elastomeric material which contains cells (e.g., bubbles) created by a foaming agent (e.g., a gas (e.g., air) or a gas-producing agent (e.g., sodium bicarbonate)) during manufacturing of the cellular elastomeric material 50. The cells of the cellular elastomeric material 50 may include closed cells and/or open cells.

For instance, the cellular elastomeric material 50 may be expanded rubber (a.k.a. foam rubber).

The cellular elastomeric material 50 may be manufactured in any suitable way. For instance, a foaming agent may be sprayed, poured or molded with an elastomeric material (e.g., rubber) to react with the elastomeric material in order to produce the cellular elastomeric material 50. The foaming agent may be azodicarbonamide (ADC), sulfonylhydrazides (OBSH, TSH and/or BSH), silica, a suitable ceramic material or any other suitable foaming agent.

The cellular elastomeric material 50 may be molded with the higher-density elastomeric material 52 in any suitable way. For instance, the cellular elastomeric material 50 may be molded in a first mold and then inserted into a second mold where it is overmolded by the higher-density elastomeric material 52.

In other embodiments, the cellular elastomeric material 50 may be molded together with the higher-density elastomeric material 52 via compression molding.

In this embodiment, the higher-density elastomeric material 52 is not cellular elastomeric material, i.e., it substantially does not contain cells created by a foaming agent during its manufacturing.

In other embodiments, both the lower-density elastomeric material 50 and the higher-density elastomeric material 52 may be cellular.

The lower-density elastomeric material 50 may constitute other parts of the track 21 and/or may otherwise be provided in different ways in the track 21 in other embodiments.

Figure 15:
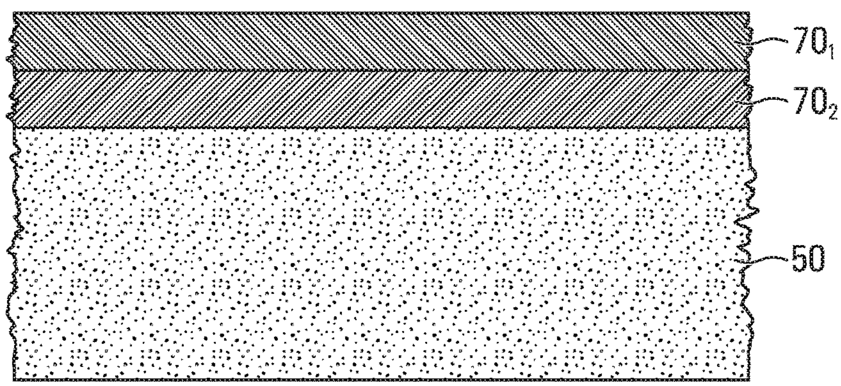
FIG. 15 shows a plurality of higher-density elastomeric materials of the track in accordance with another embodiment.

For example, in some embodiments, as shown in FIG. 15, in addition to the lower-density elastomeric material 50, the track 21 may comprise a plurality of higher-density elastomeric materials $\mathbf{70}_1$, $\mathbf{70}_2$ that have different densities and that are denser than the lower-density elastomeric material 50. For instance, the higher-density elastomeric material $\mathbf{70}_1$ may be denser than the higher-density elastomeric material $70_2$ such that the lower-density elastomeric material 50 and the higher-density elastomeric material $70_1$ have a lowest and a highest density respectively while the higher-density elastomeric material $70_2$ has a medium density. The lower-density and the higher density elastomeric materials 50, $70_1$, $70_2$ may be arranged in any suitable way. For example, the lower-density and the higher-density elastomeric materials 50, $70_1$, $70_2$ may be arranged to form a density gradient. For instance, the lower-density elastomeric material 50 may be an innermost elastomeric material, the higher-density elastomeric material $70_1$ may be an outermost elastomeric material, and the higher-density elastomeric material $70_1$ may be a middle elastomeric material.

Figure 16:
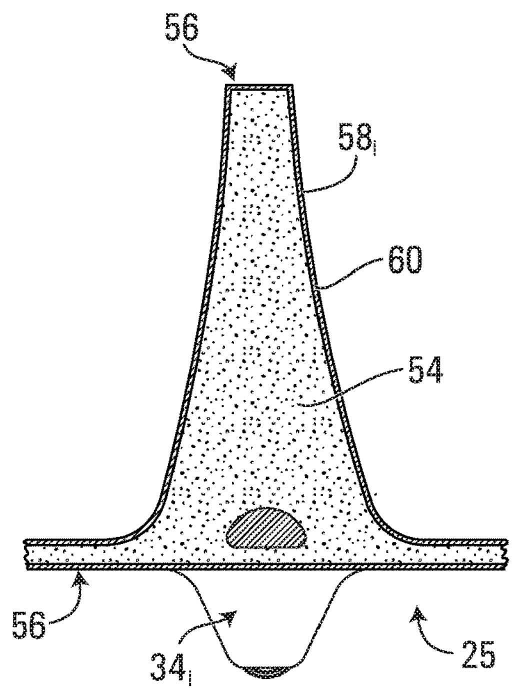
FIG. 16 shows the lower-density elastomeric material forming part of a periphery of the track in accordance with another embodiment.

In some embodiments, as shown in FIG. 16, the lower-density elastomeric material 50 may form part of the periphery 56 of the track 21. For instance, in some cases, the lower-density elastomeric material 50 may form part of the periphery 56 at the inner side 25 of the track 21 since the inner side 25 of the track 21 is less exposed to wear than the outer side 27 of the track 21. In some embodiments, the lower-density elastomeric material 50 may form part of the periphery 56 of the track 21 at the outer side 27 of the track 21.

The lower-density elastomeric material 50 may constitute at least a bulk of the elastomeric material of the track 21. For instance, the lower-density elastomeric material 50 may constitute at least a majority of the elastomeric material of the track 21. In some embodiments, the lower-density elastomeric material 50 may constitute an entirety of the elastomeric material of the track 21 (e.g., there is no higher-density elastomeric material).

In some embodiments, the lower-density elastomeric material 50 may comprise other types of material rather than cellular elastomeric material. For instance, the lower-density elastomeric material 50 may comprise any suitable low-density polymeric material. For example, the lower-density elastomeric material 50 may comprise polypropylene, polyethylene or any other suitable material.

1.3 Track with Few or No Slide Members (e.g., "Clips")

Figure 18:
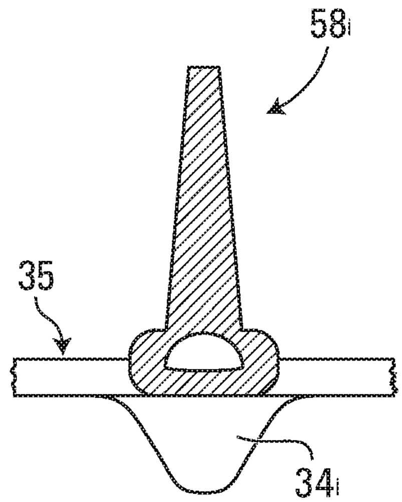
FIG. 18 shows a longitudinal cross-sectional view of part of the track in accordance with an embodiment in which the track comprises a reduced number of slide members.

In some embodiments, as shown in FIG. 18, the track 21 may have fewer or no slide member (e.g., "clips") such as the slide members $39_1$-$39_S$ to slide against the sliding surfaces $77_1$, $77_2$ of the rails $44_1$, $44_2$ of the track-engaging assembly 24.

Figure 19:
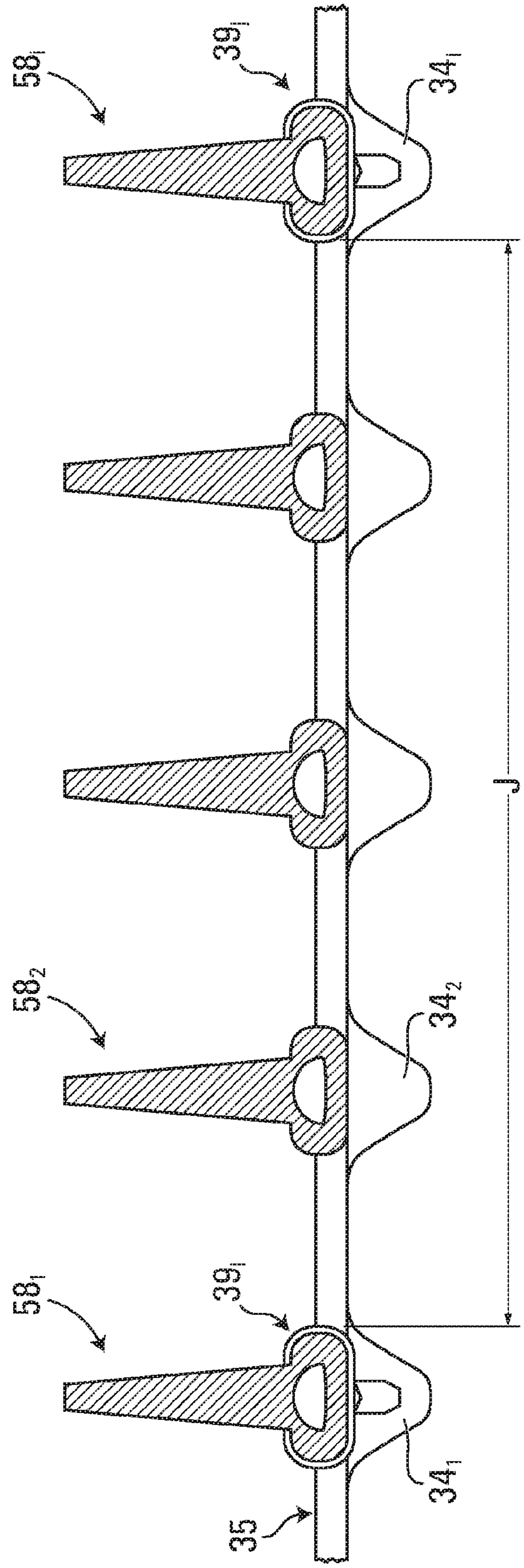
FIG. 19 shows a longitudinal cross-sectional view of part of the track of FIG. 18 illustrating a spacing between longitudinally-adjacent ones of the slide members.

For instance, in some embodiments, the track 21 may comprise the slide members $39_1$-$39_S$ in a reduced number. In such embodiments, longitudinally-adjacent ones of the slide members $39_1$-$39_S$ may be significantly spaced apart from one another. More specifically, as shown in FIG. 19, a longitudinal spacing J defined between longitudinally-adjacent ones of the slide members $39_1$-$39_S$ may be large. For example, in some cases the longitudinal spacing J may be at least one-fifth of the length of the track 21, in some cases at least one-quarter of the length of the track 21, in some cases at least one-third of the length of the track 21, in some cases at least half of the length of the track 21, and in some cases even more.

In some embodiments, the longitudinal spacing J defined between longitudinally-adjacent ones of the slide members $39_1$-$39_S$ may be such that no more than a certain number of slide members $39_1$-$39_S$ can contact a rail $44_i$ at any given instant. For example, in some cases, no more than three slide members $39_1$-$39_S$ may contact the rail $44_i$ at any given instant, in some cases no more than two slide members $39_1$-$39_S$ may contact the rail $44_i$ at any given instant, and in some cases no more than one slide member $39_1$-$39_S$ may contact the rail $44_i$ at any given instant.

In other embodiments, the track 21 may be free of slide members and thus may be referred to as a "clipless" track.

2. Different Traction Projections with Different Tractive Effects

Figure 20:
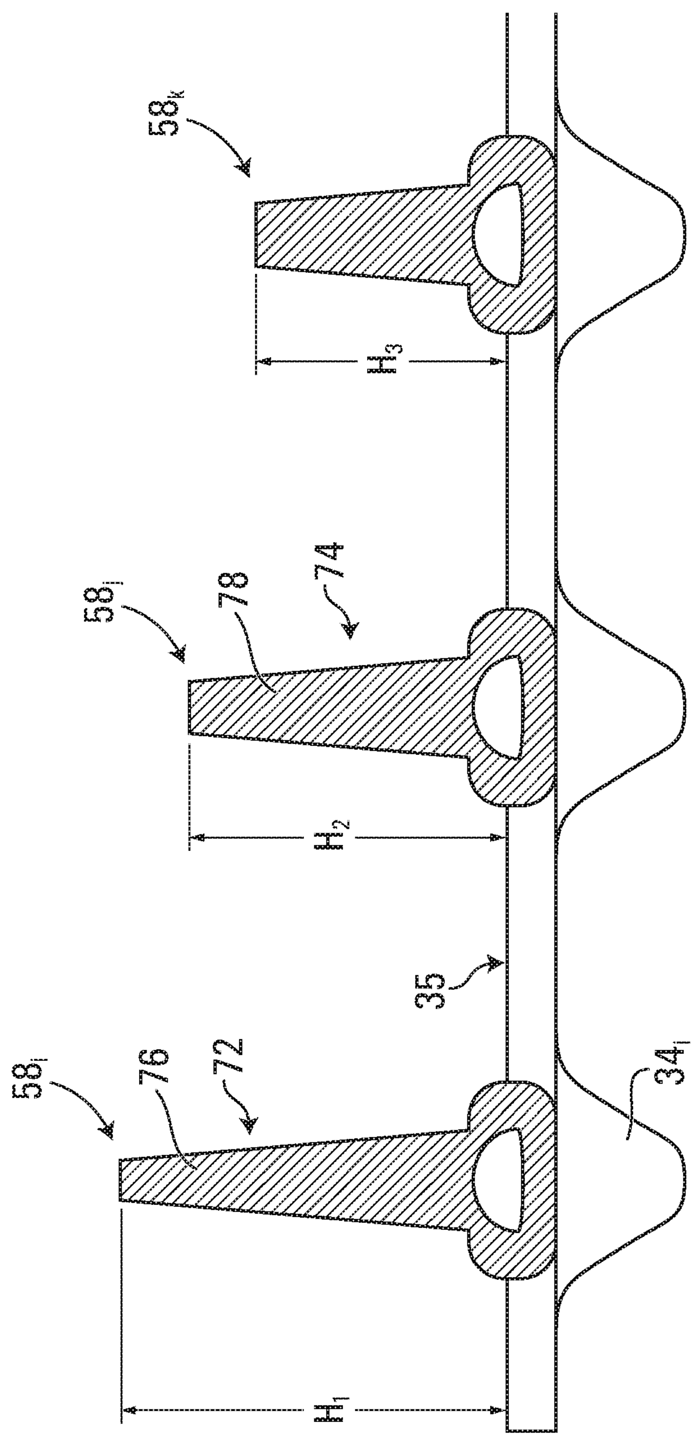
FIG. 20 shows a longitudinal cross-sectional view of part of the track in accordance with another embodiment in which traction projections of the track have different characteristics to generate different tractive effects on the ground.

In some embodiments, as shown in FIG. 20, respective ones of the traction projections $58_1$-$58_T$ may have different characteristics (e.g., different shapes and/or different rigidity characteristics) to generate different tractive effects on the ground. For instance, this may allow the track 21 to perform well in different ground conditions, such as different types of snow, soil, etc.

For example, in this embodiment, longitudinally-successive traction projections $58_i$-$58_k$ that succeed one another in the longitudinal direction of the track 21 differ in height. In this example, the height of the traction projection $58_i$ (i.e., $H_1$) is greater than the height of the traction projections $58_j$ (i.e., $H_2$), which is greater than the height of the traction projection $58_k$ (i.e., $H_3$). This pattern may be repeated over other longitudinally-successive ones of the traction projections $58_1$-$58_T$. For instance, this may allow the traction projections $58_1$-$58_T$ to have different degrees of engagement with the ground in different ground conditions.

In this embodiment, the longitudinally-successive traction projections $58_i$-$58_k$ may have different rigidity characteristics.

For instance, a taller one of the longitudinally-successive traction projections $58_i$-$58_k$ (e.g., $58_i$) may comprise an upper portion 72 that is more flexible than an upper portion 74 of a lower one of the longitudinally-successive traction projections $58_i$-$58_k$ (e.g., $58_j$). For example, a modulus of elasticity of a material 76 of the upper portion 72 of the traction projection $58_i$ may be lower than a modulus of elasticity of a material 78 of the upper portion 74 of the traction projection $58_j$.

For instance, in some embodiments, a ratio of the modulus of elasticity of the material 76 of the upper portion 72 of the traction projection $58_i$ over the modulus of elasticity of the material 78 of the upper portion 74 of the traction projection $58_i$ may be at least 1.5, in some cases at least 2, in some cases at least 2.5, in some cases at least 3, and in some cases even more.

3. Traction Projections Providing Enhanced Heat Management

Figure 21:
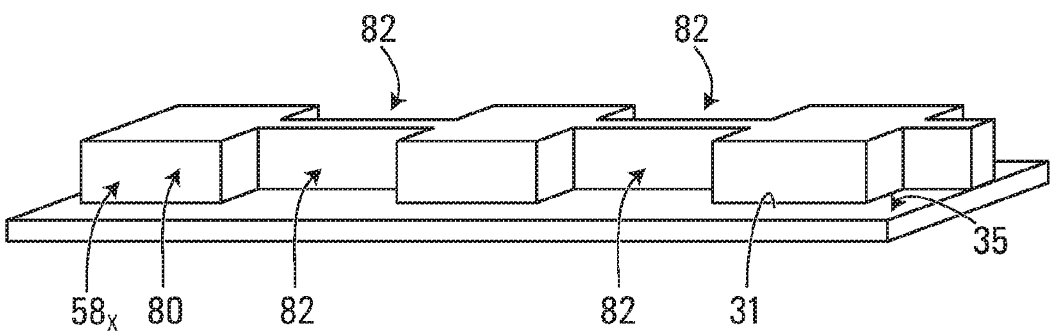
FIGS. 21 and 22 show a perspective view and a top view of a cross-section of the traction projections of the track in accordance with another embodiment.
Figure 22:
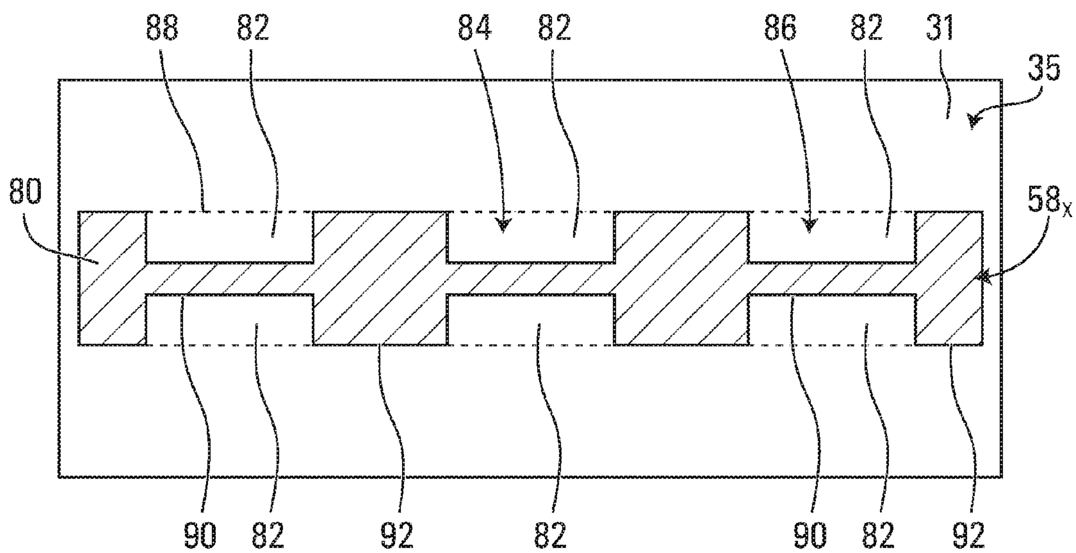

In some embodiments, as shown in FIGS. 21 and 22, respective ones of the traction projections $58_1$-$58_T$ may be configured to allow the track 21 to better manage heat generated within its elastomeric material as it moves around the track-engaging assembly 24. Notably, this may reduce heat buildup within the track 21 by allowing more heat to be transferred to the track's environment.

For example, in some embodiments, a traction projection $58_x$ may be designed such that a base 80 of the traction projection $58_x$ from which it projects from the carcass 35 leaves more of the ground-engaging outer surface 31 of the carcass 35 exposed to facilitate transfer of heat from the carcass 35 to the track's environment. This may thus reduce heat buildup within the carcass 35.

In this embodiment, the traction projection $58_x$ comprises a recessed space 82 that defines a recessed area 84 at the base 80 of the traction projection $58_x$ which leaves an open area 86 of the ground-engaging outer surface 31 of the carcass 35 exposed. The recessed area 84 at the base 80 of the traction projection $58_x$ is delimited by an imaginary boundary 88 made up of the base 80 of the traction projection $\mathbf{58}_x$ and straight lines circumscribing the base 80 of the traction projection $\mathbf{58}_x$.

The recessed area 84 at the base 80 of the traction projection $\mathbf{58}_x$ may be significant in relation to a cross-sectional area of the base 80 of the traction projection $\mathbf{58}_x$. For example, in some embodiments, a ratio of the recessed area 84 at the base 80 of the traction projection $\mathbf{58}_x$ over the cross-sectional area of the base 80 of the traction projection $\mathbf{58}_x$ may be at least 30%, in some cases at least 40%, in some cases at least 50%, in some cases at least 60%, in some cases at least 70%, in some cases at least 80%, and in some cases even more. This ratio may have any other suitable value in other embodiments.

In this embodiment, the traction projection $\mathbf{58}_x$ comprises narrow portions 90 and enlarged portions 92 that are larger than the narrow portions 90 in the longitudinal direction of the track 21. For instance, the narrow portions 90 may be walls forming "paddles" and the enlarged portions 92 may be blocks forming "columns".

In some embodiments, a ratio of a dimension of a narrow portion 90 over a dimension of an enlarged portion 92 in the longitudinal direction of the track 21 may be at least 0.05, in some cases at least 0.1, in some cases at least 0.15, in some cases at least 0.2 and in some cases even more (e.g., 0.25, 0.3, etc.). Moreover, in some embodiments, a ratio of a dimension of a narrow portion 90 over a dimension of an enlarged portion 92 in the widthwise direction of the track 21 may be at least 1, in some cases at least 1.5, in some cases at least 2, in some cases at least 2.5 and in some cases even more (e.g., 3).

The recessed space 82 and the recessed area 84 at the base 80 of the traction projection $\mathbf{58}_x$ may be configured in any other suitable way in other embodiments.

4. Enhancement Based on Spacing of Traction Projections

Figure 5:
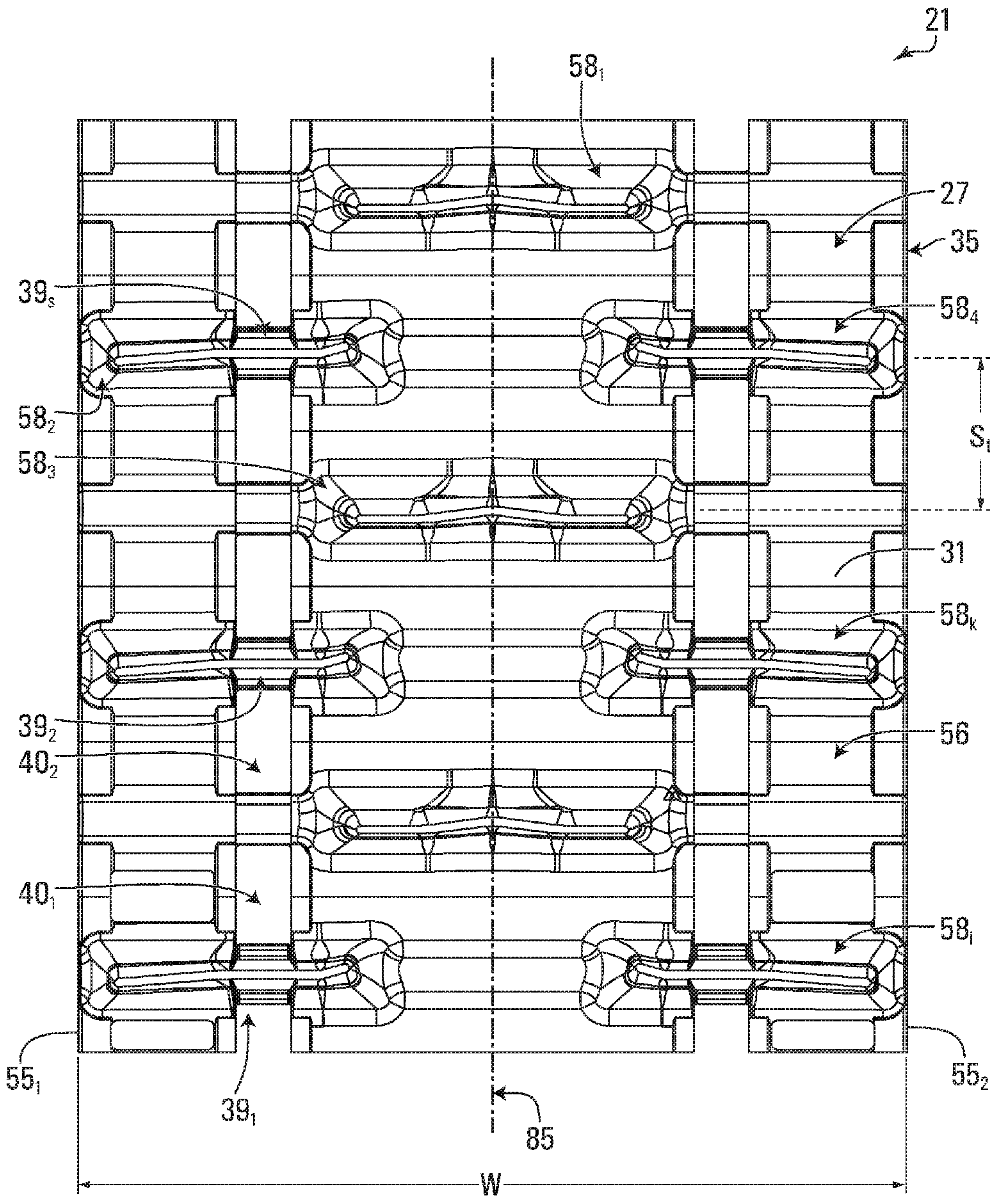
Figure 6:
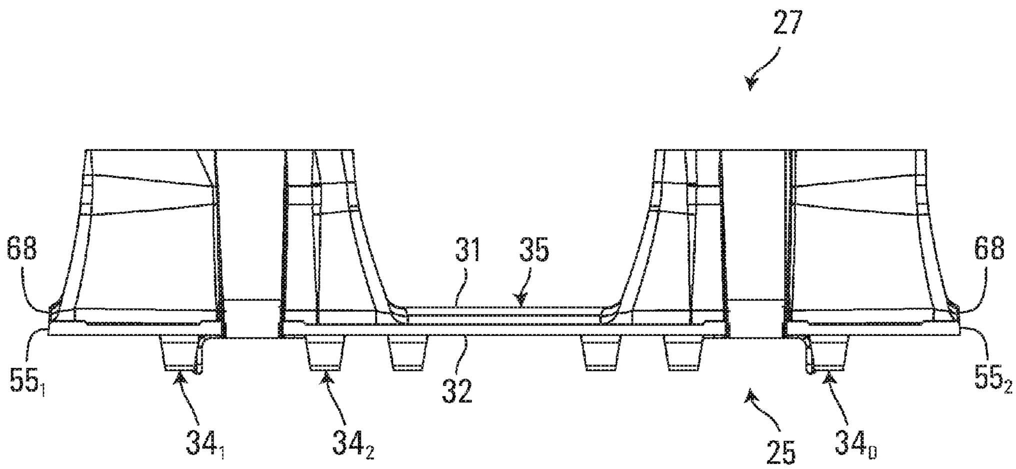

In some embodiments, as shown in FIG. 5, a longitudinal spacing $S_t$ of adjacent traction projections $\mathbf{58}_i$, $\mathbf{58}_j$ (i.e., a spacing of the adjacent traction projections $\mathbf{58}_i$, $\mathbf{58}_j$ in the longitudinal direction of the track 21), which can be referred to as a "pitch" of the adjacent traction projections $\mathbf{58}_i$, $\mathbf{58}_j$, may be used to improve a performance of the track 21.

Figure 23:
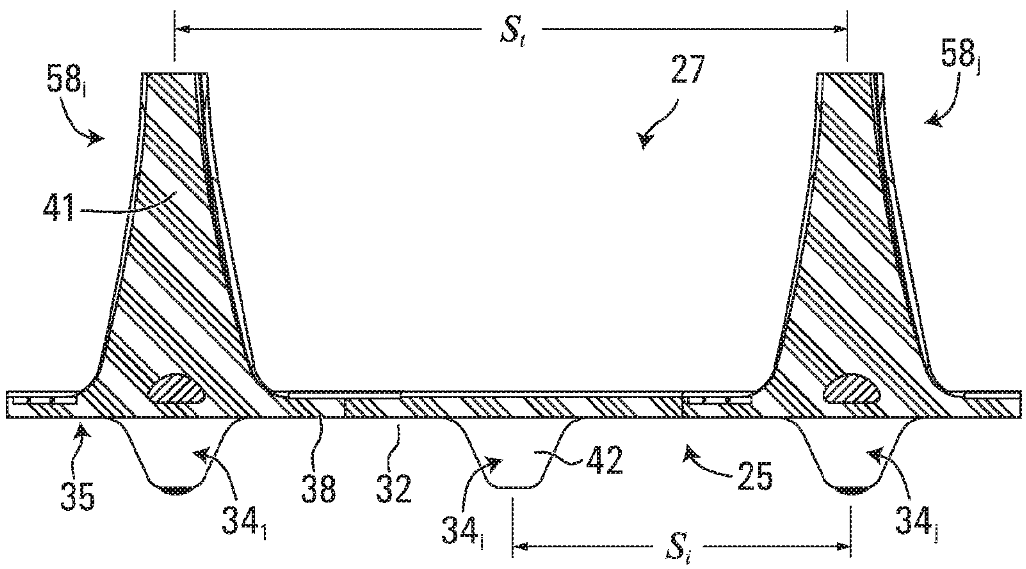
FIG. 23 shows a longitudinal cross-sectional view of part of the track in accordance with another embodiment in which a pitch of traction projections is greater than a pitch of drive/guide lugs of the track.

For example, in some embodiments, as shown in FIG. 23, the pitch $S_t$ of the adjacent traction projections $\mathbf{58}_i$, $\mathbf{58}_j$ may be greater than a longitudinal spacing $S_i$ of adjacent drive/guide lugs $\mathbf{34}_i$, $\mathbf{34}_j$ (i.e., a spacing of the adjacent drive/guide lugs $\mathbf{34}_i$, $\mathbf{34}_j$ in the longitudinal direction of the track 21), which can be referred to as a "pitch" of the adjacent drive/guide lugs $\mathbf{34}_i$, $\mathbf{34}_j$. For instance, in some embodiments, a ratio of the pitch $S_t$ of the adjacent traction projections $\mathbf{58}_i$, $\mathbf{58}_j$ over the pitch $S_i$ of the adjacent drive/guide lugs $\mathbf{34}_i$, $\mathbf{34}_j$ may be at least 1.2, in some cases at least 1.5, in some cases at least 2, in some cases at least 3, and in some cases even more. This ration may have any other suitable value in other embodiments.

In some examples of implementation, the pitch $S_t$ of the adjacent traction projections $\mathbf{58}_i$, $\mathbf{58}_j$ may be such that at least two of the holes (i.e., windows) $\mathbf{40}_1$-$\mathbf{40}_H$ of the track 21 that succeed one another in the longitudinal direction of the track 21 are disposed between the adjacent traction projections $\mathbf{58}_i$, $\mathbf{58}_j$.

Moreover, in some examples of implementation, the pitch $S_t$ of the adjacent traction projections $\mathbf{58}_i$, $\mathbf{58}_j$ may be such that at least two of the reinforcements $\mathbf{45}_x$ of the track 21 that succeed one another in the longitudinal direction of the track 21 are disposed between the traction projections $\mathbf{58}_i$, $\mathbf{58}_j$.

Figure 24:
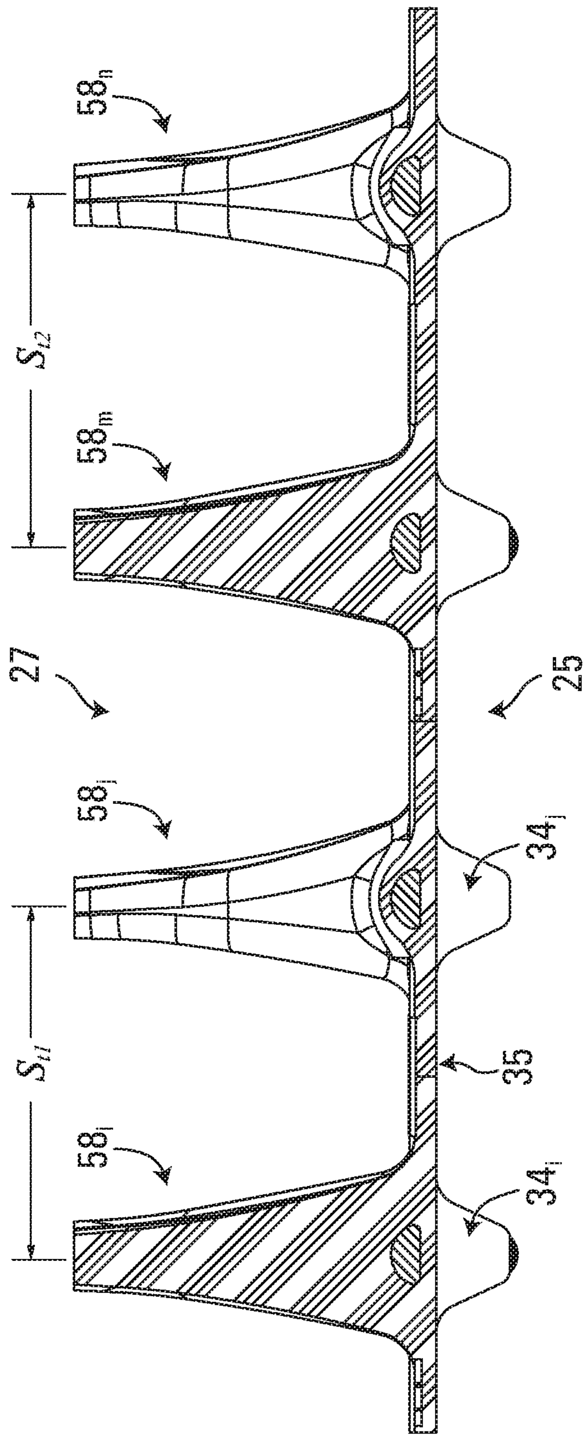
FIG. 24 shows a longitudinal cross-sectional view of part of the track in accordance with another embodiment in which the pitch of adjacent traction projections is variable.

In some embodiments, as shown in FIG. 24, the pitch $S_t$ of adjacent ones of the traction projections $\mathbf{58}_1$-$\mathbf{58}_T$ may vary in the longitudinal direction of the track 21 such that the pitch $S_t$ of the adjacent traction projections $\mathbf{58}_i$, $\mathbf{58}_j$ is different from the pitch $S_t$ of adjacent traction projections $\mathbf{58}_m$, $\mathbf{58}_n$.

For instance, in some embodiments, a ratio of the pitch $S_t$ of the adjacent traction projections $\mathbf{58}_i$, $\mathbf{58}_j$ over the pitch $S_t$ of adjacent traction projections $\mathbf{58}_m$, $\mathbf{58}_n$ may be at least 1, in some cases at least 1.5, in some cases at least 2, and in some cases even more.

In some embodiments, certain ones of the traction projections $\mathbf{58}_1$-$\mathbf{58}_T$ may be misaligned with respect to one another in the widthwise direction of the track 21. For instance, certain ones of the traction projections $\mathbf{58}_1$-$\mathbf{58}_T$ may not overlap with one another in the widthwise direction of the track 21. For example, certain traction projections $\mathbf{58}_1$-$\mathbf{58}_T$ may be "side" traction projections $\mathbf{58}_1$-$\mathbf{58}_T$ that are disposed substantially to a side of the track 21 in the widthwise direction of the track 21 while other ones of the traction projections $\mathbf{58}_1$-$\mathbf{58}_T$ may be "center" traction projections $\mathbf{58}_1$-$\mathbf{58}_T$ that are disposed substantially centrally of the track 21 in the widthwise direction of the track 21. A pitch of the side traction projections may be different from a pitch of the center traction projections. For example, a ratio of the pith of the side traction projections over the pitch of the center traction projections may be no more than 0.9, in some cases no more than 0.8, in some cases no more than 0.7, and in some cases even less. This ratio may have any suitable value in other embodiments.

5. Enhanced Resistance to Lateral Skidding

Figure 25:
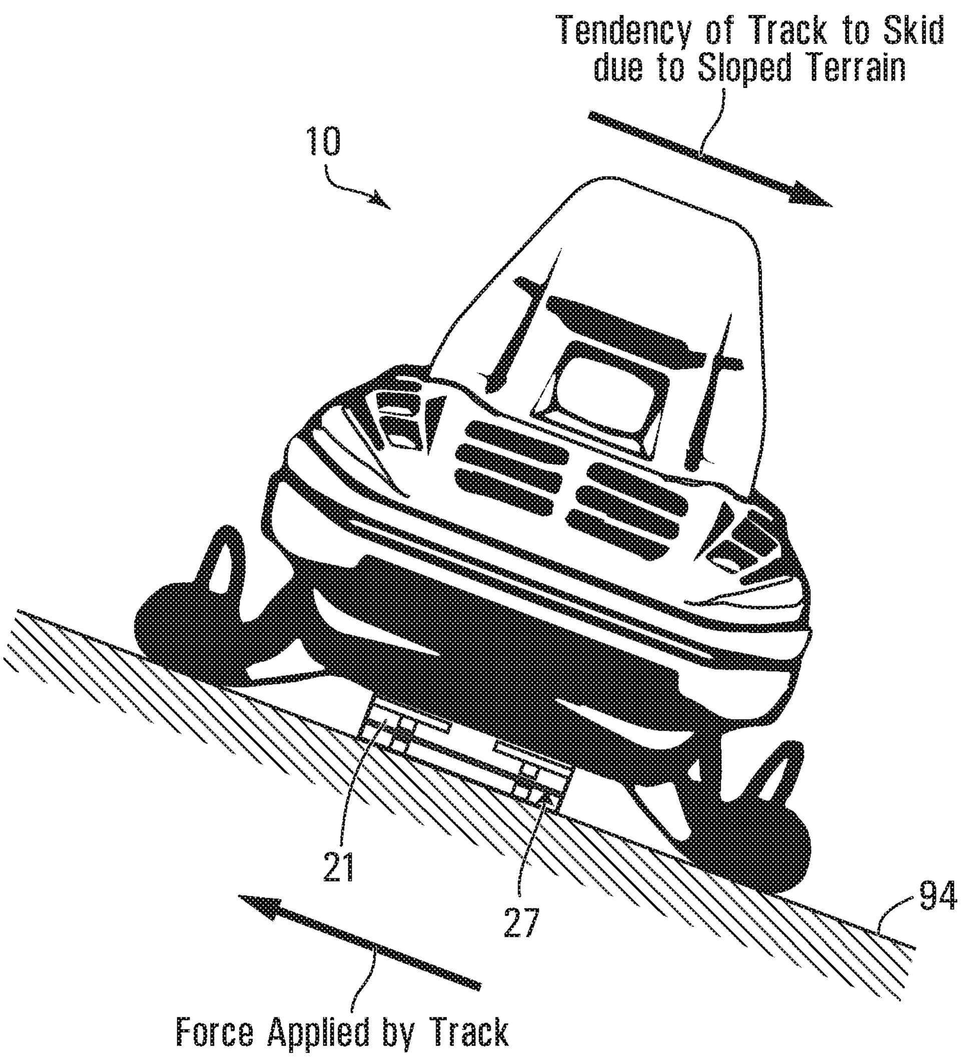
FIG. 25 shows an embodiment of the track in which the track opposes a tendency of the track to skid sideways when the snowmobile is travelling in a given direction.
Figure 26:
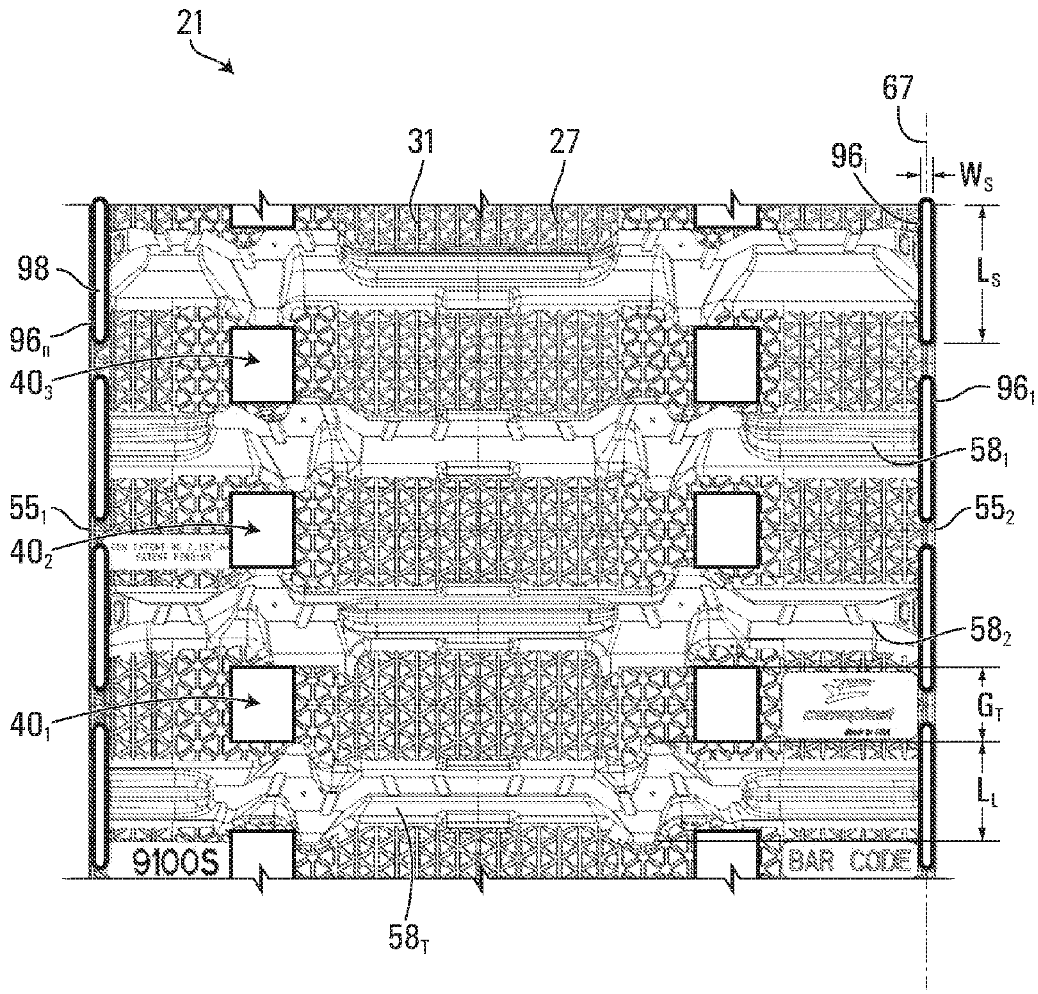
FIG. 26 shows a plan view of the ground-engaging outer side of the track of FIG. 25, including a plurality of lateral stabilizers of the track.

In some embodiments, as shown in FIGS. 25 and 26, the ground-engaging outer side 27 of the track 21 may be configured to oppose a tendency of the track 21 to skid sideways (i.e., laterally) when the snowmobile 10 is travelling in a given direction, such as, for example, when the snowmobile 10 is travelling on (e.g., crossing) a slope terrain 94 like a side hill or other inclined ground area.

For example, in some embodiments, the ground-engaging outer side 27 of the track 21 may comprise lateral stabilizers $\mathbf{96}_1$-$\mathbf{96}_n$ projecting from the ground-engaging outer surface 31 to oppose a tendency of the track 21 to skid transversely to a direction of motion of the snowmobile 10. In this embodiment, each of the lateral stabilizers $\mathbf{96}_1$-$\mathbf{96}_n$ comprises elastomeric material 98. The lateral stabilizers $\mathbf{96}_1$-$\mathbf{96}_n$ can be provided and connected to the carcass 35 in the mold during the track's molding process.

Where the snowmobile 10 travels such that there is a tendency of the track 21 to skid sideways to the snowmobile's direction of motion, such as on the slope terrain 94, the lateral stabilizers $\mathbf{96}_1$-$\mathbf{96}_n$ generate lateral forces that oppose the tendency of the track 21 to skid sideways. This may facilitate keeping the snowmobile 10 in its direction of motion on the slope terrain 94.

In this embodiment, the lateral stabilizers $\mathbf{96}_1$-$\mathbf{96}_n$ are located adjacent to the lateral edges $\mathbf{55}_1$, $\mathbf{55}_2$ of the track 21. In this example, the lateral stabilizers $\mathbf{96}_1$-$\mathbf{96}_n$ are located at longitudinal ends of respective ones of the traction projections $\mathbf{58}_1$-$\mathbf{58}_T$.

Figure 27:
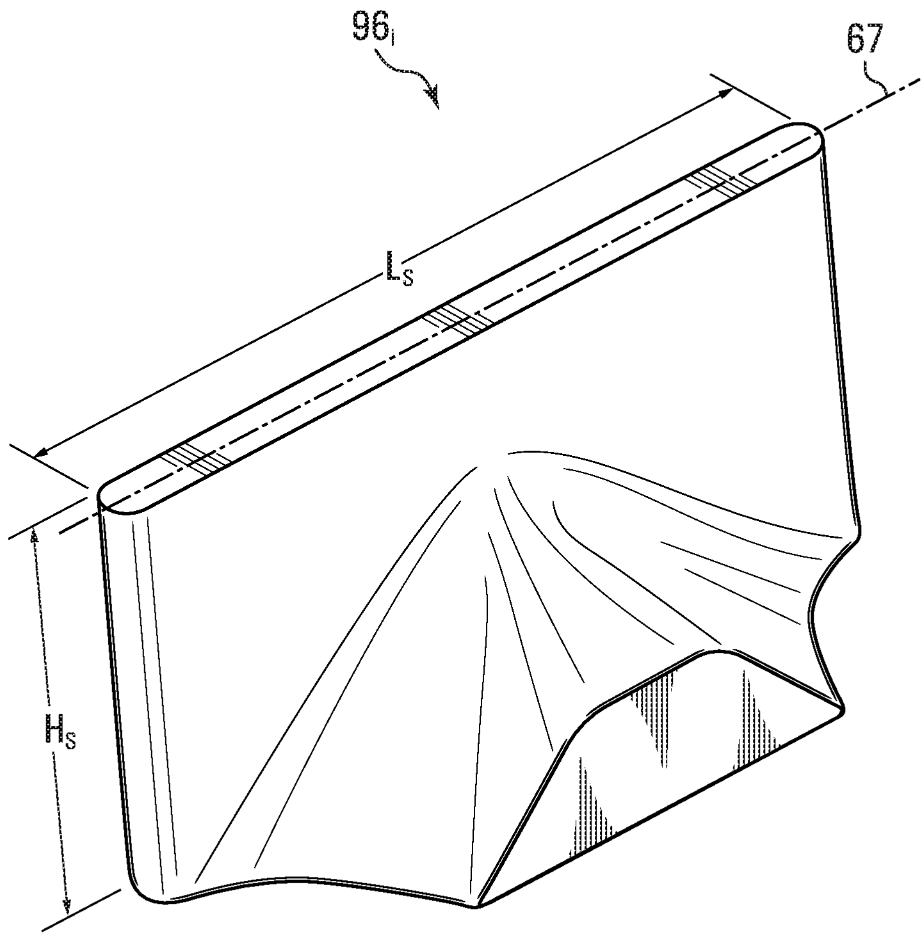
FIG. 27 shows a perspective view of a lateral stabilizer of the plurality of lateral stabilizers of FIG. 26.

In this embodiment, as shown in FIG. 27, each lateral stabilizer $\mathbf{96}_i$ is elongated transversally to the widthwise direction of the track 21. More particularly, the lateral stabilizer $\mathbf{96}_i$ has a longitudinal axis 67 that is transversal to the widthwise direction of the track 21 and defines its length $L_S$, a width $W_L$ normal to its longitudinal axis 67, and a height $H_S$ in the thickness direction of the track 21. In this example, the longitudinal axis 67 of the lateral stabilizer $\mathbf{96}_i$ is substantially normal to the widthwise direction of the track 21, i.e., substantially parallel to the longitudinal direction of the track 21.

In this embodiment, the lateral stabilizer $96_i$ protrudes, in the longitudinal direction, beyond a traction projection $58_x$ at the end of which it is located. As such, the length $L_S$ of the lateral stabilizer $96_i$ is greater than a front-to-rear dimension $L_L$ of the traction projection $58_x$. For example, in some cases a ratio $L_S/L_L$ of the length of the lateral stabilizer $96_i$ to the front-to-rear dimension $L_L$ of the traction projection $58_x$ may be at least 1.2, in some cases at least 1.3, in some cases at least 1.4, in some cases at least 1.5, and in some cases even more (e.g., 2 or more).

The lateral stabilizers $96_1$-$96_n$ are arranged to occupy a significant part of a gap $G_T$ in the longitudinal direction of the track 21 between adjacent ones of the traction projections $58_1$-$58_T$. For instance, in this embodiment, adjacent lateral stabilizers $96_i$, $96_j$ occupy a significant part of the gap $G_T$ between adjacent traction projections $58_i$, $58_j$. For example, the lateral stabilizers $96_i$, $96_j$ occupy at least a majority of the gap $G_T$ between the traction projections $58_i$, $58_j$, in some cases at least two-thirds the gap $G_T$ between the traction projections $58_i$, $58_j$, in some cases at least three-quarters of the gap $G_T$ between the traction projections $58_i$, $58_j$, and in some cases even more (e.g., up to an entirety of the gap $G_T$ between the traction projections $58_i$, $58_j$).

Figure 28:
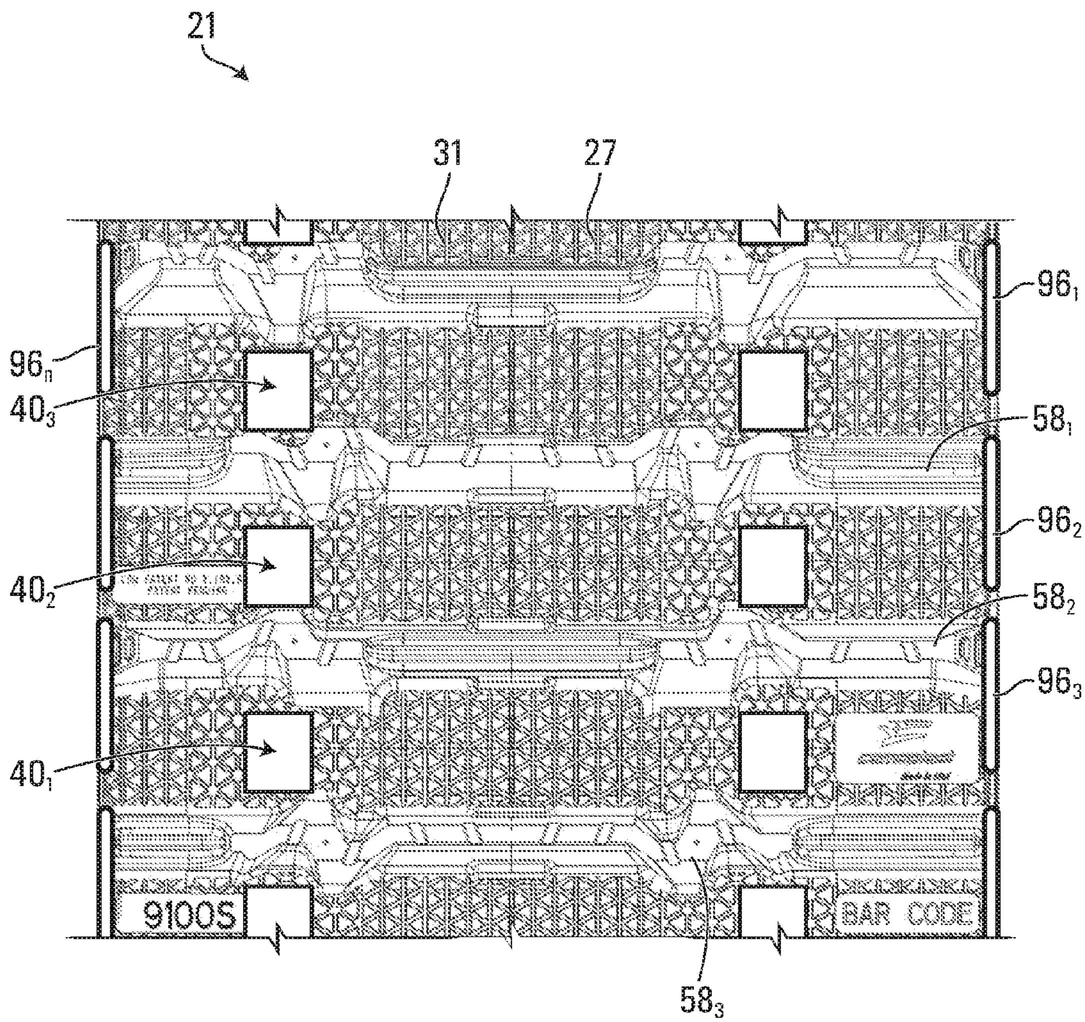
FIGS. 28 to 32 show plan views of the ground-engaging side of the track in accordance with different embodiments in which the lateral stabilizers are configured differently on the track.

In a variant, with additional reference to FIG. 28, a single lateral stabilizer $96_i$ may occupy at least majority of the gap $G_T$ between the traction projections $58_i$, $58_j$, in some cases at least two-thirds the gap $G_T$ between the traction projections $58_i$, $58_j$, in some cases at least three-quarters of the gap $G_T$ between the traction projections $61_i$, $61_j$, and in some cases even more (e.g., up to an entirety of the gap $G_T$ between the traction projections $61_i$, $61_j$).

Figure 29:
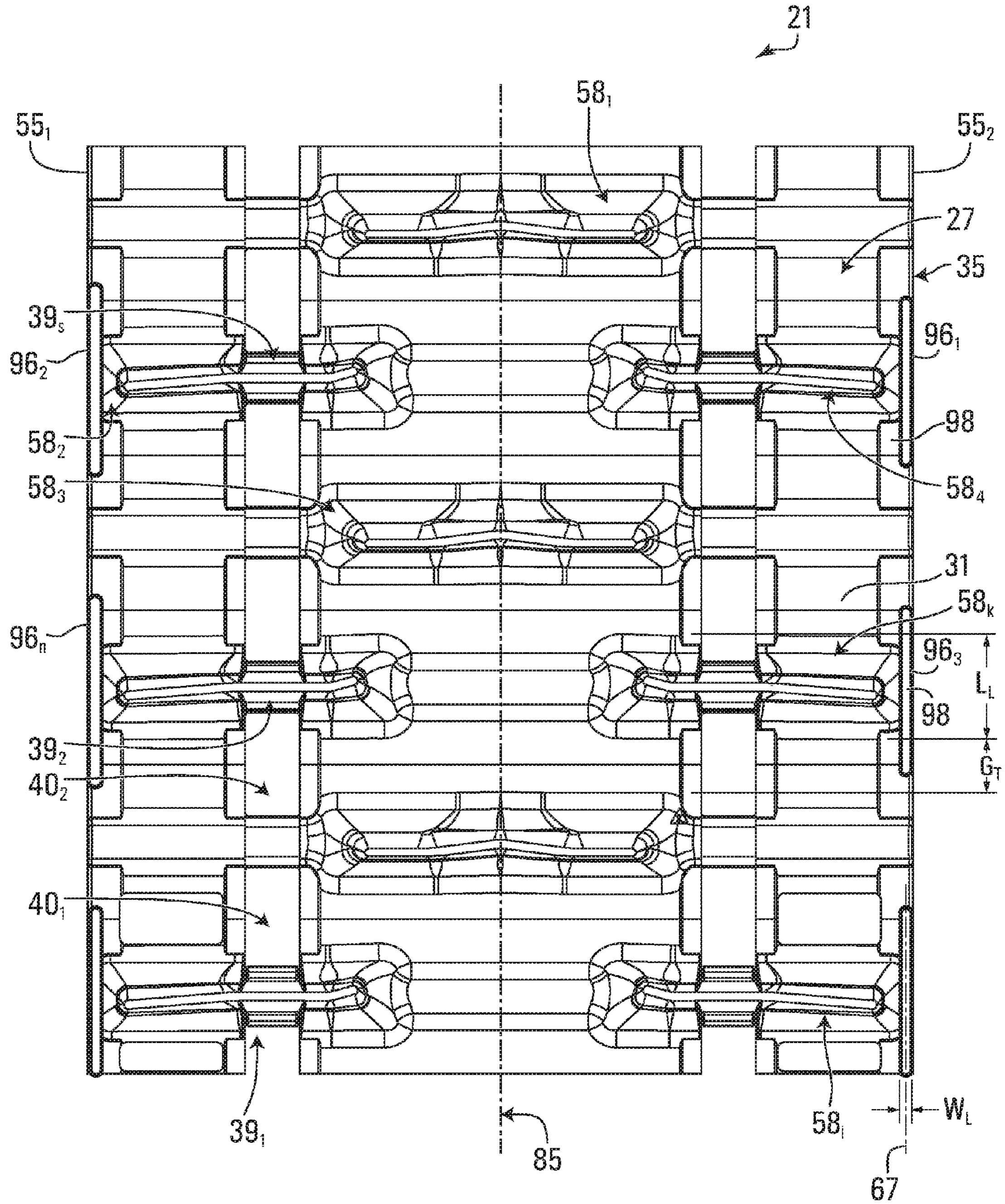

In a variant, with additional reference to FIG. 29, the lateral stabilizers $96_1$-$96_n$ may be disposed at the longitudinal ends of selected ones of the traction projections $58_1$-$58_T$, i.e., the lateral stabilizers $96_1$-$96_n$ may not be disposed at the longitudinal ends of each traction projection $58_i$. For instance, the lateral stabilizers may be distributed in the longitudinal direction of the track 21 such that a pitch of the lateral stabilizers (i.e., a spacing between adjacent lateral stabilizers $96_i$, $96_j$ is different than the pitch $S_t$ of the traction projections $58_1$-$58_T$. In this example, the lateral stabilizers $96_1$-$96_n$ are disposed at longitudinal ends of every second traction projection $58_i$ in the longitudinal direction of the track 21. In other words, the pitch of the lateral stabilizers is twice the pitch $S_t$ of the traction projections $58_1$-$58_T$. In other words, a ratio of the pitch of the lateral stabilizers $96_1$-$96_n$ over the pitch $S_t$ of the traction projections $58_1$-$58_T$ may be at least 1, in some cases at least 2, in some cases at least 3, in some cases at least 4, and in some cases even more.

Figure 30:
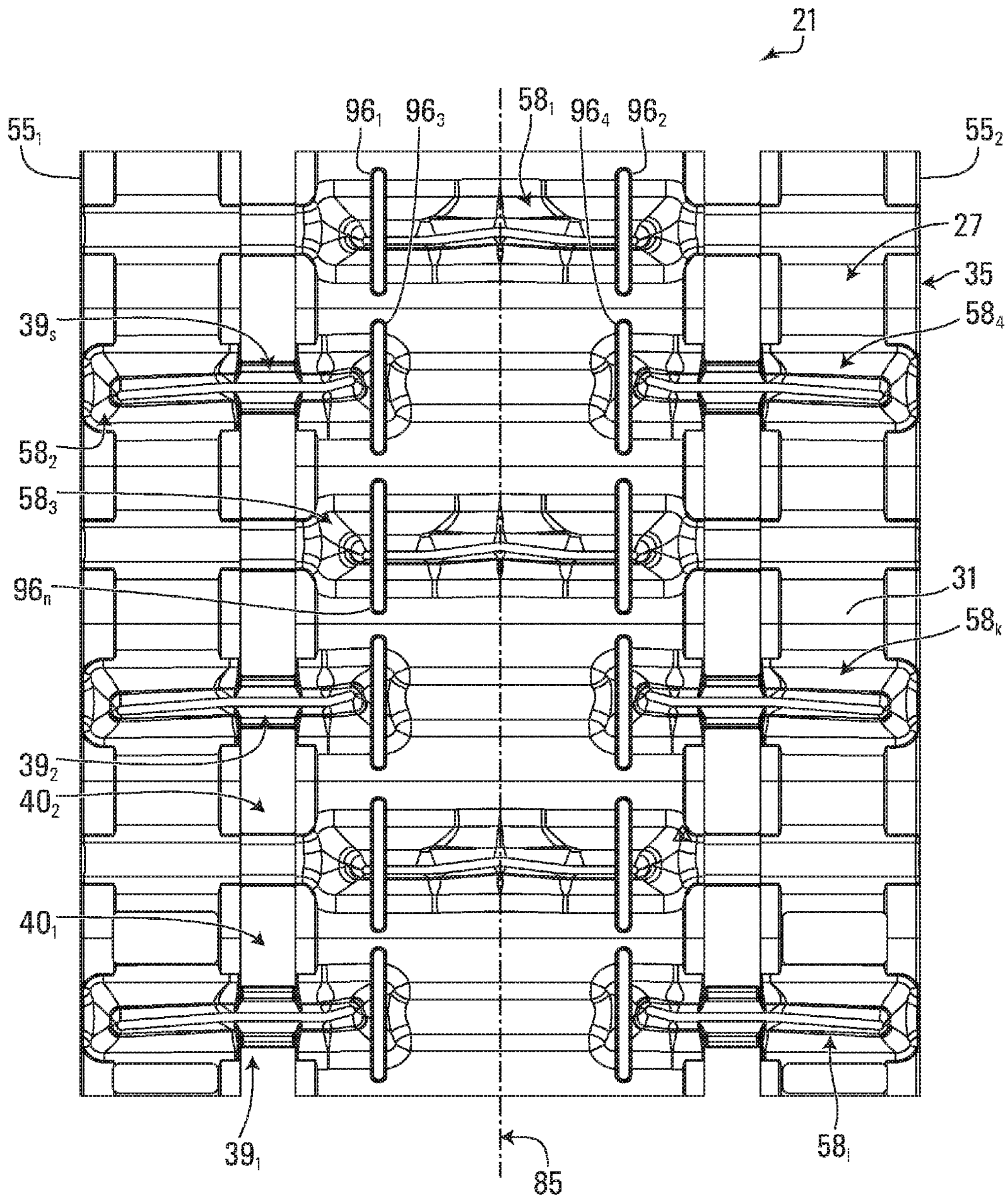

In another variant, with additional reference to FIG. 30, a lateral stabilizer $96_i$ may be located away from the lateral edges $55_1$, $55_2$ of the track 21. For instance, the lateral stabilizer $96_i$ may be located remote from the longitudinal ends of the traction projections $58_1$-$58_T$. For example, the lateral stabilizer $96_i$ may be located in a center region of the track 21 (i.e., a center region in the widthwise direction of the track 21). More particularly, in this example, the lateral stabilizer $96_i$ is located in a center third of the width W of the track 21.

Figure 31:
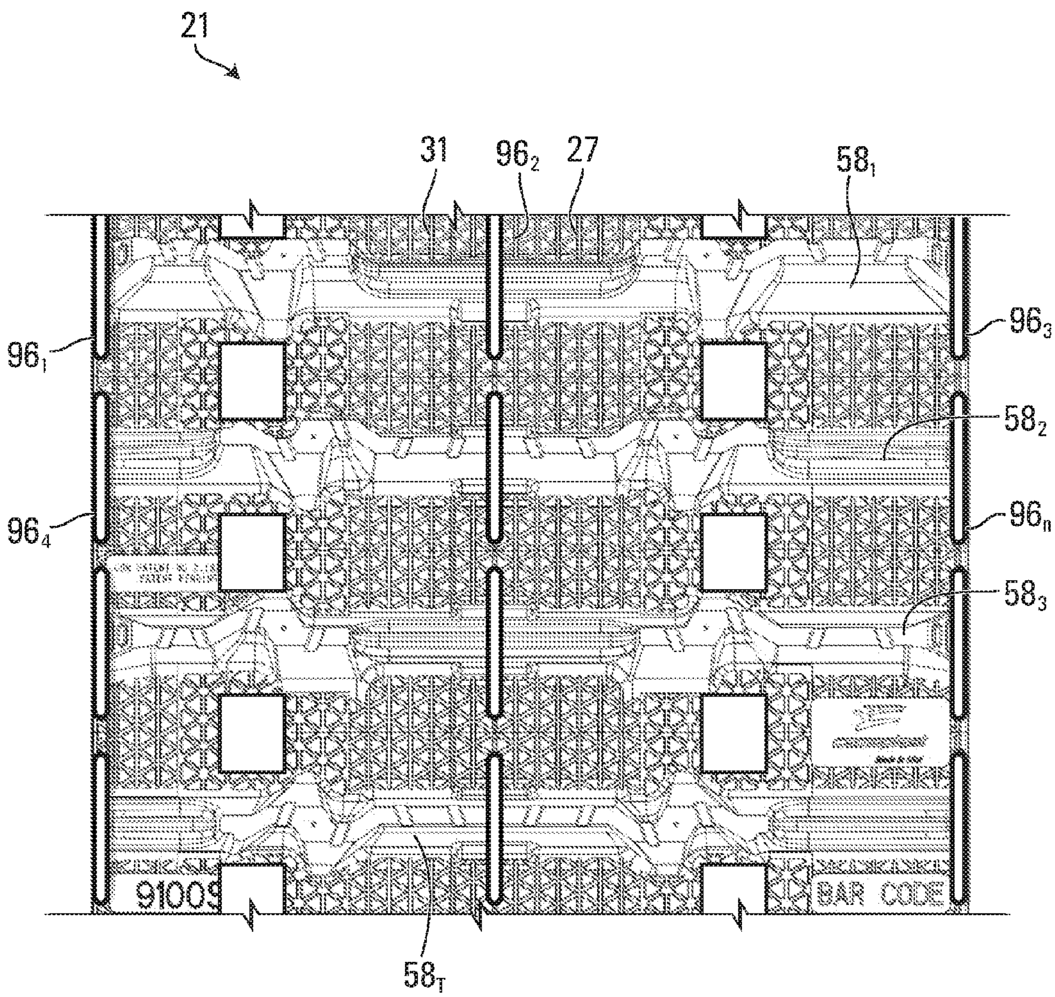

In another variant, with additional reference to FIG. 31, the track 21 may comprise any number of lateral stabilizers $96_1$-$96_n$ that are spaced apart in the widthwise direction of the track 21 but overlapping in the longitudinal direction of the track 21. For instance, while the embodiment of FIG. 26 shows two lateral stabilizers $96_i$, $96_j$ that are spaced apart in the widthwise direction of the track 21 and overlapping in the longitudinal direction of the track 21, in this variant, the track 21 may comprise at least three lateral stabilizers $96_1$-$96_n$ that are spaced apart in the widthwise direction of the track 21 and overlapping in the longitudinal direction of the track 21. In some cases, the track 21 may comprise more lateral stabilizers $96_1$-$96_n$ (e.g., four) that are spaced apart in the widthwise direction of the track 21 and overlapping in the longitudinal direction of the track 21.

Figure 32:
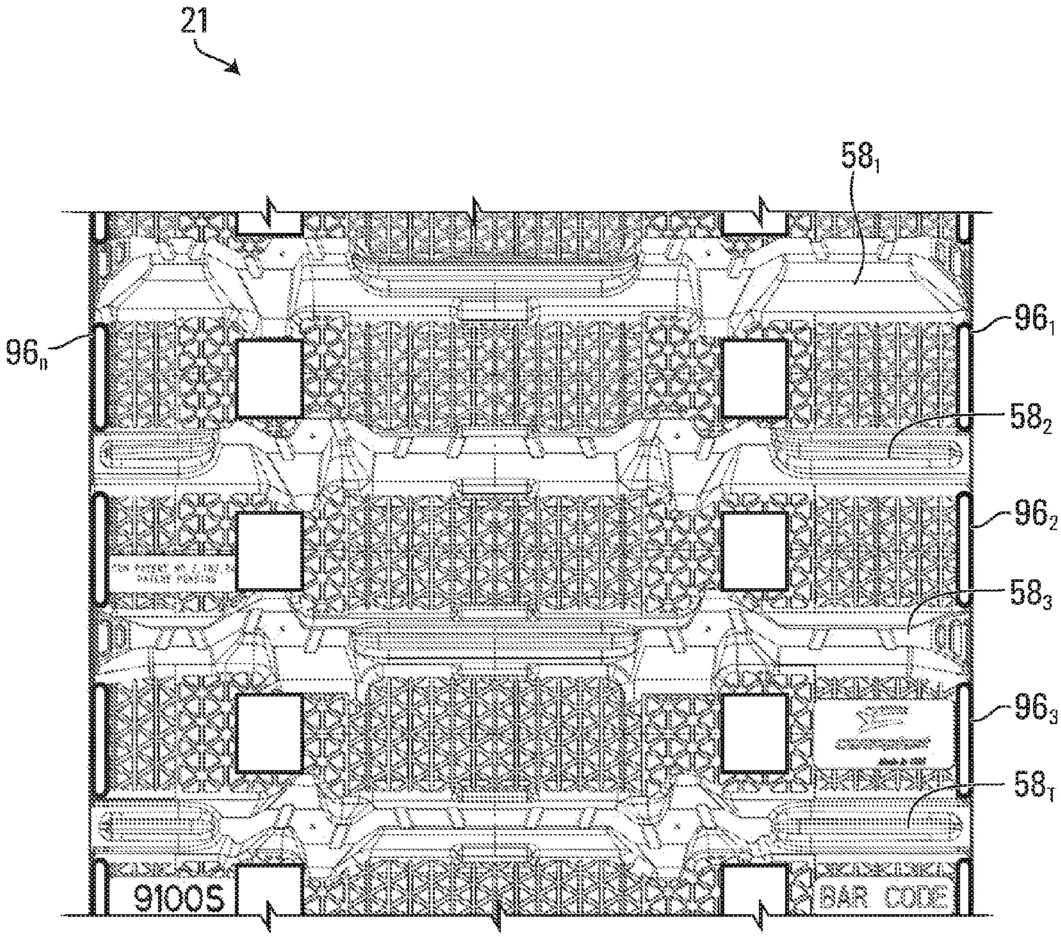

In yet another variant, a lateral stabilizer $96_i$ may be located between successive ones of the traction projections $58_1$-$58_T$ in the longitudinal direction of the track 21. For example, as shown in FIG. 32, each lateral stabilizer $96_i$ may be located between successive ones of the traction projections $58_1$-$58_T$ in the longitudinal direction of the track 21 such that lateral stabilizers $96_i$, $96_j$ that are spaced apart in the widthwise direction of the track 21 and overlapping in the longitudinal direction of the track 21 do not overlap with a traction projection $58_i$ in the longitudinal direction of the track 21.

Figure 33:
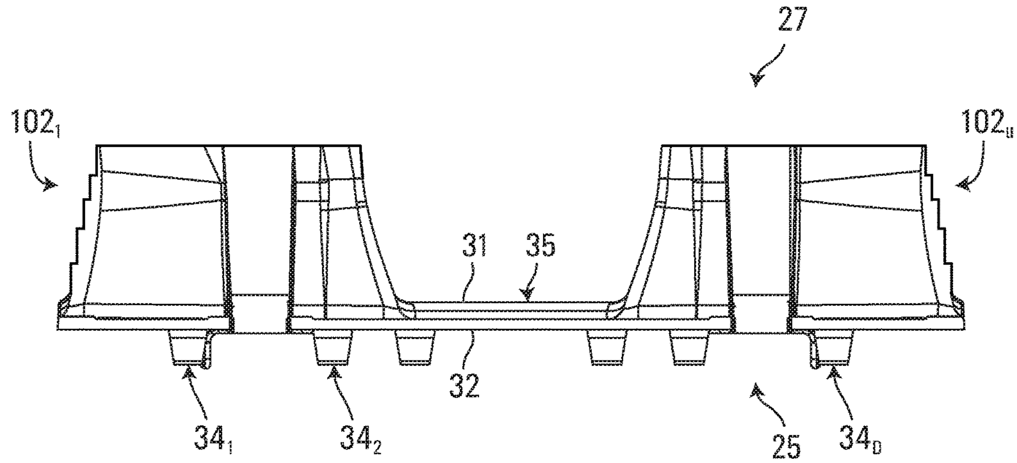
FIG. 33 shows an elevation view of the track in accordance with an embodiment in which the ground-engaging outer side of the track comprises uneven surfaces.
Figure 34:
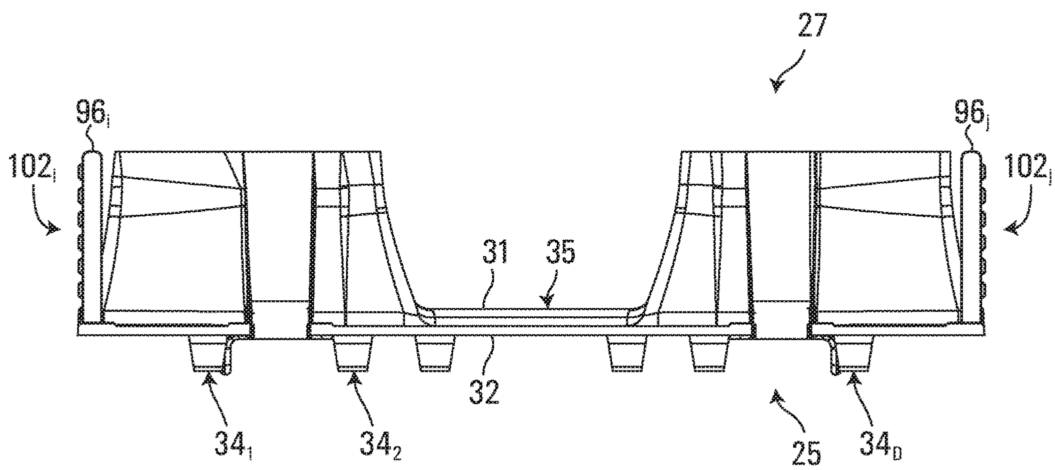
FIG. 34 shows an elevation view of the track in accordance with an embodiment in which the lateral stabilizers of the track comprise the uneven surfaces.

In some embodiments, as shown in FIG. 33, the ground-engaging outer side 27 of the track 21 may comprise uneven surfaces $102_1$-$102_U$ that project from the ground-engaging outer surface 31 and have a texture 104 to oppose a tendency of the track 21 to skid transversely to the direction of motion of the snowmobile 10. The uneven surfaces $102_1$-$102_U$ of the ground-engaging outer side 27 of the track 21 may be part of the traction projections $58_1$-$58_T$ and/or the lateral stabilizers $96_1$-$96_n$, if present. For instance, the uneven surfaces $102_1$-$102_U$ may be part of a lateral surface (i.e., a surface facing transversally of the longitudinal direction of the track system 14) of the traction projections $58_1$-$58_T$ and/or the lateral stabilizers $96_1$-$96_n$. For example, the uneven surfaces $102_1$-$102_U$ may be part of an outer lateral surface of a traction projections $58_i$ (i.e., a lateral surface of a traction projections $58_i$ that is closest to a lateral edge $55_i$ of the track 21). Moreover, in some examples, as shown in FIG. 34, the uneven surfaces $102_1$-$102_U$ may be part of an outer lateral surface of a lateral stabilizer $96_i$ (i.e., a lateral surface of a lateral stabilizer $96_i$ that is closest to a lateral edge $55_i$ of the track 21).

The texture 104 comprises a plurality of formations $106_1$-$106_F$ that increase friction to oppose a tendency of the track 21 to skid transversely to the direction of motion of the snowmobile 10. More particularly, the formations $106_1$-$106_F$ provide an increased number of ground-engaging faces on the lateral surfaces of the traction projections $58_1$-$58_T$ and/or the lateral stabilizers $96_1$-$96_n$ such that the traction projections $58_1$-$58_T$ and/or the lateral stabilizers $96_1$-$96_n$ have an increased frictional engagement with the ground to oppose a tendency of the track 21 to skid transversely to the direction of motion of the snowmobile 10.

The formations $106_1$-$106_F$ may be configured in various ways in various embodiments.

Figure 35A:
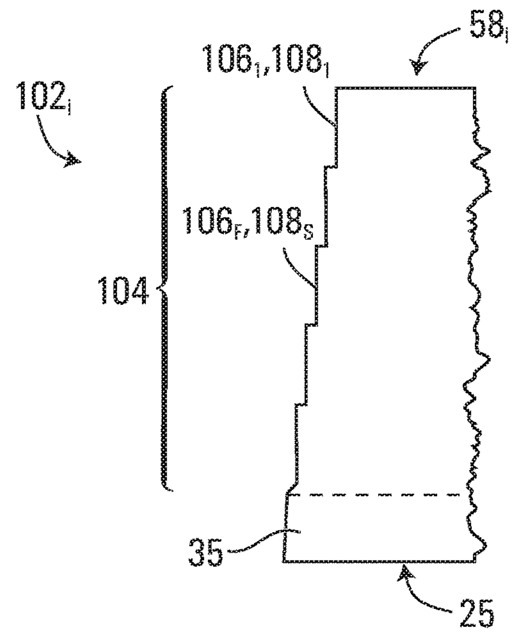
FIGS. 35A to 35D show different examples of formations of a texture of the uneven surfaces of FIGS. 33 and 34.
Figure 35B:
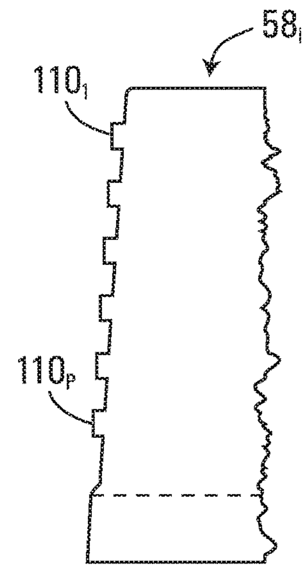
Figure 35C:
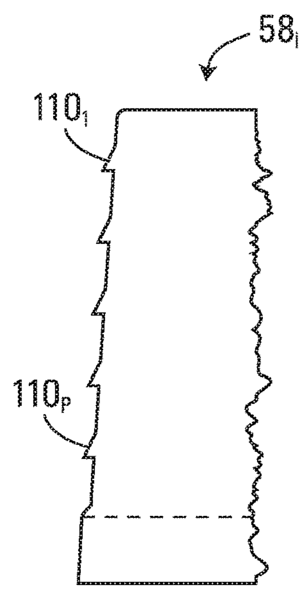
Figure 35D:
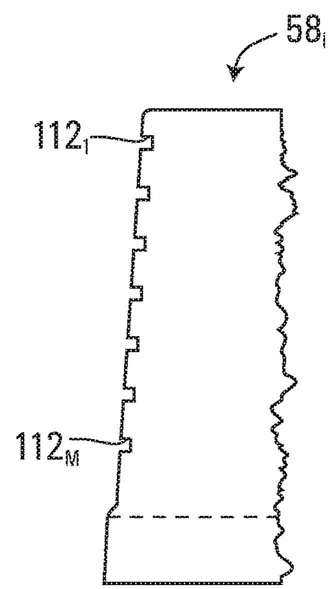
Figure 36:
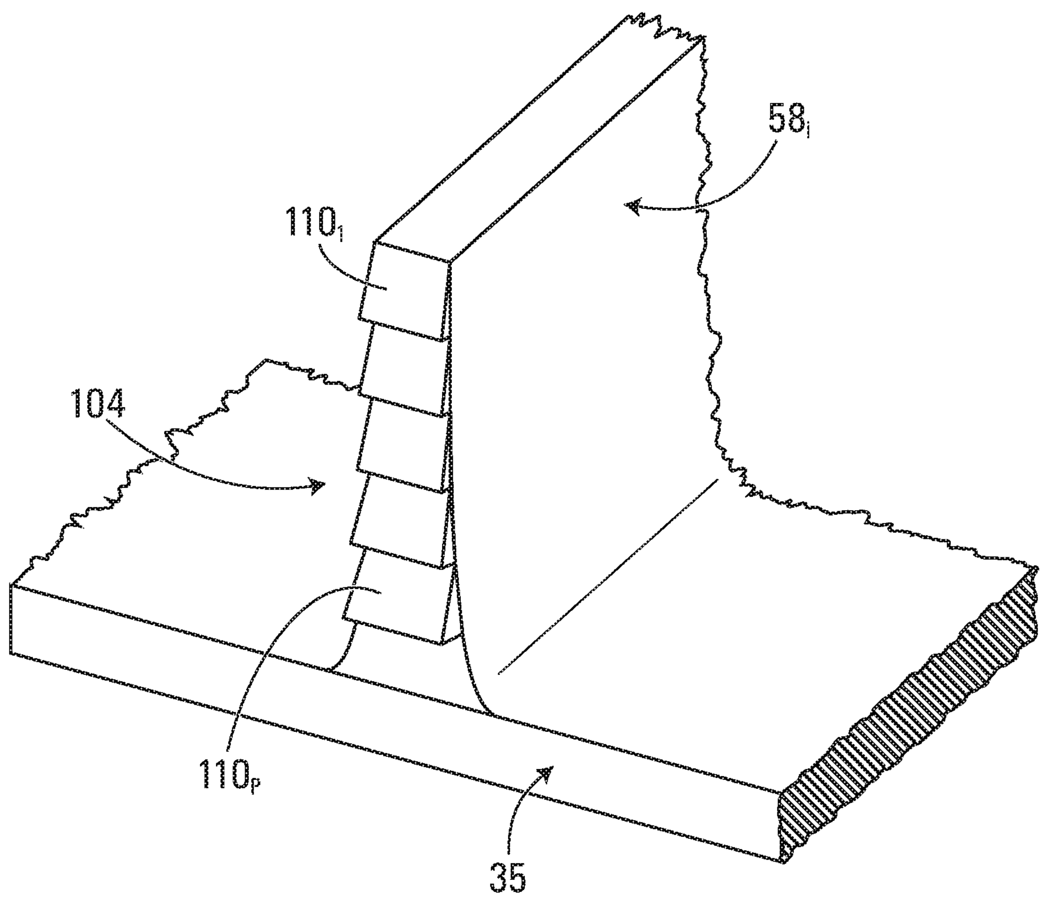
FIG. 36 shows a perspective view of part of a traction projection comprising an uneven lateral surface.

For instance, in some embodiments, as shown in FIG. 35A, the formations $106_1$-$106_F$ may be configured in a step-like manner such that the formations form steps $108_1$-$108_S$ in an ascending manner from a bottom portion to a top portion of the traction projection $58_i$. In other embodiments, as shown in FIGS. 35B and 35C, the formations $106_1$-$106_F$ may be configured to form projections $110_1$-$110_P$. The projections $110_1$-$110_P$ may have any suitable shape. For instance, the projections $110_1$-$110_P$ may have a rectangular shape (as shown in FIG. 35B), a rounded shape, a triangular shape (as shown in FIG. 35C) or any other suitable shape. In yet other embodiments, as shown in FIG. 35D, the formations $\mathbf{106}_1$-$\mathbf{106}_F$ may be configured to form recesses $\mathbf{112}_1$-$\mathbf{112}_M$.

Figure 37:
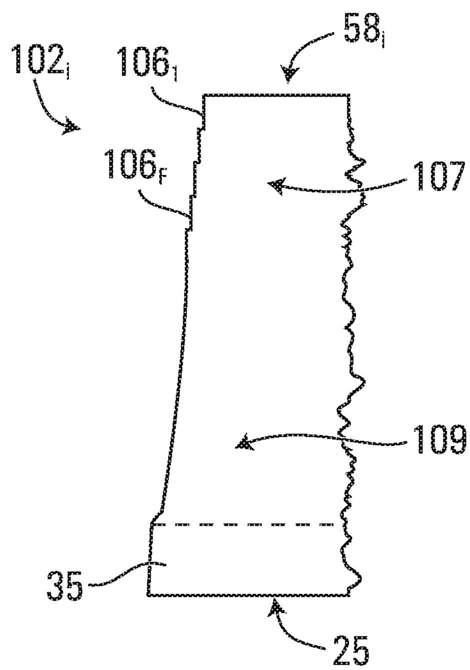
FIG. 37 shows a top portion of a traction projection comprising an uneven lateral surface.

The formations $\mathbf{106}_1$-$\mathbf{106}_F$ may be configured differently in other embodiments. For instance, the formations $\mathbf{106}_1$-$\mathbf{106}_F$ may be spaced evenly from one another as shown in FIGS. 35A to 35D or, alternatively, the formations $\mathbf{106}_1$-$\mathbf{106}_F$ may be unevenly spaced from one another such that a pitch defined between successive ones of the formations $\mathbf{106}_1$-$\mathbf{106}_F$ varies. Moreover, the formations $\mathbf{106}_1$-$\mathbf{106}_F$ may extend along only a portion of the height of the traction projection $\mathbf{58}_i$ and/or a height of the lateral stabilizer $\mathbf{96}_i$. For example, as shown in FIG. 37, the formations $\mathbf{106}_1$-$\mathbf{106}_F$ may extend along a top portion 107 of the traction projection $\mathbf{58}_i$ while a bottom portion 109 of the traction projection $\mathbf{58}_i$ may not comprise any of the formations $\mathbf{106}_1$-$\mathbf{106}_F$. The top portion 107 of the traction projection $\mathbf{58}_i$ may correspond to at least 10% of a height H of the traction projection $\mathbf{58}_i$, in some cases at least 30%, in some cases at least 50%, in some cases at least 60%, and in some cases even more (e.g., 70%). In a similar manner, the formations $\mathbf{106}_1$-$\mathbf{106}_F$ may extend along a top portion of the lateral stabilizer $\mathbf{96}_i$.

Figure 38:
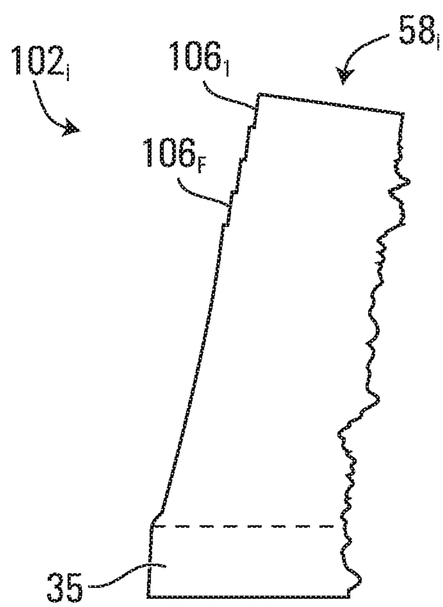
FIG. 38 shows the uneven lateral surface of the traction projection bending.

In a variant, the uneven surfaces $\mathbf{102}_1$-$\mathbf{102}_U$ may be able to bend. More specifically, as shown in FIG. 38, an uneven surface $\mathbf{102}_i$ extending along the top portion 107 of the traction projection $\mathbf{58}_i$ may bend relative to the bottom portion 109 of the traction projection $\mathbf{58}_i$. This may be useful to further oppose the tendency of the track 21 to skid due to a sloped terrain. For instance, this may enhance a grabbing action of the uneven surface $\mathbf{102}_i$ with the ground.

Figure 79:
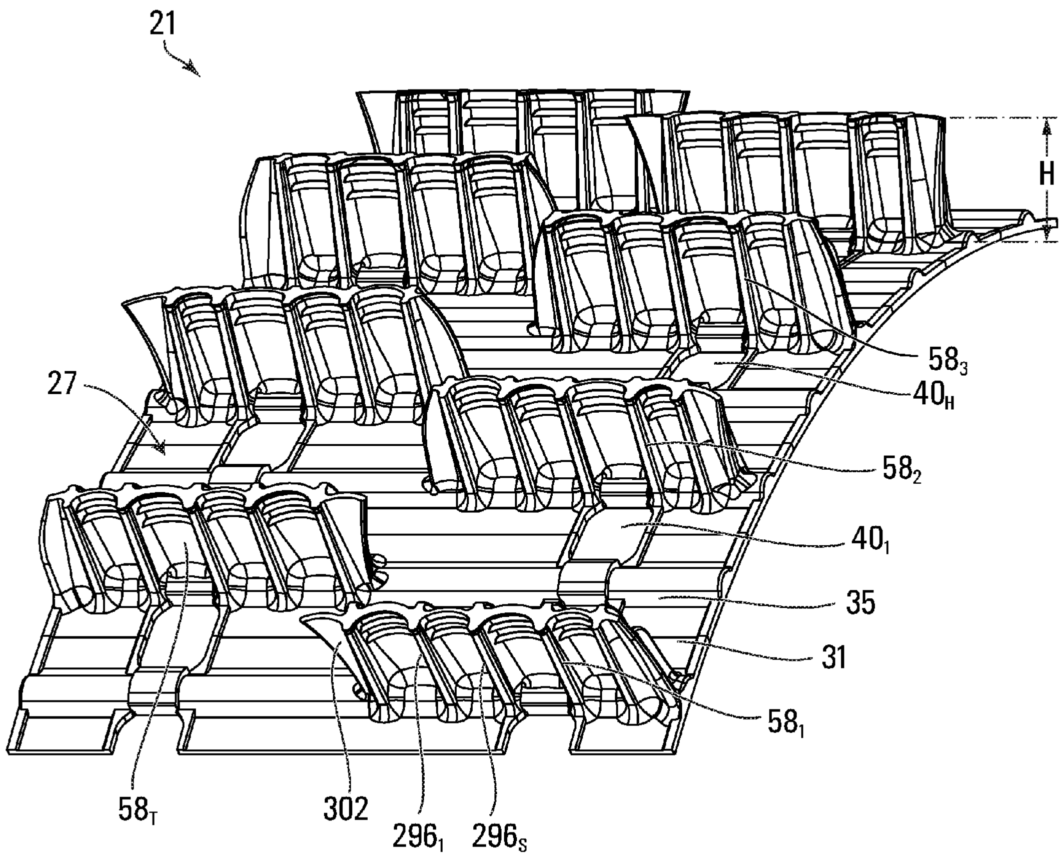
FIGS. 79 and 80 show perspective and plan views of the track in accordance with an embodiment in which the traction projections of the track comprise lateral stabilizers and a containment space.
Figure 80:
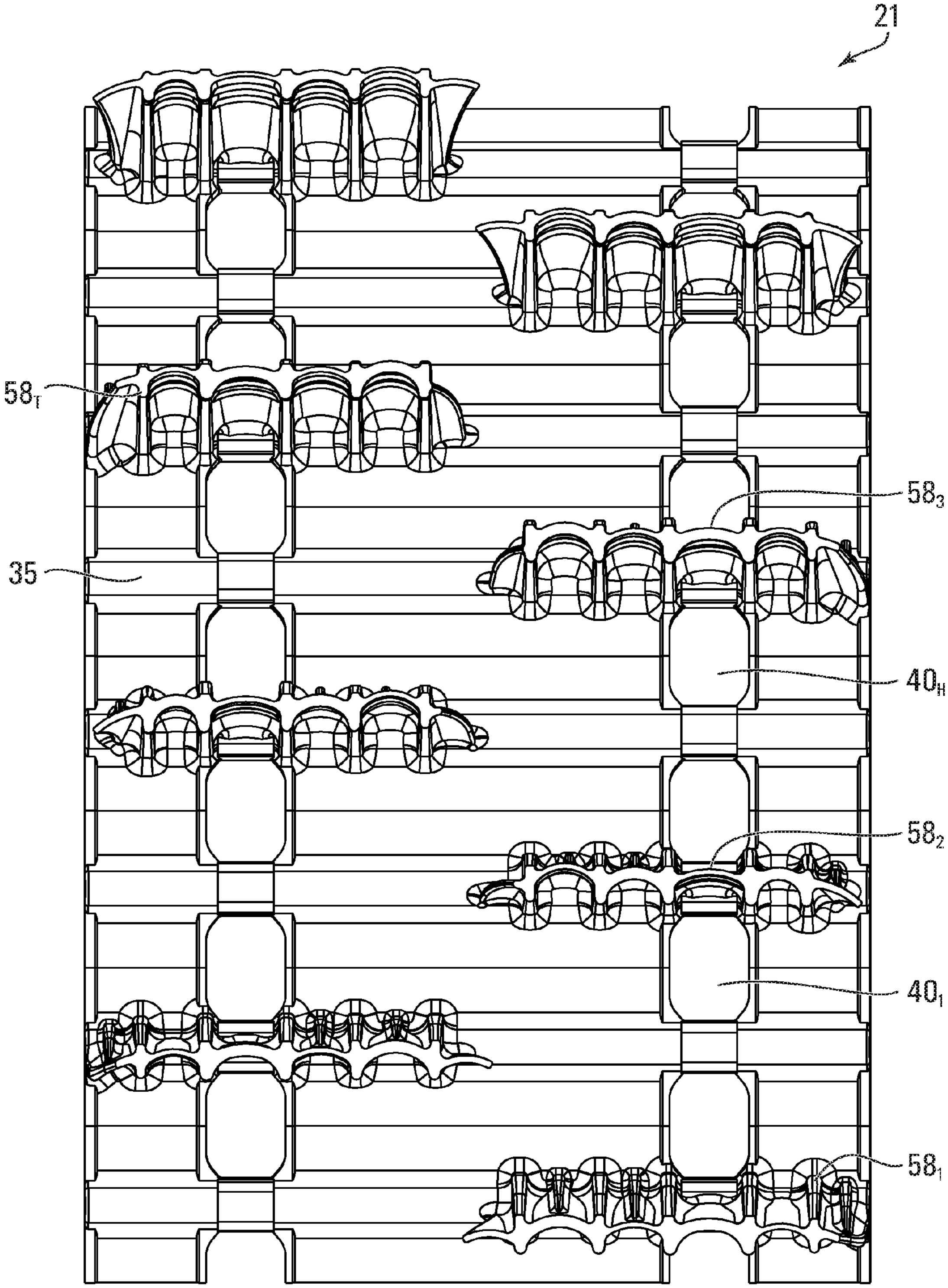
Figure 81:
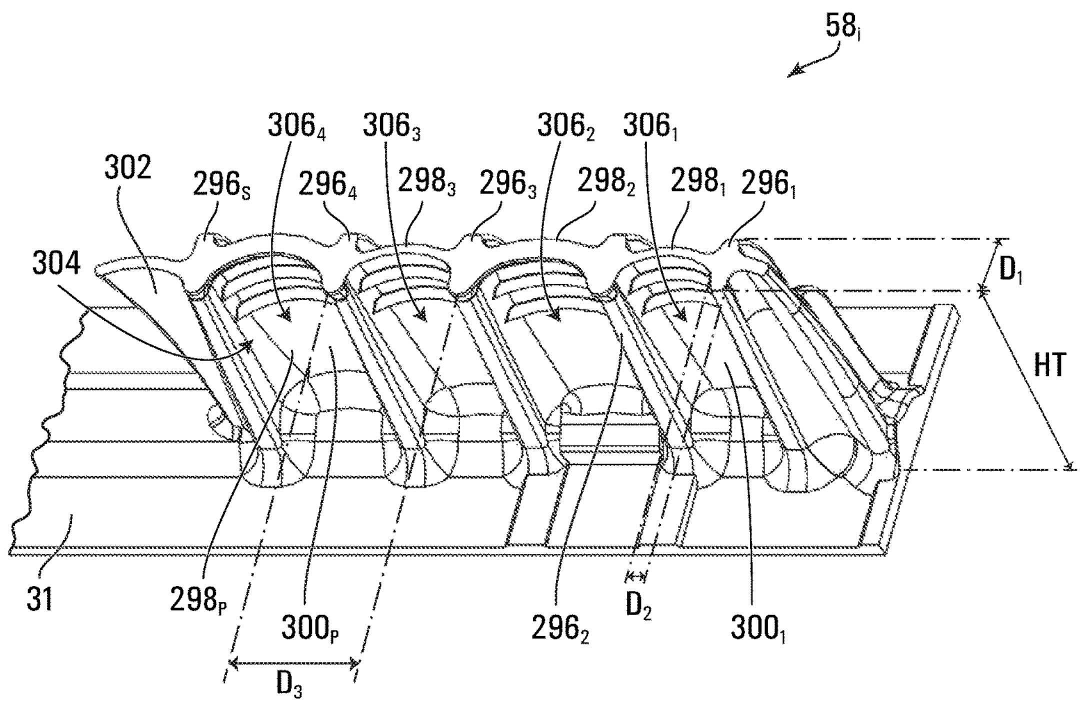
FIG. 81 shows a perspective view of a traction projection in accordance with the embodiment of FIGS. 79 and 80.
Figure 82:
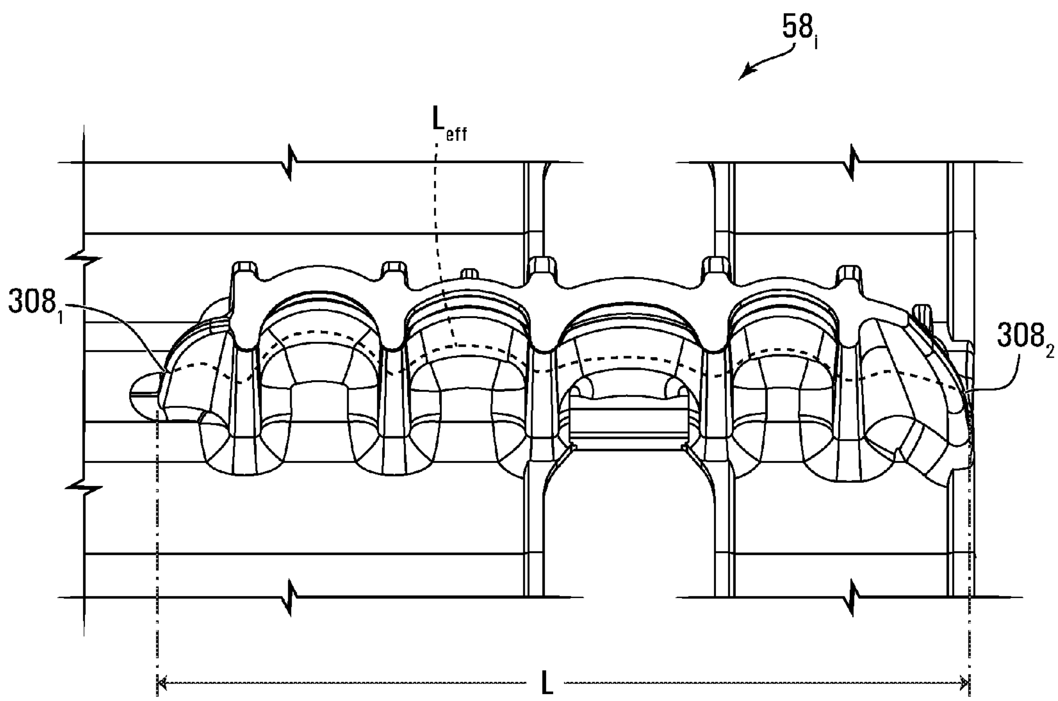
FIG. 82 shows a top view of a traction projection in accordance with the variant of FIGS. 79 and 80.

In another variant, with additional reference to FIGS. 79 to 81, a traction projection $\mathbf{58}_i$ may comprise a plurality of lateral stabilizers $\mathbf{296}_1$-$\mathbf{296}_S$ configured to increase a lateral restrictive force exerted by the traction projection $\mathbf{58}_i$. The traction projections $\mathbf{58}_1$-$\mathbf{58}_T$ comprising the lateral stabilizers $\mathbf{296}_1$-$\mathbf{296}_S$ may be disposed in a staggered arrangement on the ground-engaging outer side 27 of the track 21. In other words, at least a majority of (i.e., a majority or an entirety of) a given traction projection $\mathbf{58}_i$ may be offset from an adjacent traction projection $\mathbf{58}_j$ (i.e., may not overlap the adjacent traction projection $\mathbf{58}_j$) in the widthwise direction of the track 21.

Considering a cross-section of the traction projection $\mathbf{58}_i$ normal to the thickness direction of the track 21, a dimension $D_1$ of each lateral stabilizer $\mathbf{296}_i$ in the longitudinal direction of the track 21 is greater than a dimension $D_2$ of the lateral stabilizer $\mathbf{296}_i$ in the widthwise direction of the track 21. For instance, in some embodiments, a ratio of the dimension $D_1$ of the lateral stabilizer $\mathbf{296}_i$ over the dimension $D_2$ of the lateral stabilizer $\mathbf{296}_i$ may be at least 3, in some cases at least 4, in some cases at least 5, and in some cases even more (e.g., 6).

The number of lateral stabilizers $\mathbf{296}_1$-$\mathbf{296}_S$ per traction projection $\mathbf{58}_i$ may be significant. For instance, in some embodiments, the traction projection $\mathbf{58}_i$ may comprise at least three lateral stabilizers $\mathbf{296}_1$-$\mathbf{296}_S$, in some cases at least four lateral stabilizers $\mathbf{296}_1$-$\mathbf{296}_S$, in some cases at least five lateral stabilizers $\mathbf{296}_1$-$\mathbf{296}_S$, and in some cases even more (e.g., six or more).

In this example, the traction projection $\mathbf{58}_i$ also comprises a plurality of propulsive protrusions $\mathbf{298}_1$-$\mathbf{298}_P$ configured to propel the snowmobile 10 and disposed between adjacent ones of the lateral stabilizers $\mathbf{296}_1$-$\mathbf{296}_S$. The propulsive protrusions $\mathbf{298}_1$-$\mathbf{298}_P$ are longer in the widthwise direction of the track 21 than the lateral stabilizers $\mathbf{296}_1$-$\mathbf{296}_S$. That is, a dimension $D_3$ of a propulsive protrusion $\mathbf{298}_i$ in the widthwise direction of the track 21 is greater than the dimension $D_2$ of a lateral stabilizer $\mathbf{296}_i$.

The propulsive protrusions $\mathbf{298}_1$-$\mathbf{298}_P$ may be shaped to improve traction by causing the traction projection $\mathbf{58}_i$ to contain snow or other ground matter on which the track 21 travels, as will be further discussed later. For instance, the propulsive protrusions $\mathbf{298}_1$-$\mathbf{298}_P$ may be shaped to create a "scooping" effect of the traction projection $\mathbf{58}_i$ on the snow or other ground matter on which the track 21 travels. To that end, in this embodiment, the propulsive protrusions $\mathbf{298}_1$-$\mathbf{298}_P$ are curved or otherwise shaped to respectively form a plurality of recesses $\mathbf{300}_1$-$\mathbf{300}_P$ in which snow or other ground matter may be more easily accumulated by the traction projection $\mathbf{58}_i$. For instance, in some examples, a recess $\mathbf{300}_i$ of a propulsive protrusion $\mathbf{298}_i$ may be shaped such that propulsive protrusion $\mathbf{298}_i$ implements a "scoop" or "cup" to scoop or cup the snow or other ground matter. In particular, in this example, the propulsive protrusions $\mathbf{298}_1$-$\mathbf{298}_P$ are curved along a plane that is normal to the height direction of the track 21. For example, each of the propulsive protrusions $\mathbf{298}_1$-$\mathbf{298}_P$ may be U-shaped, V-shaped or shaped in any other suitable manner such as to form the recesses $\mathbf{300}_1$-$\mathbf{300}_P$.

In some embodiments, selected ones of the propulsive protrusions $\mathbf{298}_1$-$\mathbf{298}_P$ may be curved or otherwise shaped to form the recesses $\mathbf{300}_1$-$\mathbf{300}_P$, while other ones of the propulsive protrusions $\mathbf{298}_1$-$\mathbf{298}_P$ may not be curved (e.g., flat). In other embodiments, all of the propulsive protrusions $\mathbf{298}_1$-$\mathbf{298}_P$ may not be curved (e.g., flat).

The traction projection $\mathbf{58}_i$ comprising the lateral stabilizers $\mathbf{296}_1$-$\mathbf{296}_S$ and the propulsive protrusions $\mathbf{298}_1$-$\mathbf{298}_P$ may have a significant height HT. For instance, in some embodiments, the height HT of the traction projection $\mathbf{58}_i$ may be at least 1.5 inches, in some cases at least 1.75 inches, in some cases at least 2 inches, and in some cases even more (e.g., 2.5 or 3 inches). Such a configuration of the traction projection $\mathbf{58}_i$ may be particularly useful in a mountainous environment as lateral forces exerted on the track 21 may be more significant.

Furthermore, in this example of implementation, as shown in FIG. 81, the traction projection $\mathbf{58}_i$ comprises a flap 302 that can deflect (e.g., bend) in response to a lateral force to increase a surface area of the traction projection $\mathbf{58}_i$ that is transversal to the widthwise direction of the track 21.

The flap 302 has a deflected state and an undeflected state. In its undeflected sate, the flap 302 is positioned transversally to the longitudinal direction of the track 21 while in its deflected state, the flap 302 is positioned transversally to the widthwise direction of the track 21. In its undeflected state, a surface area of the flap 302 transversal to the widthwise direction of the track 21 is smaller than in the deflected state of the flap 302.

The flap 302 protrudes from a given lateral stabilizer $\mathbf{296}_i$ in a direction transverse to the longitudinal direction of the track 21. The flap 302 may be disposed on an inner side of the traction projection $\mathbf{58}_i$ (i.e., a side of the traction projection $\mathbf{58}_i$ that is closest to a center of the track 21) or on an outer side of the traction projection $\mathbf{58}_i$ (i.e., a side of the traction projection $\mathbf{58}_i$ that is closest to a given one of the lateral edges $\mathbf{55}_1$, $\mathbf{55}_2$ of the track 21).

In this example, the flap 302 tapers in the height direction of the track 21. More specifically, a top portion of the flap 302 has a greater extent in a direction transverse to the longitudinal direction of the track 21 than a bottom portion of the flap 302 such that an extent of the flap 302 in a direction transverse to the longitudinal direction of the track 21 decreases downwardly from the top portion of the flap 302. Moreover, in this example, the flap 302 is in contact with the ground-engaging outer surface 31 of the track 21. In other examples, the flap 302 may not be in contact with the ground-engaging outer surface 31 and may instead be solely in contact with the lateral stabilizer 296$_i$. The flap 302 may be configured differently in other examples.

6. Traction Projections Configured to Contain Snow or Other Ground Matter

In some embodiments, as shown in FIGS. 79 to 85, a traction projection 58$_i$ may be configured to contain snow or other ground matter from the ground to enhance traction. That is, the traction projection 58$_i$ comprises a containment space 304 to contain an amount of snow or other ground matter when the traction projection 58$_i$ engages the ground. This may help to compact the amount of snow or other ground matter contained in the traction projection 58$_i$ and thus allow the traction projection 58$_i$ to press more on the compacted snow or other ground matter, thereby generating greater tractive forces. For instance, the containment space 304 of the traction projection 58$_i$ may create a "scooping" or "cupping" action to scoop or cup the snow or other ground matter. The scooping or cupping action may further be amplified when the traction projection 58$_i$ deforms as it engages the snow or other ground matter and causes the containment space 304 to expand.

The containment space 304 of the traction projection 58$_i$ may be sized such that the amount of snow or other ground matter it can contain may be relatively significant, as this may further improve traction.

In this embodiment, the containment space 304 of the traction projection 58$_i$ comprises a plurality of containment voids 306$_1$-306$_4$ to contain respective portions of the amount of snow or other ground matter contained by the traction projection 58$_i$. More particularly, in this embodiment, the traction projection 58$_i$ comprises the propulsive protrusions 298$_1$-298$_P$ and each of the containment voids 306$_1$-306$_4$ is implemented by a respective one of the recesses 300$_1$-300$_P$ defined by the propulsive protrusions 298$_1$-298$_P$.

In this example, the recesses 300$_1$-300$_P$ implementing the containment voids 306$_1$-306$_4$ are distributed in a longitudinal direction of the traction projection 58$_i$, which in this case corresponds to the widthwise direction of the track 21. This allows the traction projection 58$_i$ to contain the snow or other ground matter over a significant part of the length L of the traction projection 58$_i$.

For instance, in some embodiments, the containment space 304 of the traction projection 58$_i$ may occupy at least a majority (e.g., a majority or an entirety) of the length L of the traction projection 58$_i$. For example, in some embodiments, the containment space 304 of the traction projection 58$_i$ may occupy at least 60%, in some cases at least 70%, in some cases at least 80%, in some cases at least 90%, and in some cases an entirety of the length L of the traction projection 58$_i$.

In this regard, in this embodiment, each of the recesses 300$_1$-300$_P$ of the containment space 304 of the traction projection 58$_i$ may occupy a significant part of the length L of the traction projection 58$_i$. For example, in some embodiments, a recess 300$_i$ of the containment space 304 of the traction projection 58$_i$ may occupy at least 10%, in some cases at least 15%, in some cases at least 20%, in some cases at least 25%, and in some cases an even larger part of the length L of the traction projection 58$_i$.

The containment space 304 of the traction projection 58$_i$ may therefore be viewed as imparting an "effective" length $L_{eff}$ of the traction projection 58$_i$ that exceeds the (actual) length L of the traction projection 58$_i$. Basically, the traction projection 58$_i$ may be viewed as generating more traction as if it was effectively longer. The effective length $L_{eff}$ of the traction projection 58$_i$ can be measured by measuring a line that follows a shape of the traction projection 58$_i$ from the first longitudinal end 308$_1$ of the traction projection 58$_i$ to the second longitudinal end 308$_2$ of the traction projection 58$_i$. Conceptually, this can be viewed as that length the traction projection 58$_i$ would have if it was straightened by straightening segments that are non-straight in the longitudinal direction of the traction projection 58$_i$ (which in this case corresponds to the widthwise direction of the track 21), i.e., the propulsive protrusions 298$_1$-298$_P$ defining the recesses 300$_1$-300$_P$ in this example, such that they are straight in the longitudinal direction of the traction projection 58$_i$.

For instance, in some embodiments, a ratio $L_{eff}/L$ of the effective length $L_{eff}$ of the traction projection 58$_i$ over the length L of the traction projection 58$_i$ may be at least 1.1, in some cases at least 1.2, in some cases at least 1.3, in some cases at least 1.4, and in some cases even more.

Also, in this embodiment, the containment space 304 of the traction projection 58$_i$ may occupy at least a majority (e.g., a majority or an entirety) of the height H of the traction projection 58$_i$. For example, in some embodiments, the containment space 304 of the traction projection 58$_i$ may occupy at least 60%, in some cases at least 70%, in some cases at least 80%, in some cases at least 90%, and in some cases an entirety of the height H of the traction projection 58$_i$.

In this example of implementation, this may be particularly useful as the height H of traction projection 58$_i$ is relatively significant. For instance, in some embodiments, the height H of the traction projection 58$_i$ may be at least 1.5 inches, in some cases at least 1.75 inches, in some cases at least 2 inches, and in some cases even more (e.g., 2.5 or 3 inches).

In this regard, in this embodiment, each of the recesses 300$_1$-300$_P$ of the containment space 304 of the traction projection 58$_i$ may occupy at least a majority of the height H of the traction projection 58$_i$. For example, in some embodiments, a recess 300$_i$ of the containment space 304 of the traction projection 58$_i$ may occupy at least 60%, in some cases at least 70%, in some cases at least 80%, in some cases at least 90%, and in some cases an entirety of the height H of the traction projection 58$_i$.

The amount of snow or other ground matter that can be contained in the containment space 304 of the traction projection 58$_i$ may thus be significant. This can be measured as a volume V of the containment space 304 of the traction projection 58$_i$ in which the amount of snow or other ground matter can be contained. For instance, in some embodiments, the volume V of the containment space 304 of the traction projection 58$_i$ may be at least 0.8 $in^3$, in some cases at least 1 $in^3$, in some cases at least 1.2 $in^3$, in some cases at least 1.4 $in^3$ and in some cases even more. For instance, in some cases, a ratio V/L of the volume V of the containment space 304 over the length L of the traction projection 58$_i$ may be at least 0.3 $in^3$/in, in some cases at least 0.5 $in^3$/in, in some cases at least 0.8 $in^3$/in, and in some cases even more.

Figure 83:
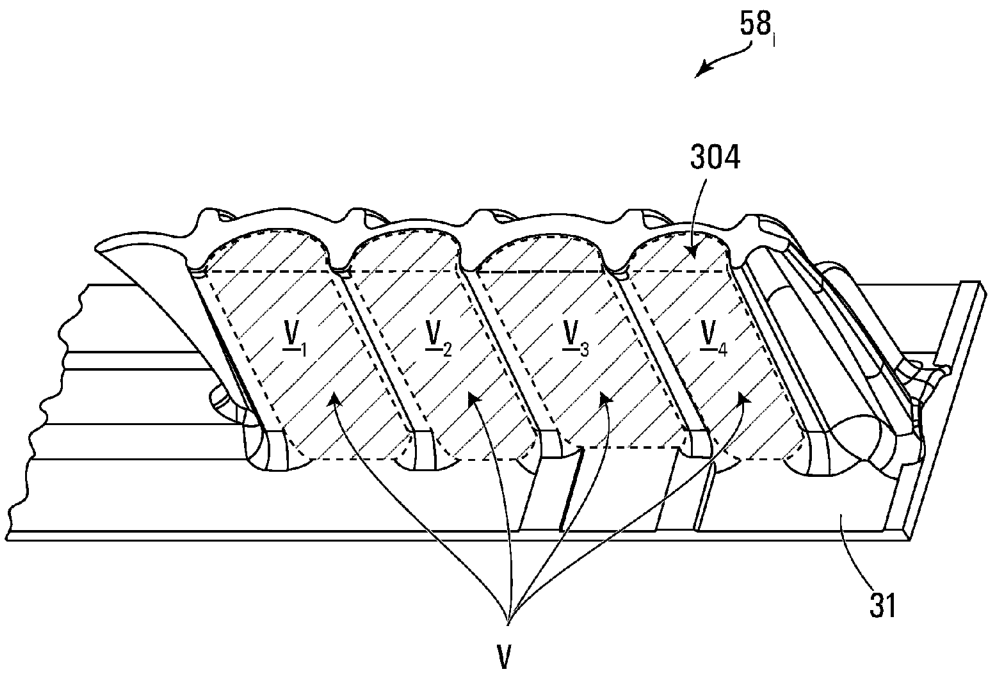
FIG. 83 shows a volume of a containment space of the traction projection of FIG. 81.
Figure 84:
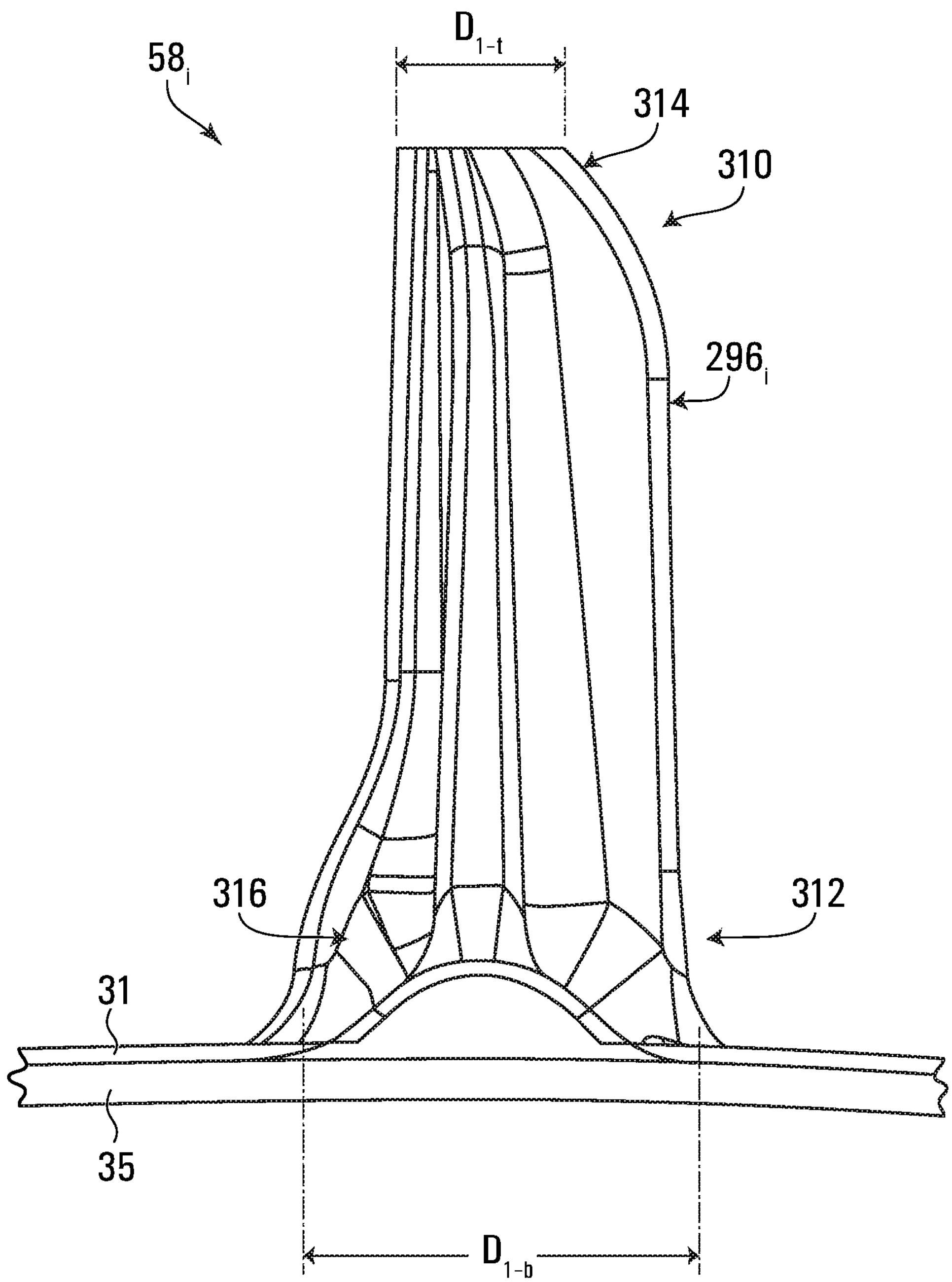
FIGS. 84 and 85 show side and top views of the traction projection of FIG. 81.
Figure 85:
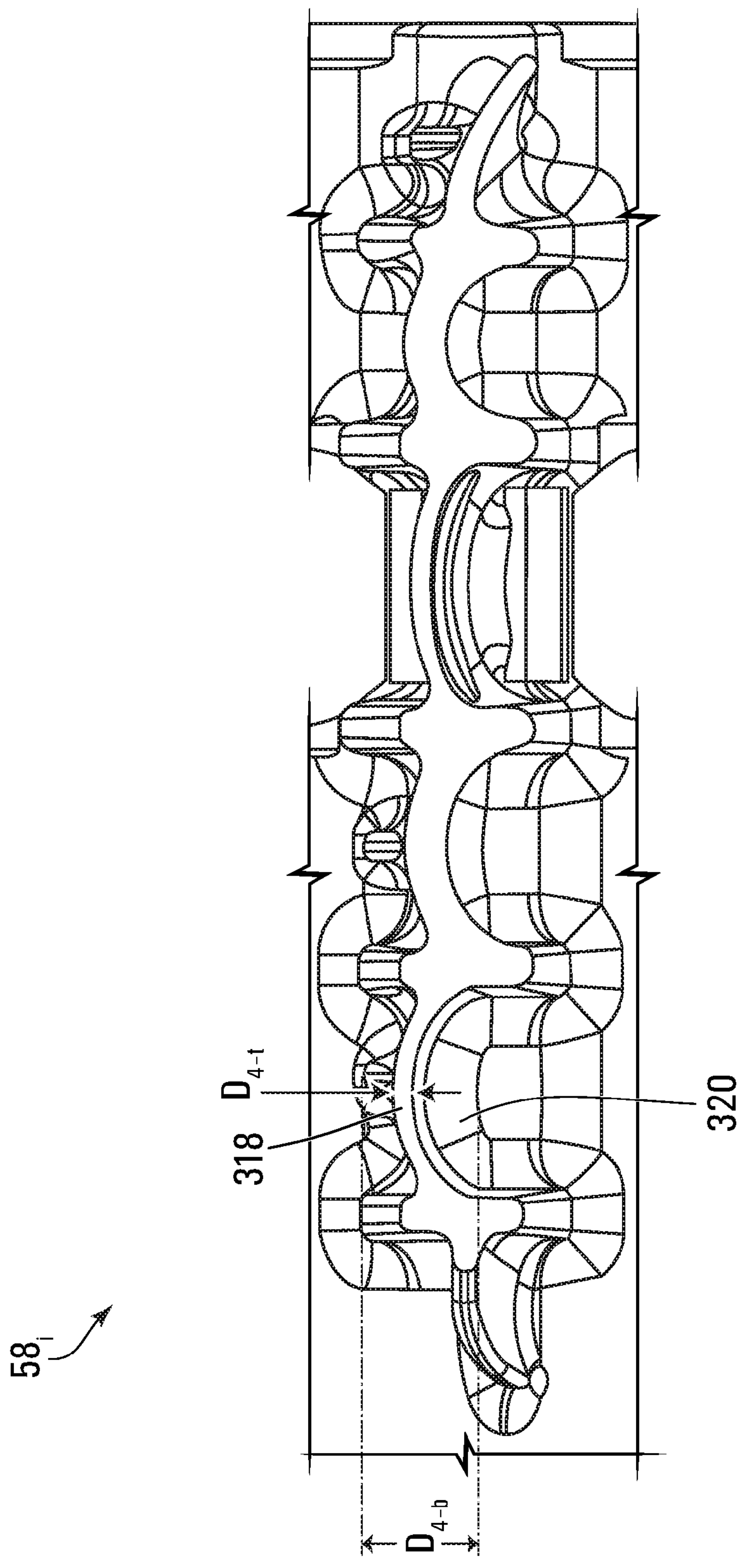
Figure 86:
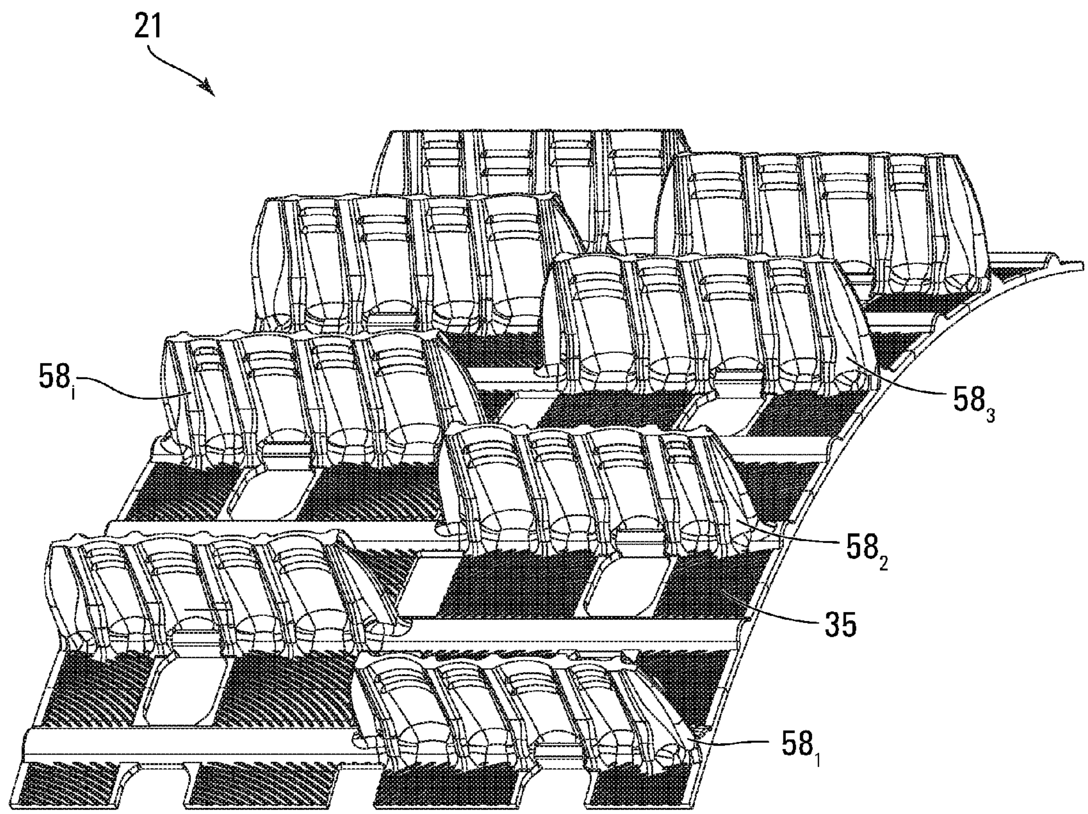
FIGS. 86 and 87 show perspective and plan views of the track in accordance with another embodiment in which the traction projections of the track comprise lateral stabilizers and a containment space.
Figure 87:
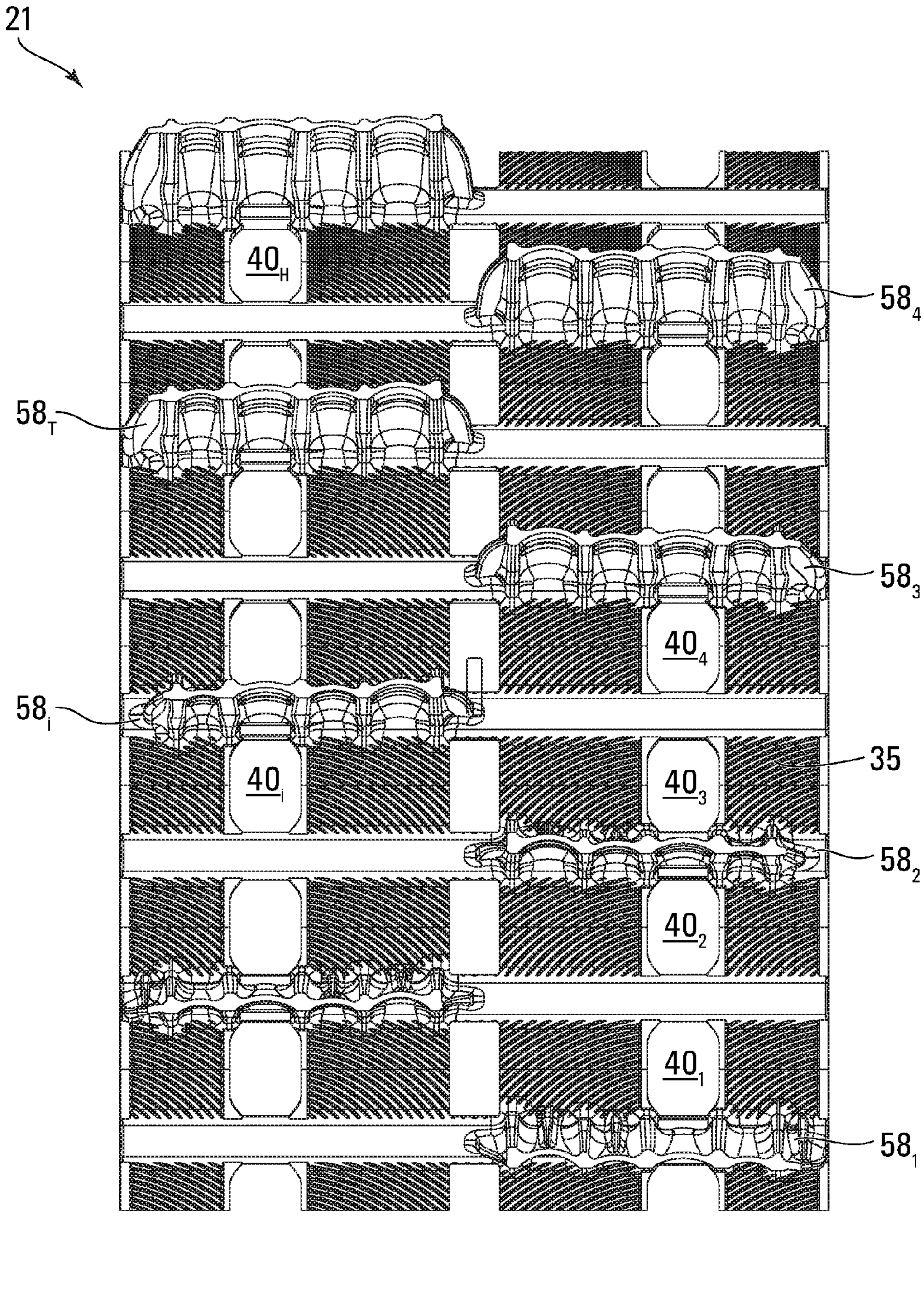
Figure 88:
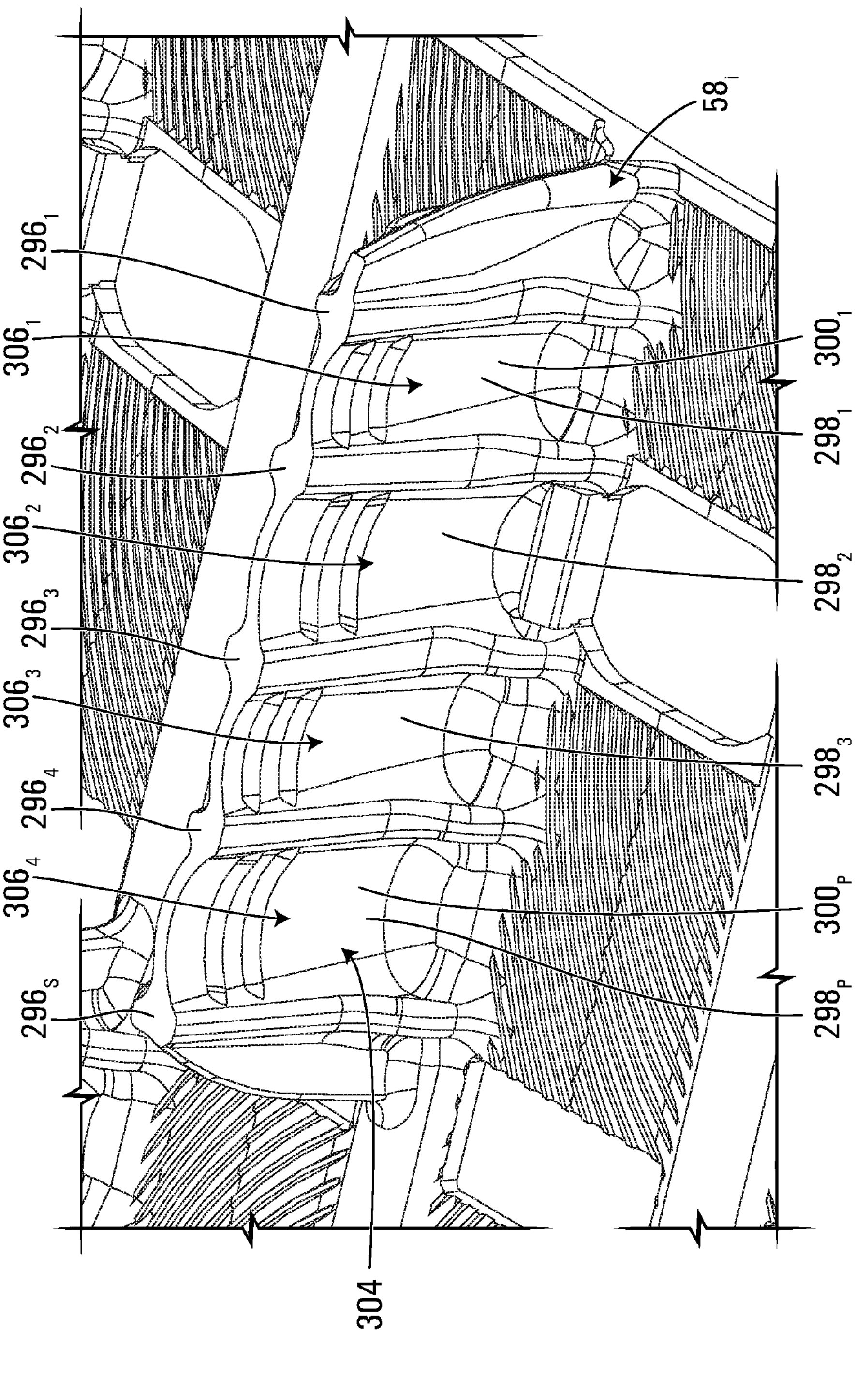
FIGS. 88 and 89 show front and rear perspective views of a traction projection in accordance with the embodiment of FIGS. 86 and 87.

In this embodiment, as shown in FIG. 83, the volume V of the containment space 304 of the traction projection 58$_i$ corresponds to a sum of volumes $v_1$-$v_4$ of the recesses 300$_1$-300$_P$ that can contain the snow or other ground matter. In this example, a volume $v_i$ of a recess 300$_i$ may be relatively significant. For instance, in some embodiments, the volume $v_i$ of the recess 300$_i$ may be at least at least 10%, in some cases at least 15%, in some cases at least 20%, in some cases at least 25%, and in some cases an even larger part of the volume V of the containment space 304 of the traction projection $\mathbf{58}_i$.

The propulsive protrusions $\mathbf{298}_1$-$\mathbf{298}_P$ defining the recesses $\mathbf{300}_1$-$\mathbf{300}_P$ of the containment space 304 of the traction projection $\mathbf{58}_i$ may be shaped in any suitable way. In this embodiment, each propulsive protrusion $\mathbf{298}_i$ is curved to define its recess $\mathbf{300}_i$. More particularly, in this embodiment, the propulsive protrusion $\mathbf{298}_i$ is generally U-shaped such that its recess $\mathbf{300}_i$ is also U-shaped. The recess $\mathbf{300}_i$ is open facing the ground as the traction projection $\mathbf{58}_i$ approaches the ground while the track 21 moves around the track-engaging assembly 24 when the snowmobile 10 travels forward.

In this example of implementation, the traction projection $\mathbf{58}_i$, including the propulsive protrusions $\mathbf{298}_1$-$\mathbf{298}_P$ and the lateral stabilizers $\mathbf{296}_1$-$\mathbf{296}_S$, tapers in the thickness direction of the track 21. That is, a top portion 310 of the traction projection $\mathbf{58}_i$ has a smaller cross-sectional area than a bottom portion 312 of the traction projection $\mathbf{58}_i$ adjacent to the outer surface 31 of the carcass 35. This may help to strengthen the traction projection $\mathbf{58}_i$ given its height and its containment space 304 which are relatively significant.

More particularly, in this example of implementation, the top portion 310 of the traction projection $\mathbf{58}_i$ is smaller in the longitudinal direction of the track 21 than the bottom portion 312 of the traction projection $\mathbf{58}_i$. In this case, a top portion 314 of each lateral stabilizer $\mathbf{296}_i$ is smaller in the longitudinal direction of the track 21 than a bottom portion 316 of the lateral stabilizer $\mathbf{296}_i$, while a top portion 318 of each propulsive protrusion $\mathbf{298}_i$ is smaller in the longitudinal direction of the track 21 than a bottom portion 320 of the propulsive protrusion $\mathbf{298}_i$.

For instance, in some embodiments, a ratio of a dimension $D_{1-b}$ of the bottom portion 316 of the lateral stabilizer $\mathbf{296}_i$ in the longitudinal direction of the track 21 over a dimension $D_{1-t}$ of the top portion 314 of the lateral stabilizer $\mathbf{296}_i$ in the longitudinal direction of the track 21 may be at least 1.1, in some cases at least 1.2, in some cases at least 1.5, and in some cases even more (e.g., 2), and/or a ratio of a dimension $D_{4-b}$ of the bottom portion 320 of the propulsive protrusion $\mathbf{298}_i$ in the longitudinal direction of the track 21 over a dimension $D_{4-t}$ of the top portion 318 of the propulsive protrusion $\mathbf{298}_i$ in the longitudinal direction of the track 21 may be at least 1.1, in some cases at least 1.2, in some cases at least 1.5, and in some cases even more (e.g., 2).

Also, in some embodiments, the dimension $D_{1-t}$ of the top portion 314 of the lateral stabilizer $\mathbf{296}_i$ may be significantly greater than the dimension $D_{4-t}$ of the top portion 318 of the propulsive protrusion $\mathbf{298}_i$. For instance, in some cases, a ratio $D_{1-t}/D_{4-t}$ of the dimension $D_{1-t}$ of the top portion 314 of the lateral stabilizer $\mathbf{296}_i$ over the dimension $D_{4-t}$ of the top portion 318 of the propulsive protrusion $\mathbf{298}_i$ may be at least 2, in some cases at least 3, in some cases at least 4 and in some cases even more. This significant difference between the dimensions $D_{1-t}$ and $D_{4-t}$ may allow the containment space 304 of the traction projection $\mathbf{58}_i$ to be bigger and thus compact more snow or other ground matter.

FIGS. 86 to 89 show a similar embodiment in which at least one of the traction projections $\mathbf{58}_1$-$\mathbf{58}_T$ of the track 21 is configured to contain snow or other ground matter from the ground to enhance traction. The containment space 304 in this embodiment is reduced due to a smaller size of the propulsive protrusions $\mathbf{298}_1$-$\mathbf{298}_P$.

Figure 89:
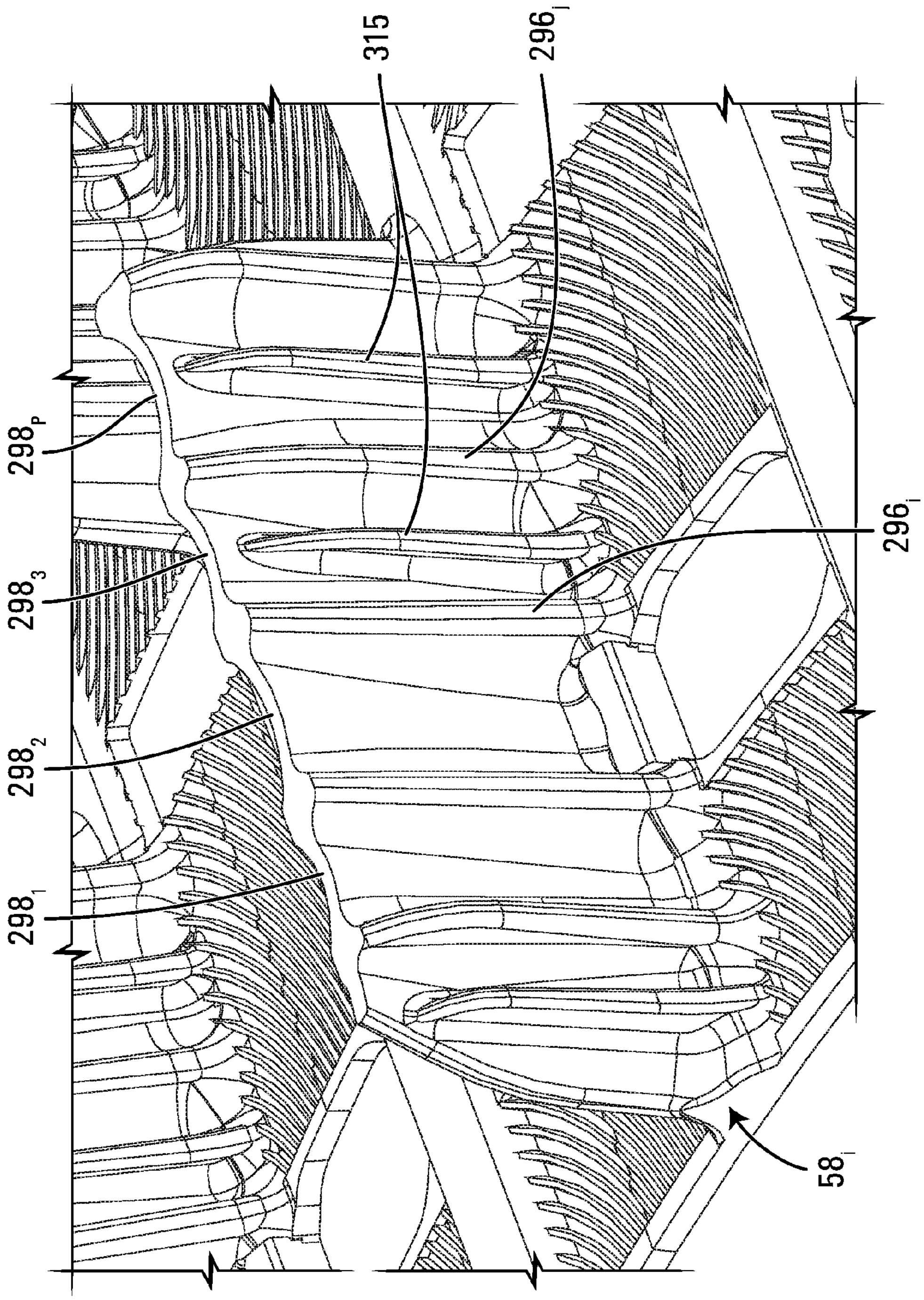

Furthermore, as shown in FIG. 89, in some embodiments, a traction projection $\mathbf{58}_i$ may comprise a strengthener 315 for reinforcing a given one of the propulsive protrusions $\mathbf{298}_1$-$\mathbf{298}_P$. The strengthener 315 is positioned such as to face away from the ground as the traction projection $\mathbf{58}_i$ approaches the ground while the track 21 moves around the track-engaging assembly 24 when the snowmobile 10 travels forward. In other words, the strengthener 315 is disposed on a side of the traction projection $\mathbf{58}_i$ that is opposite to the recesses $\mathbf{300}_1$-$\mathbf{300}_P$ of the containment space 304 of the traction projection $\mathbf{58}_i$. The strengthener 315 is disposed adjacent to a propulsive protrusion $\mathbf{298}_i$ in the longitudinal direction of the track 21 such as to reinforce the propulsive protrusion $\mathbf{298}_i$ when the propulsive protrusion $\mathbf{298}_i$ engages the ground. This may help minimize wear of the traction projection $\mathbf{58}_i$. In this embodiment, the strengthener 315 comprises an elongated rib that extends in the height direction of the track 21. A height of the strengthener 315 may be significant. For instance, the height of the strengthener 315 may be equal to a majority or an entirety of the height H of the traction projection $\mathbf{58}_i$. In this embodiment, the strengthener 315 is integral with the remainder of the traction projection $\mathbf{58}_i$ such that it is formed together with the traction projection $\mathbf{58}_i$.

The strengthener 315 may be configured in other ways in other embodiments. For instance, the strengthener 315 may be shaped differently or its height may be less than a majority of the height H of the traction projection $\mathbf{58}_i$.

Furthermore, a given traction projection $\mathbf{58}_i$ may comprise more than one strengthener 315. Notably, in this example of implementation, the traction projection $\mathbf{58}_i$ comprises two strengtheners 315, each strengthener 315 being configured to reinforce a respective propulsive protrusion $\mathbf{298}_i$. Thus, in some embodiments, each propulsive protrusion $\mathbf{298}_i$ may be associated with a corresponding strengthener 315, or one or more of the propulsive protrusions $\mathbf{298}_1$-$\mathbf{298}_P$ may be free of a strengthener 315.

7. Adaptable Track

Figure 39:
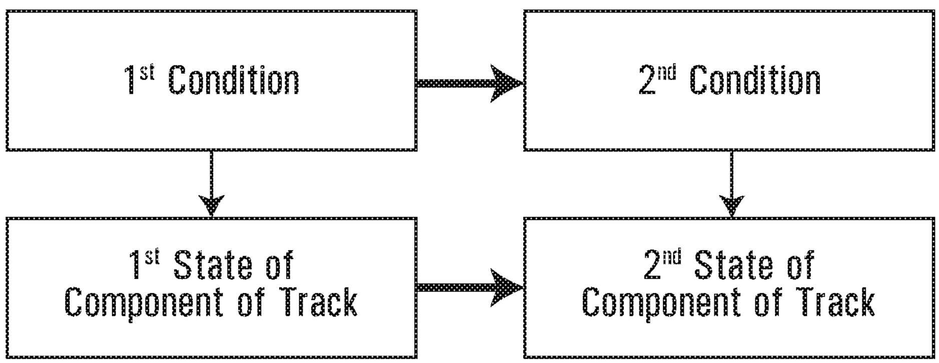
FIG. 39 shows a functional block diagram of an adaptable function of the track in accordance to an embodiment where one or more components of the track are adaptable in response to a stimulus.

In some embodiments, as shown in FIG. 39, one or more components of the track 21 (e.g., the traction projections $\mathbf{58}_1$-$\mathbf{58}_T$, the carcass 35, the drive/guide lugs $\mathbf{34}_1$-$\mathbf{34}_D$) may be adaptable in response to a stimulus (e.g., temperature, humidity, loading, a signal, etc.) such that a state of a given component of the track 21 (e.g., a stiffness or other property; a shape; and/or any other characteristic of the given component of the track) is variable in different conditions (e.g., weather conditions; ground conditions, such as different types of snow, soil, etc.; and/or other conditions) in order to better perform in specified conditions.

7.1 Adaptable Traction Projections

Figure 40:
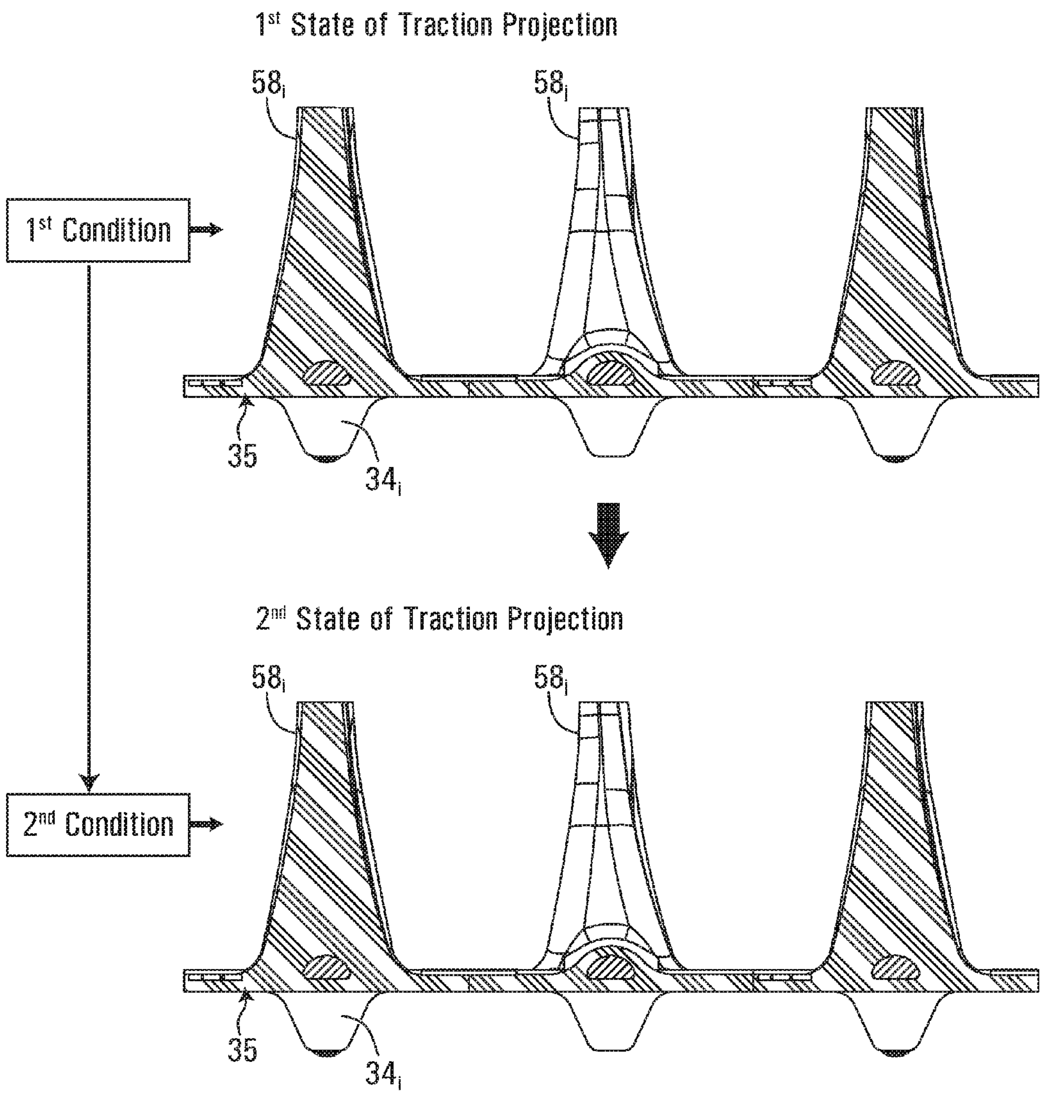
FIG. 40 shows the traction projections of the track of FIG. 39, the traction projections assuming a first state corresponding to a first condition and a second state corresponding to a second condition.

In some embodiments, as shown in FIG. 40, respective ones of the traction projections $\mathbf{58}_1$-$\mathbf{58}_T$ may be adaptable in response to a stimulus (e.g., temperature, humidity, loading, a signal, etc.) such that a state of a traction projection $\mathbf{58}_i$ (e.g., a stiffness, hardness, or other property; a shape; and/or any other characteristic of the traction projection $\mathbf{58}_i$) is variable in different conditions (e.g., weather conditions; ground conditions, such as different types of snow, soil, etc.; and/or other conditions) in order to better perform in specified conditions. For example, in some embodiments, the traction projection $\mathbf{58}_i$ may be less stiff (e.g., softer) and/or less straight (e.g., bent) in powder snow (or other looser matter on the ground) than in wet snow (or other denser matter on the ground).

7.1.1 Adaptable Stiffness

Figure 41:
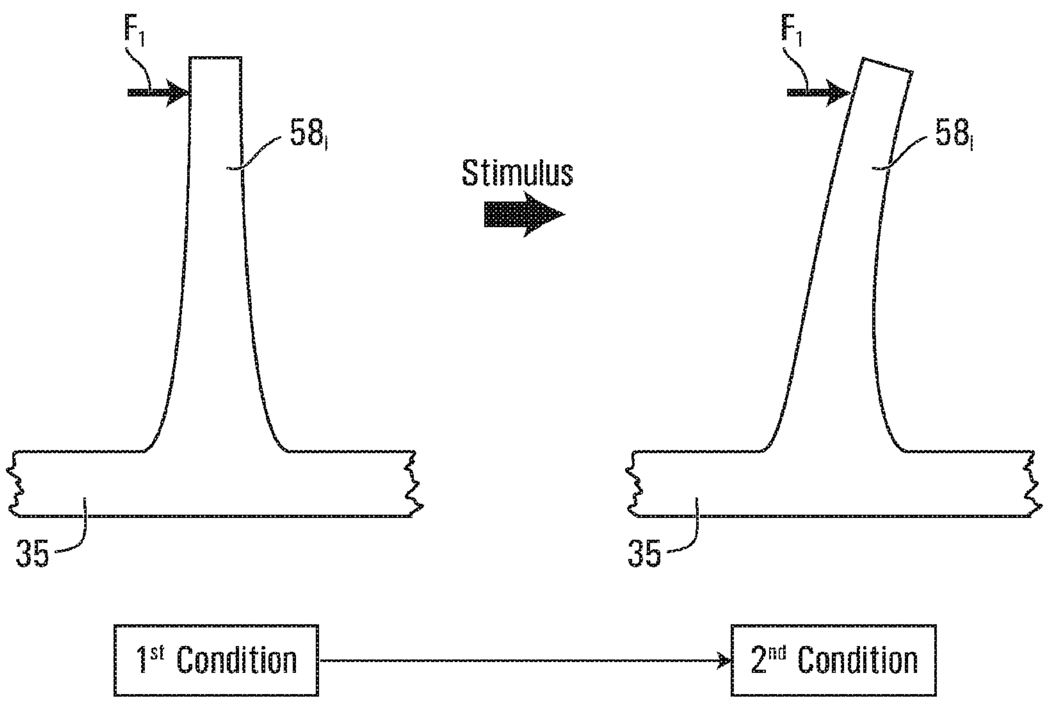
FIG. 41 shows an embodiment where a stiffness of a traction projection is adaptable in response to the stimulus.

In some embodiments, as shown in FIG. 41, a stiffness of a traction projection $\mathbf{58}_i$ may be adaptable in response to a stimulus such that the traction projection $\mathbf{58}_i$ is stiffer in a first condition than in a second condition. That is, the stiffness of the traction projection 58$_i$ changes based on the stimulus.

For instance, in some embodiments, the stiffness of the traction projection 58$_i$ may change based on a stimulus associated with an environmental parameter of an environment of the traction projection 58$_i$.

For example, the stiffness of the traction projection 58$_i$ may be lower when the traction projection 58$_i$ is in powder snow (or other looser matter on the ground) than when the traction projection 58$_i$ is in wet/spring snow (or other denser matter on the ground). Wet/spring snow is defined here as snow with a humidity of more than 3%.

More specifically, a ratio of the stiffness of the traction projection 58$_i$ in powder snow over the stiffness of the traction projection 58$_i$ in wet/spring snow may be at least 1.1, in some cases at least 1.2, in some cases at least 1.3, in some cases at least 1.5, in some cases at least 2, and in some cases even more (e.g., 3 or more).

In some embodiments, the stiffness of the traction projection 58$_i$ may be lower when the humidity of the environment of the traction projection 58$_i$ is lower. For example, the stiffness of the traction projection 58$_i$ may be lower when the humidity of the snow that the traction projection 58$_i$ engages is lower.

For instance, a ratio of the stiffness of the traction projection 58$_i$ when the humidity has a given value over the stiffness of the traction projection 58$_i$ when the humidity has a lower value than the given value may be at least 1.1, in some cases at least 1.2, in some cases at least 1.3, in some cases at least 1.5, in some cases at least 2, and in some cases even more (e.g., 3 or more).

In some embodiments, the stiffness of the traction projection 58$_i$ may be lower when a temperature of the environment of the traction projection 58$_i$ is lower.

For instance, a ratio of the stiffness of the traction projection 58$_i$ when the temperature has a given value over the stiffness of the traction projection 58$_i$ when the temperature has a lower value than the given value may be at least 1.1, in some cases at least 1.2, in some cases at least 1.3, in some cases at least 1.5, in some cases at least 2, and in some cases even more (e.g., 3 or more).

In some cases, the stiffness of the traction projection 58$_i$ may be lower when snow (or other matter on the ground) that the traction projection 58$_i$ engages is softer. For instance, the stiffness of the traction projection 58$_i$ may be lower when loading (e.g., impacts) on the traction projection 58$_i$ is lower.

For instance, a ratio of the stiffness of the traction projection 58$_i$ when the snow (or other matter on the ground) that the traction projection 58$_i$ engages has a given hardness over the stiffness of the traction projection 58$_i$ when the snow (or other matter on the ground) that the traction projection 58$_i$ engages has a lower hardness may be at least 1.1, in some cases at least 1.2, in some cases at least 1.3, in some cases at least 1.5, in some cases at least 2, and in some cases even more (e.g., 3 or more). The difference in hardness of the snow (or other matter on the ground) that the traction projection 58$_i$ engages over which this ratio may apply may be no more than a certain value.

The stiffness of the traction projection 58$_i$ may be observed in any suitable way in various embodiments.

For example, a material 114 of the traction projection 58$_i$ may vary in stiffness. For instance, a modulus of elasticity of the material 114 of the traction projection 58$_i$ may vary based on the stimulus.

More particularly, a ratio of the modulus of elasticity of the material 114 of the traction projection 58$_i$ in the first condition over the modulus of elasticity of the material 114 of the traction projection 58$_i$ in the second condition may be at least 2, in some cases at least 3, in some cases at least 4, and in some cases even more (e.g., 4.5 or more). For instance, the modulus of elasticity may be Young's modulus or the 100% modulus for the material 114 of the traction projection 58$_i$.

In some embodiments, a hardness of the material 114 of the traction projection 58$_i$ may vary based on the stimulus.

For instance, a ratio of the hardness of the material 114 of the traction projection 58$_i$ in the first condition over the hardness of the material 114 of the traction projection 58$_i$ in the second condition may be at least 1.1, in some cases at least 1.2, in some cases at least 1.3, in some cases at least 1.5, in some cases at least 2, and in some cases even more (e.g., 3 or more).

Figure 43:
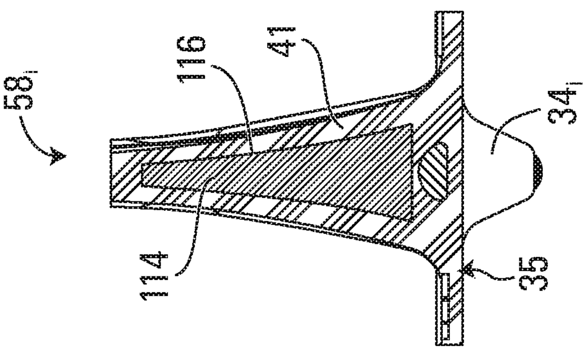
FIG. 43 shows an adaptable member of a traction projection in accordance with another embodiment.
Figure 42:
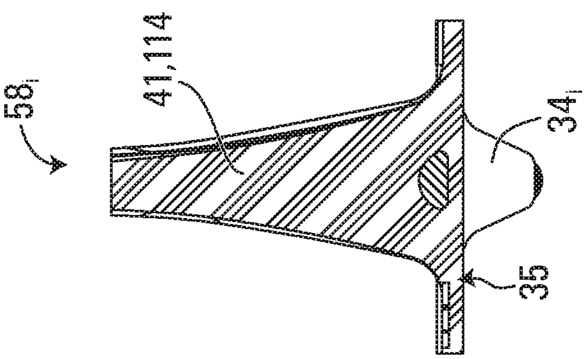
FIG. 42 shows a material of the traction projections of FIG. 41 in accordance with an embodiment.

The material 114 of the traction projection 58$_i$ may be any suitable material. For example, in some embodiments, as shown in FIG. 42, the material 114 may be the rubber 41 of the traction projection 58$_i$. In other embodiments, as shown in FIG. 43 the material 114 may interface with the rubber 41 of the traction projection 58$_i$. That is, the traction projection 58$_i$ may comprise an adaptable member 116 that includes the material 114 and that interfaces with the rubber 41 of the traction projection 58$_i$. The adaptable member 116 may be at least partially embedded in the rubber 41 of the traction projection 58$_i$. For example, the adaptable member 116 may be a core within the rubber 41 of the traction projection 58$_i$.

Figure 44:
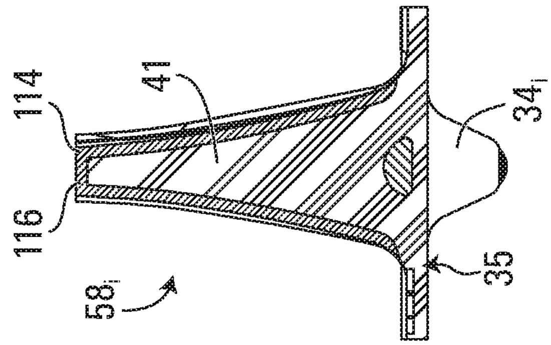
FIG. 44 shows the adaptable member at an outer surface of the traction projection.

In some embodiments, as shown in FIG. 44, the adaptable member 116 may be at an outer surface of the rubber 41 of the traction projection 58$_i$. For example, the adaptable member 116 may be a cover of the traction projection 58$_i$ that covers the rubber 41 of the traction projection 58$_i$.

The adaptable member 116 and its material 114 may be provided in the traction projection 58$_i$ in any suitable way. For instance, in embodiments in which the adaptable 116 is at least partially embedded within the rubber 41 of the traction projection 58$_i$, the adaptable member 116 may be formed in a first molding operation and then overmolded by the rubber 41 of the traction projection 58$_i$ in a subsequent molding operation. Conversely, in embodiments in which the adaptable member 116 at the outer surface of the rubber 41 of the traction projection 58$_i$, the rubber 41 may be formed in a first molding operation and then overmolded by the material 114 to form the adaptable member that covers the rubber 41 in a subsequent molding operation.

The adaptability of the stiffness of the traction projection 58$_i$ may be implemented in any suitable way.

In some embodiments, the material 114 may have a property related to the stiffness, such as its modulus of elasticity and/or hardness, that varies considerably over a range of values of the stimulus to which the traction projection 58$_i$ is expected to be exposed during use.

For instance, in some embodiments, the property related to the stiffness of the material 114 may vary considerably over a range of temperatures to which the traction projection 58$_i$ is expected to be exposed during use. For example, the property related to the stiffness of the material 114 may vary between 0 and −30° C., in some cases between 0 and −20° C., and in some cases between 0 and −10° C.

In some embodiments, the property related to the stiffness of the material 114 may vary considerably over a range of humidity to which the traction projection 58$_i$ is expected to be exposed during use. For example, the property related to the stiffness of the material 114 may vary between 0% and 1% humidity, in some cases between 0% and 2% humidity, in some cases between 0% and 3% humidity, in some cases between 0% and 4% humidity, and in some cases between 0% and 5% humidity.

In some embodiments, the material 114 may be a rate-dependent material. That is, the property related to the stiffness of the material 114 (e.g., modulus of elasticity and/or hardness of the material 114) may vary based on a rate of change of a force applied on the traction projection 58$_i$. For example, the material 114 may comprise a rate-dependent foam that is characterized as possessing a load-response behavior that resists sudden-movement rapid compression, yet is less resistive to slow-movement compression.

Furthermore, in some embodiments, the material 114 may be a non-Newtonian material (i.e., a non-Newtonian fluid) having a viscosity that is dependent on shear rate or shear rate history.

7.1.2 Adaptable Shape

Figure 45:
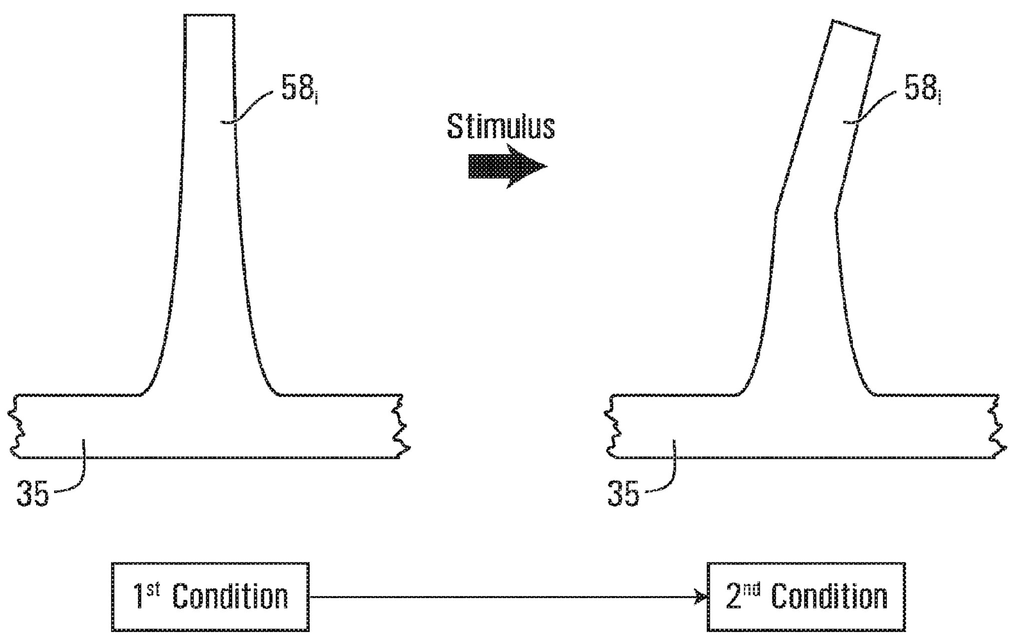
FIG. 45 shows an embodiment where a shape of the traction projections is adaptable to the stimulus.

In some embodiments, as shown in FIG. 45, a shape of a traction projection 58$_i$ may be adaptable in response to a stimulus such that the shape of the traction projection 58$_i$ is different in a first condition than in a second condition. That is, the shape of the traction projection 58$_i$ changes based on the stimulus. This change in shape of the traction projection 58$_i$ is distinct from any change in shape of the traction projection 58$_i$ that may occur when the traction projection 58$_i$ contacts the ground and ceases to contact the ground.

For instance, the shape of the traction projection 58$_i$ may have a greater "packing" effect and/or "scooping" effect in powder snow than in wet/spring snow. For example, the shape of the traction projection 58$_i$ may be less straight (e.g., bent) in powder snow (or other looser matter on the ground) than in wet/spring snow (or other denser matter on the ground). This may allow an improved floatation of the track 21 on powder snow.

Figure 46:
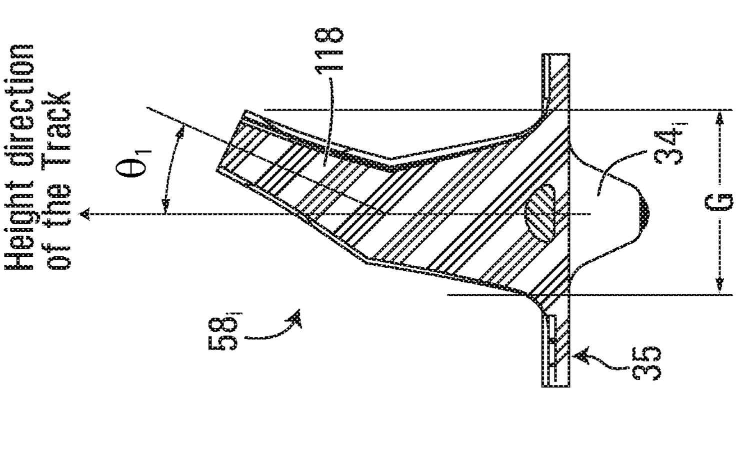

More particularly, as shown in FIG. 46, an angle $\theta_1$ between a portion 118 of the traction projection 58$_i$ and the height direction of the track 21 may be different in powder snow than in wet/spring snow. For instance, the angle $\theta_1$ may be greater in powder snow than wet/spring snow. For example, a ratio of $\theta_1$ in powder snow over $\theta_1$ in wet/spring snow may be at least 1.1, in some cases at least 1.2, in some cases at least 1.3, in some cases at least 1.5, in some cases at least 2, and in some cases even more (e.g., 3 or more).

In some cases, the portion 118 of the traction projection 58$_i$ may be substantially vertical or nearly vertical (i.e., the angle $\theta_1$ may be or be close to 0°) in wet/spring snow. In other cases, the portion 118 of the traction projection 58$_i$ may be inclined in wet/spring snow, but may be more inclined in powder snow.

For example, in wet/spring snow, the angle $\theta_1$ may be no more than 30°, in some cases no more than 20°, in some cases no more than 10°, and in some cases 0°, while, in powder snow, the angle $\theta_1$ may be at least 30°, in some case at least 40°, in some cases at least 50°, and in some cases even more.

Figure 47:
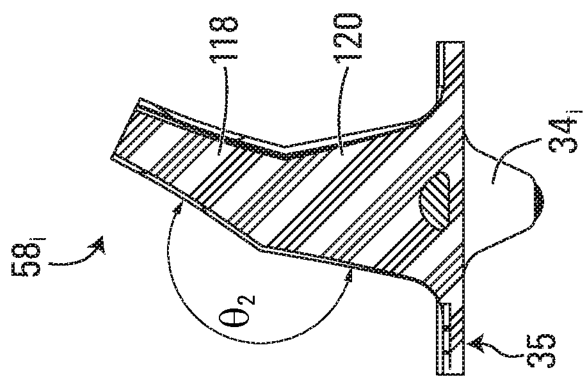
FIGS. 46 and 47 show a portion of a traction projection having an angular orientation that is different in powder snow than in wet/spring snow.

In some embodiments, as shown in FIG. 47, an angle $\theta_2$ between the portion 118 of the traction projection 58$_i$ and another portion 120 of the traction projection 58$_i$ that are adjacent in the height direction of the track 21 is different in powder snow than in wet/spring snow. The angle $\theta_2$ between the portion 118 of the traction projection 58$_i$ and the portion 120 of the traction projection 58$_i$ can be measured between respective tangents to the portion 118 of the traction projection 58$_i$ and the portion 120 of the traction projection 58$_i$.

In some cases, the angle $\theta_2$ is smaller in powder snow than in wet/spring snow. For instance, a ratio of the angle $\theta_2$ in wet/spring snow over the angle $\theta_2$ in powder snow may be at least 1.1, in some cases at least 1.2, in some cases at least 1.3, in some cases at least 1.5, in some cases at least 2, and in some cases even more (e.g., 3 or more).

In other cases, the angle $\theta_2$ may be greater in powder snow than in wet/spring snow. For instance, a ratio of the angle $\theta_2$ in powder snow over the angle $\theta_2$ in wet/spring snow may be at least 1.1, in some cases at least 1.2, in some cases at least 1.3, in some cases at least 1.5, in some cases at least 2, and in some cases even more (e.g., 3 or more).

In some cases, the traction projection 58$_i$ may be straight or nearly straight (i.e., $\theta_2$ may be or be close to 180°) in wet/spring snow. In other cases, the traction projection 58$_i$ may be substantially bent between the first portion 118 of the traction projection 58$_i$ and the second portion 120 of the traction projection 58$_i$ in wet/spring snow, but may be more bent between the first portion 118 of the traction projection 58$_i$ and the second portion 120 of the traction projection 58$_i$ in powder snow.

For instance, in wet/spring snow, the angle $\theta_2$ may be between 140° and 220°, in some cases between 150° and 210°, in some cases between 160° and 200°, and in some cases between 170° and 190°, while, in powder snow, the angle $\theta_2$ may be no more than 140°, in some case no more than 130°, in some cases no more than 120°, and in some cases even less.

In some embodiments, the shape of the traction projection 58$_i$ may be such that the height of the traction projection 58$_i$ is less in powder snow (or other looser matter on the ground) than in wet/spring snow (or other denser matter on the ground). For instance, a ratio of the height of the traction projection 58$_i$ in wet/spring snow over the height of the traction projection 58$_i$ in powder snow may be at least 1.1, in some cases at least 1.2, in some cases at least 1.3, in some cases at least 1.5, in some cases at least 2, and in some cases even more (e.g., 3 or more).

Moreover, in some embodiments, the shape of the traction projection 58$_i$ may be such that a dimension G of the traction projection 58$_i$ in the longitudinal direction of the track 21 is greater in powder snow (or other looser matter on the ground) than in wet/spring snow (or other denser matter on the ground). For instance, a ratio of the dimension G of the traction projection 58$_i$ in powder snow over the dimension G of the traction projection 58$_i$ in wet/spring snow may be at least 1.1, in some cases at least 1.2, in some cases at least 1.3, in some cases at least 1.5, in some cases at least 2, and in some cases even more (e.g., 3 or more).

The shape of the traction projection 58$_i$ may be less straight when humidity is lower. For instance, a ratio of the angle $\theta_1$ when the humidity has a given value over the angle $\theta_1$ when the humidity has a greater value may be at least 1.1, in some cases at least 1.2, in some cases at least 1.3, in some cases at least 1.5, in some cases at least 2, and in some cases even more (e.g., 3 or more). Moreover, a ratio of the angle $\theta_2$ when the humidity has a given value over the angle $\theta_2$ when the humidity has a lower value may be at least 1.1, in some cases at least 1.2, in some cases at least 1.3, in some cases at least 1.5, in some cases at least 2, and in some cases even more (e.g., 3 or more).

The shape of the traction projection 58$_i$ may be less straight when temperature is lower. For instance, a ratio of the angle $\theta_1$ when the temperature has a given value over the angle $\theta_1$ when the temperature has a greater value may be at least 1.1, in some cases at least 1.2, in some cases at least 1.3, in some cases at least 1.5, in some cases at least 2, and in some cases even more (e.g., 3 or more). Moreover, a ratio of the angle $\theta_2$ when the temperature has a given value over the angle $\theta_2$ when the temperature has a lower value may be at least 1.1, in some cases at least 1.2, in some cases at least 1.3, in some cases at least 1.5, in some cases at least 2, and in some cases even more (e.g., 3 or more).

The adaptability of the shape of the traction projection $\mathbf{58}_i$ may be implemented in any suitable way.

Figure 48:
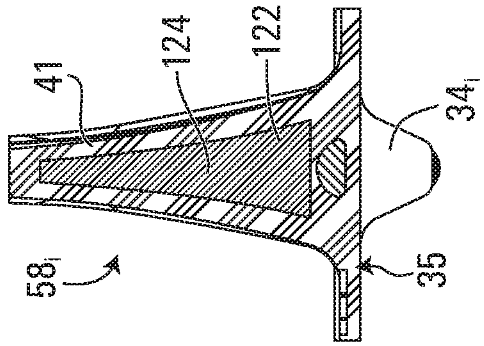
FIG. 48 shows a traction projection in accordance with another embodiment where the traction projection comprises a shape-changing member to change the shape of the traction projection in response to the stimulus.

For instance, as shown in FIG. 48, the traction projection $\mathbf{58}_i$ may comprise a shape-changing member 122 to change the shape of the traction projection $\mathbf{58}_i$ in response to the stimulus. In one example of implementation, the shape-changing member 122 may comprise a shape-memory material 124 which has a "memory". The shape-memory material 124 is designed to acquire different shapes based on a stimulus (e.g., temperature, a magnetic or electric field, light, etc.).

In some embodiments, the shape-memory material 124 may comprise a shape-memory polymer. For example, the shape-memory polymer may be a physically cross-linked shape-memory polymer such as linear block copolymers. For instance, in one example of implementation, the shape-memory polymer may be a polyesterurethane. The shape-memory polymer may be any other suitably type of polymer in other embodiments (e.g., other plastics such as urethane).

In other embodiments, the shape-memory material 124 may comprise a shape-memory alloy. For example, the shape-memory alloy may be a copper-aluminium-nickel shape-memory alloy or a nickel-titanium alloy. The shape-memory alloy may be any other suitably type of alloy in other embodiments (e.g., an iron-manganese-silicon alloy or a copper-zinc-aluminium alloy). Alternatively, the shape-memory material 124 may comprise a woven material or a non-woven material. For example, the woven or non-woven material may comprise polyester, nylon, fiber glass, carbon fiber, or any other suitable woven or non-woven material.

Figure 49:
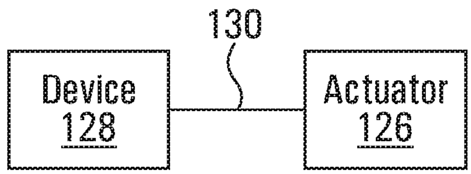
FIG. 49 shows an embodiment where the shape-changing member comprises an actuator to change a shape of the shape-changing member in response to a signal.

In some embodiments, with additional reference to FIG. 49, the shape-changing member 122 may comprise an actuator 126 to change a shape of the shape-changing member 122 in response to a signal. The actuator 126 may be any suitable type of actuator such as an electric actuator, a fluidic actuator or a pneumatic actuator. For example, the actuator 126 may comprise a motor, a piston, or any other suitably type of actuator.

The signal transmitted to the actuator 126 of the shape-changing member 122 may be an external signal received from a device 128 external to the track 21 over a link 130. In some embodiments, the device 128 may be a wireless device such that the link 130 between the device 128 and the actuator 126 is a wireless link and the signal is transmitted wirelessly over the link 130.

In some embodiments, the signal may be transmitted via contact with a part of the track 21 (e.g., via a port) such that the link 130 is a wired link.

The device 128 may be any suitably type of device. For example, the device 128 may be a remote control, a smartphone, a computer, a personal digital assistant (PDA), a tablet, etc. Moreover, in some embodiments, the device 128 may be an integral part of the snowmobile 10. For example, the device 128 may be a button (or any other type of interface element) that is a part of the user interface 20 of the snowmobile 10.

Figure 50:
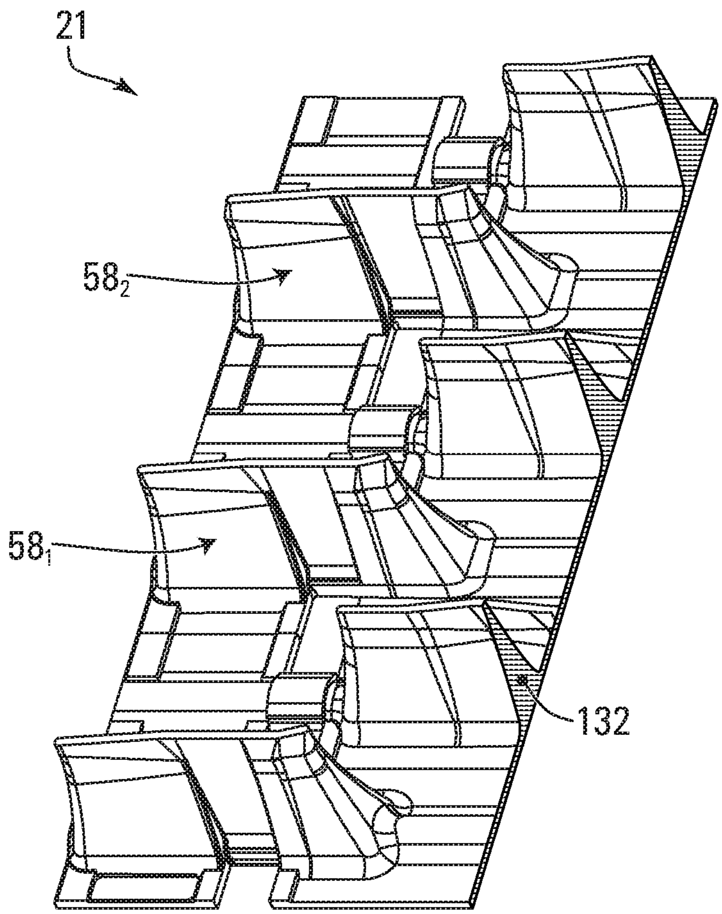
FIG. 50 shows an example of an embodiment of a device within the track that transmits the signal to the shape-changing member.

In some embodiments, as shown in FIG. 50, the signal may be an internal signal received from a device 132 within the track 21. For example, the device 132 may be a sensor. The device 132 may be provided in the track 21 in any suitable way. For instance, the device 132 may be positioned within a mold and then overmolded by the elastomeric material(s) of the track 21. Moreover, the device 132 may be positioned in any suitable part of the track 21. For instance, the device 132 may be placed within the traction projections $\mathbf{58}_1$-$\mathbf{58}_T$, within the carcass 35 or within the drive/guide lugs $\mathbf{34}_1$-$\mathbf{34}_D$.

7.2 Other Adaptable Components

In some embodiments, in addition to or instead of the traction projections $\mathbf{58}_1$-$\mathbf{58}_T$, one or more other components of the track 21 (e.g., the carcass 35, the drive/guide lugs $\mathbf{34}_1$-$\mathbf{34}_D$) may be adaptable in response to a stimulus such that a state of that component of the track 21 (e.g., a stiffness or other property; a shape; and/or any other characteristic of the given component of the track) is variable in different conditions (e.g., weather conditions; ground conditions, such as different types of snow, soil, etc.; and/or other conditions) to better perform in specified conditions. Principles discussed above in section 1.1 in respect of the traction projections $\mathbf{58}_1$-$\mathbf{58}_T$ may be applied to adaptability of these one or more other components of the track 21.

For instance, in some embodiments, the transversal stiffening rods $\mathbf{36}_1$-$\mathbf{36}_N$ may have an adaptable response to a stimulus such that a state of the transversal stiffening rods is variable in different conditions. This could allow the widthwise rigidity of the track 21 to vary in specified conditions.

8. Adjustable Contact Patch

Figure 51:
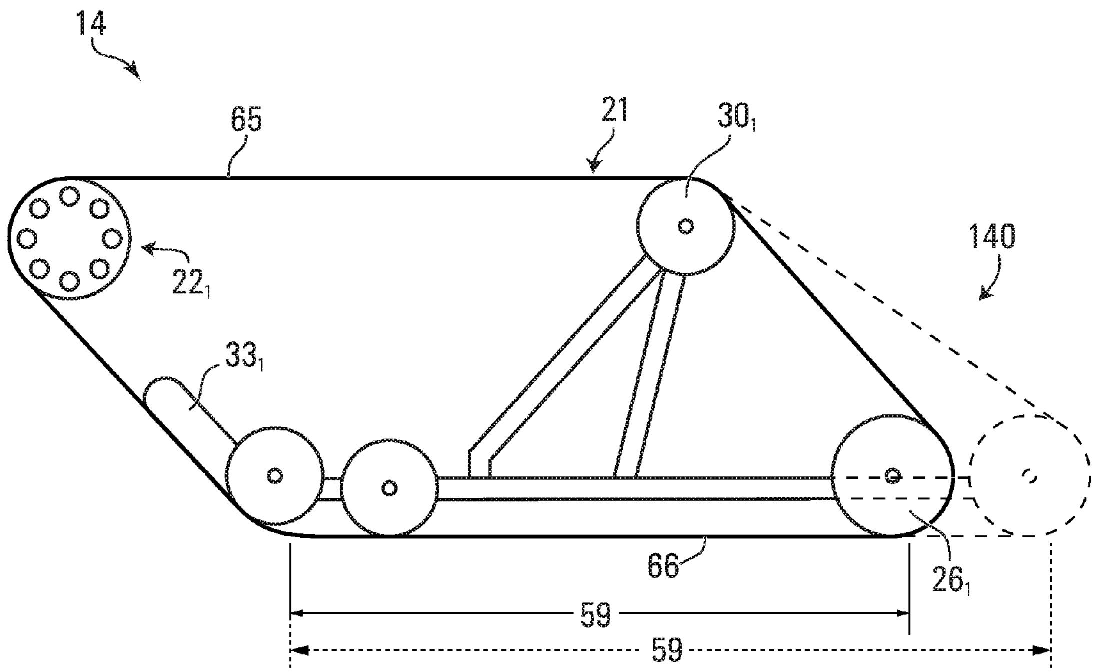
FIG. 51 shows an example of an embodiment in which the track system comprises an adjustment mechanism for changing a configuration of the track-engaging assembly of the track system.

In some embodiments, as shown in FIG. 51, the track system 14 may be configured to adjust a size of the contact patch 59 of the track 21 with the ground. This may be useful, for example, to make the contact patch 59 of the track 21 larger when the snowmobile 10 travels on deep powder snow or other soft grounds for enhanced floatation while making the contact patch 59 of the track 21 smaller when the snowmobile 10 travels on packed snow or other hard grounds for facilitating steering and/or attaining higher operating speeds.

To that end, in this embodiment, the track system 14 comprises an adjustment mechanism 140 to change a configuration of the track-engaging assembly 24 in order to vary the size of the contact patch 59 of the track 21 with the ground. For example, in some embodiments, the adjustment mechanism 140 may be configured to change a position of one or more of the rear idler wheels $\mathbf{26}_1$, $\mathbf{26}_2$, the lower roller wheels $\mathbf{28}_1$-$\mathbf{28}_6$, and/or the sliding surfaces $\mathbf{77}_1$, $\mathbf{77}_2$ of the elongate support 62 in order to vary the size of the contact patch 59 of the track 21 with the ground.

Figure 52:
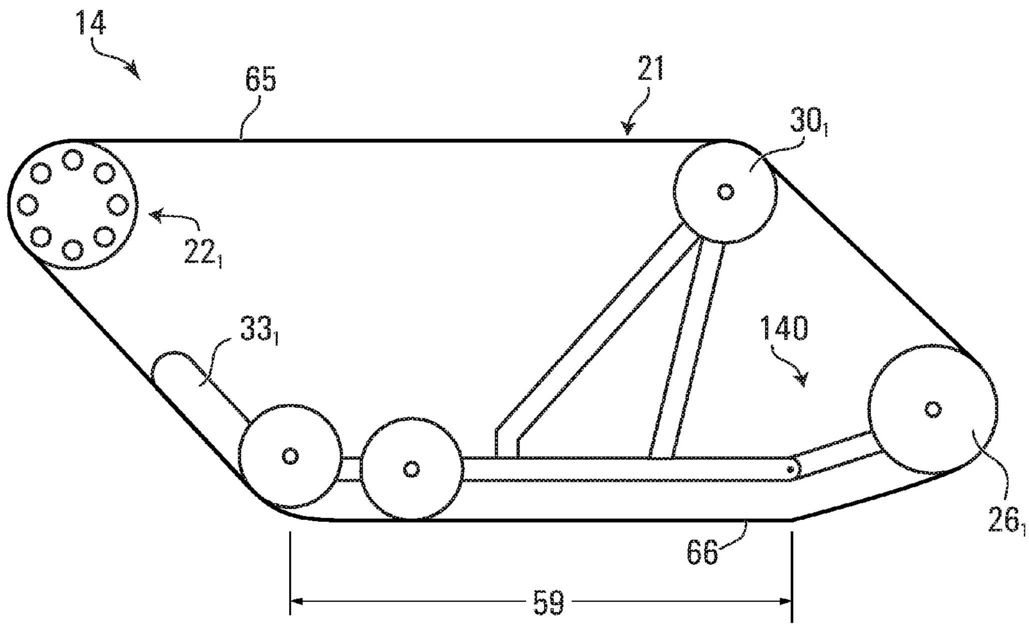
FIG. 52 shows the adjustment mechanism according to an embodiment in which the adjustment mechanism can change the configuration of the track-engaging assembly while a length of the track remains constant.
Figure 53:
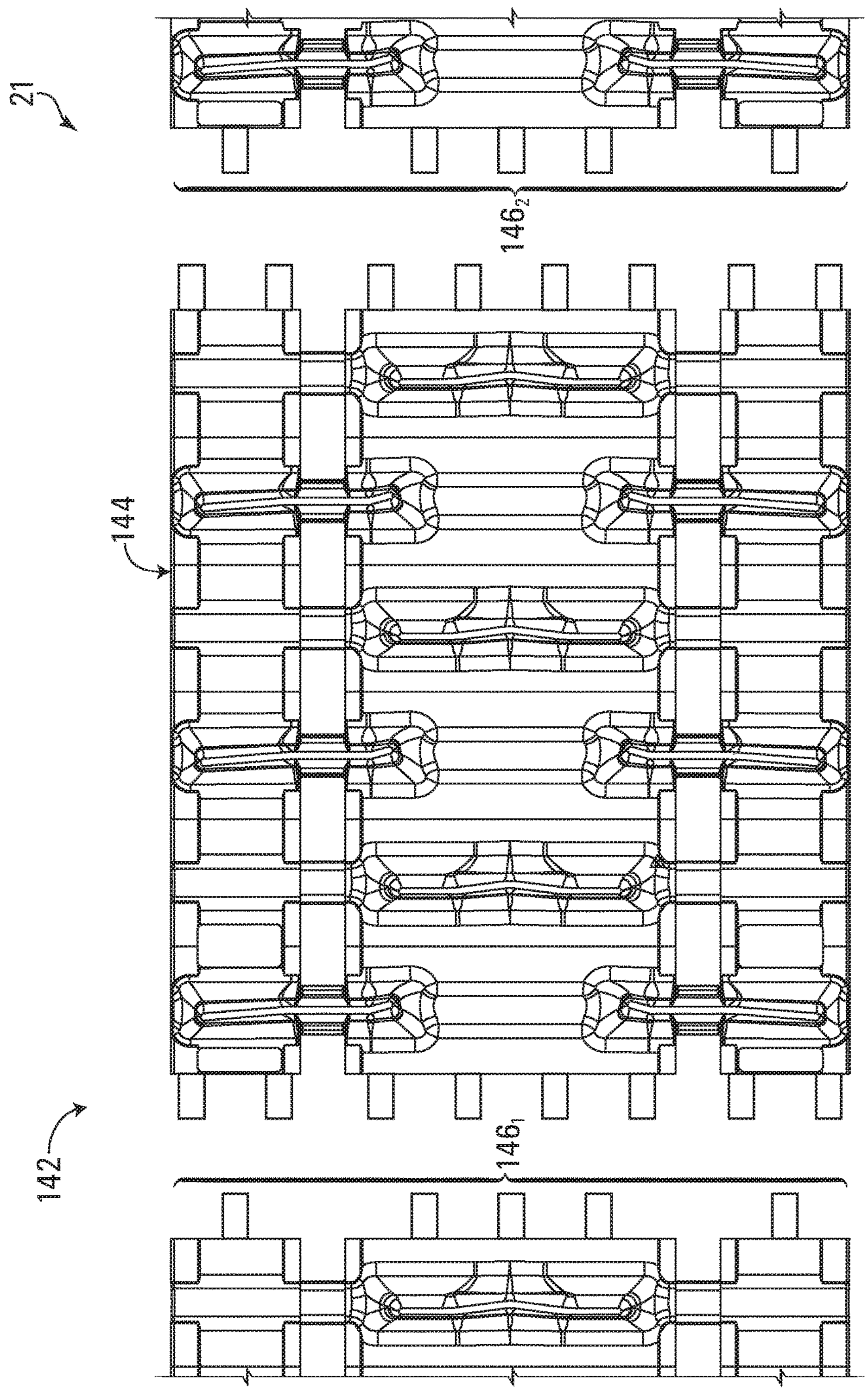
FIGS. 53 to 57 show an example of an embodiment of the track in which the track comprises an adjustment mechanism to adjust the length of the track.
Figure 54:
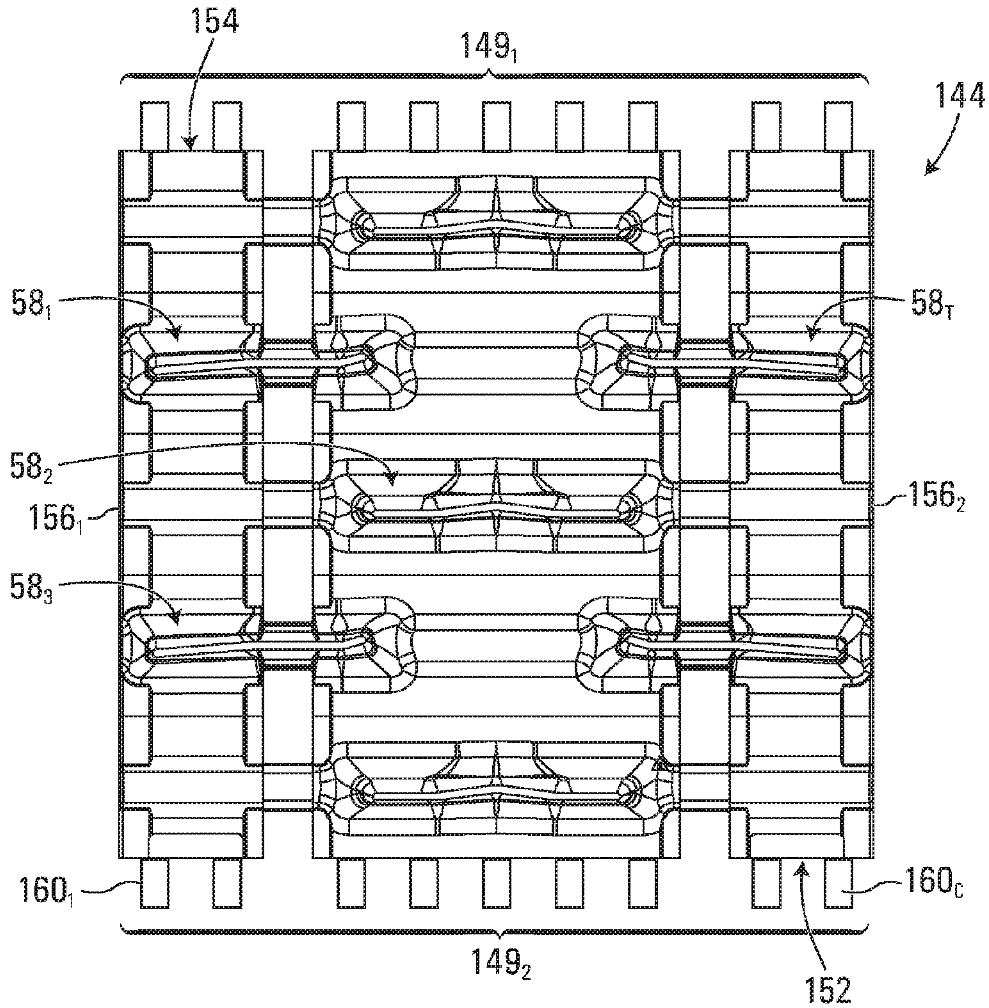
Figure 55:
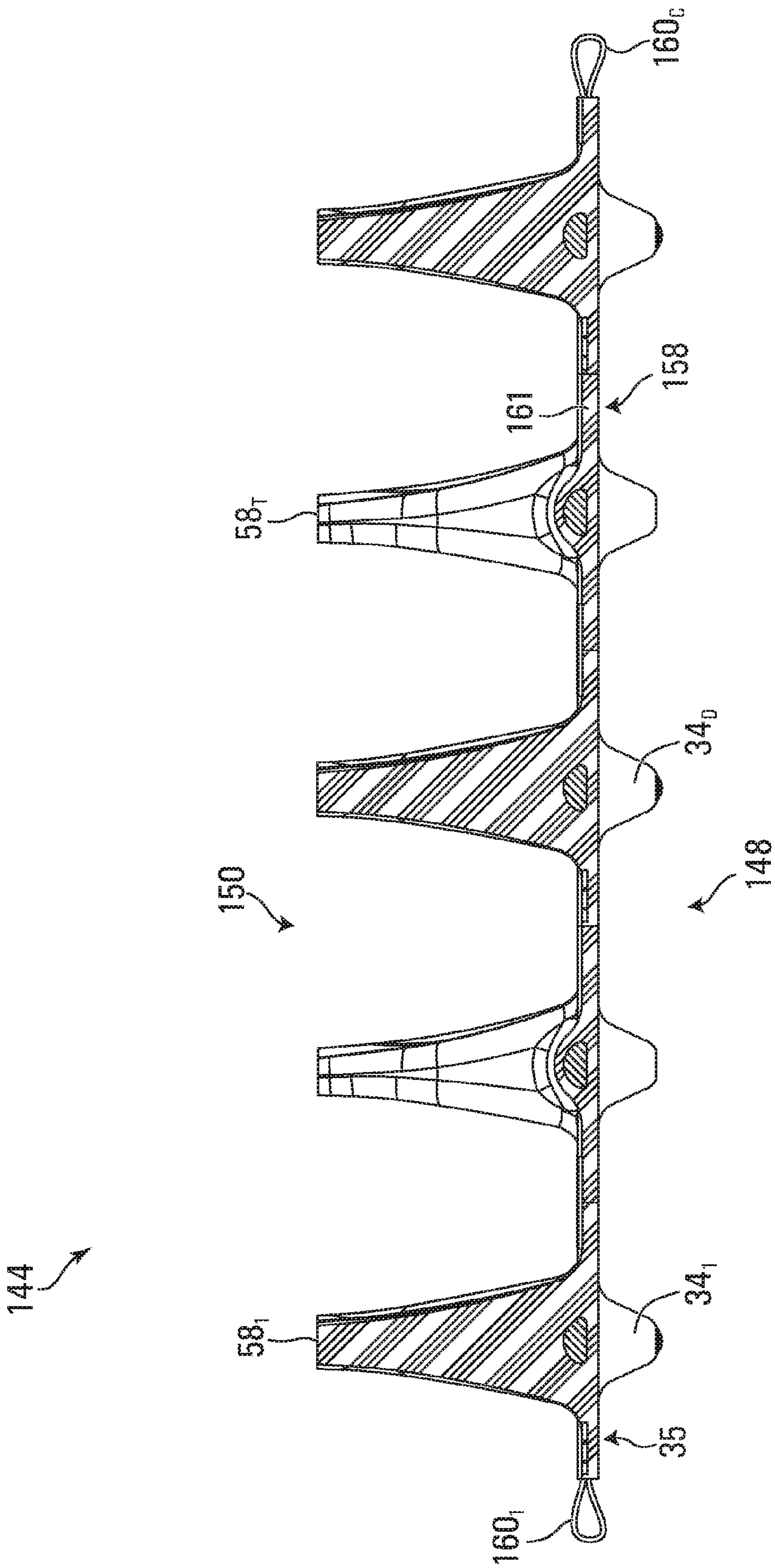
Figure 56:
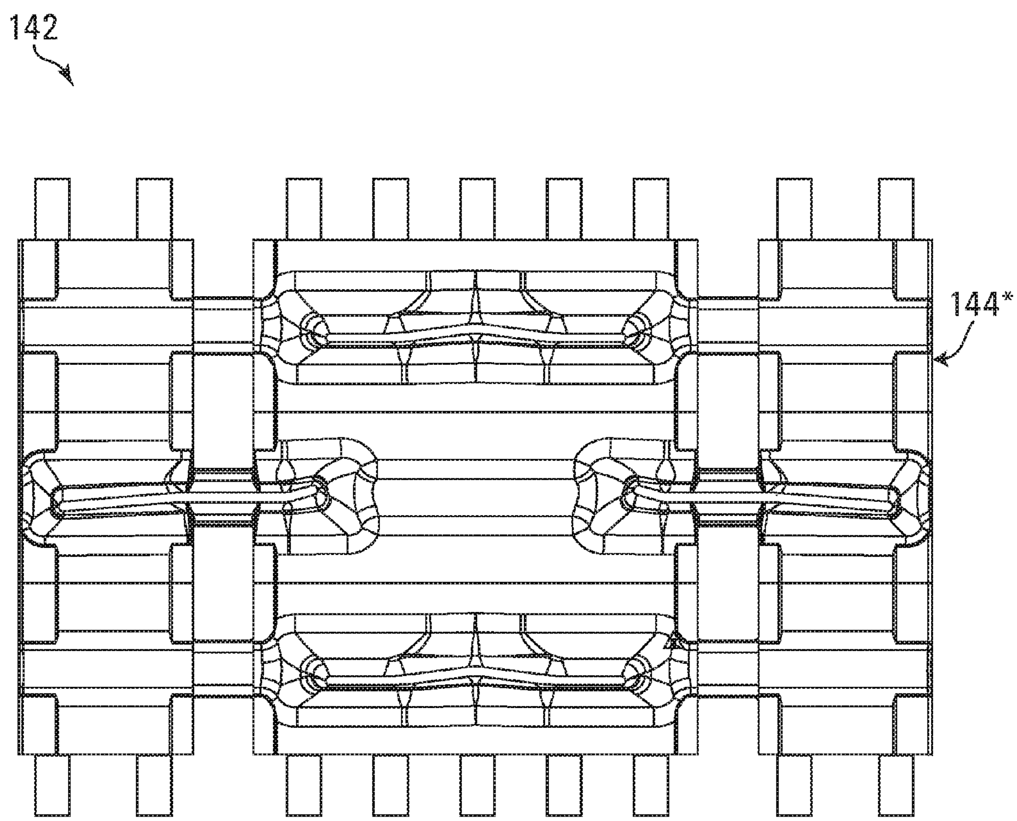

In some cases, as shown in FIG. 52, the adjustment mechanism 140 may change the configuration of the track-engaging assembly 24 while the length of the track 21 remains constant (i.e., there is no change in the length of the track 21), such that a shape of the track 21 around the track-engaging assembly 24 is changed to vary the size of the contact patch 59 of the track 21 with the ground.

In other cases, as shown in FIGS. 53 to 57, the track 21 may comprise an adjustment mechanism 142 to adjust the length of the track 21 to accommodate the adjustment mechanism 140 changing the configuration of the track-engaging assembly 24. For example, in some embodiments, the adjustment mechanism 142 of the track 21 may comprise a track section 144 that is removable from the track 21 to vary the length of the track 21. The adjustment mechanism 142 of the track 21 also comprises connectors $\mathbf{146}_1$, $\mathbf{146}_2$ for interconnecting the track section 144 to a remainder of the track 21. For instance, in some examples, the track section 144 may be replaceable with another track section 144* of different dimensions. In other examples, the track 21 may be closed by connecting the connectors 146$_1$, 146$_2$ to one another without any track section therebetween.

The track section 144 comprises an inner side 148, a ground-engaging outer side 150, a front edge 152, a rear edge 154, and two lateral edges 156$_1$, 156$_2$. The track section 144 comprises an elastomeric body 158 underlying the inner side 148 and the ground-engaging outer side 150. In view of its underlying nature, the elastomeric body 158 can be referred to as a "carcass". The carcass 158 is elastomeric in that it comprises elastomeric material 161 (e.g., rubber). In this case, a plurality of components, including connectors 149$_1$, 149$_2$ and a plurality of reinforcements are embedded in the elastomeric material 161 of the carcass 158.

In this embodiment, the track section 144 comprises a plurality of reinforcing cables 137$_1$-137$_M$ adjacent to one another and extending generally in a longitudinal direction of the track section 144 (i.e., a direction from the front edge 152 to the rear edge 154 of the track section 144) to enhance strength in tension of the track section 144. The reinforcing cables 137$_1$-137$_M$ may be similar to the reinforcing cables 37$_1$-37$_M$. The track section 144 may also comprise a layer of reinforcing fabric 143 similar to the layer of reinforcing fabric 43.

The ground-engaging outer side 150 of the track section 144 comprises a number of traction projections 58$_1$-58$_T$ and the inner side 148 of the track section 144 comprises a number of drive/guide lugs 34$_1$-34$_D$. In order to make a transition between the track section 144 and the remainder of the track 21 as "seamless" as possible, in some embodiments, the traction projections 58$_1$-58$_T$ of the track section 144 may form a pattern that complements a pattern of the traction projections 58$_1$-58$_T$ of the remainder of the track 21.

More particularly, in this embodiment, the front edge 152 and the rear edge 154 of the track 21 terminate at a midsection of a hole 40$_i$ and thus the ends of the remainder of the track 21 also terminate at a midsection of a hole 40$_i$.

Figure 57:
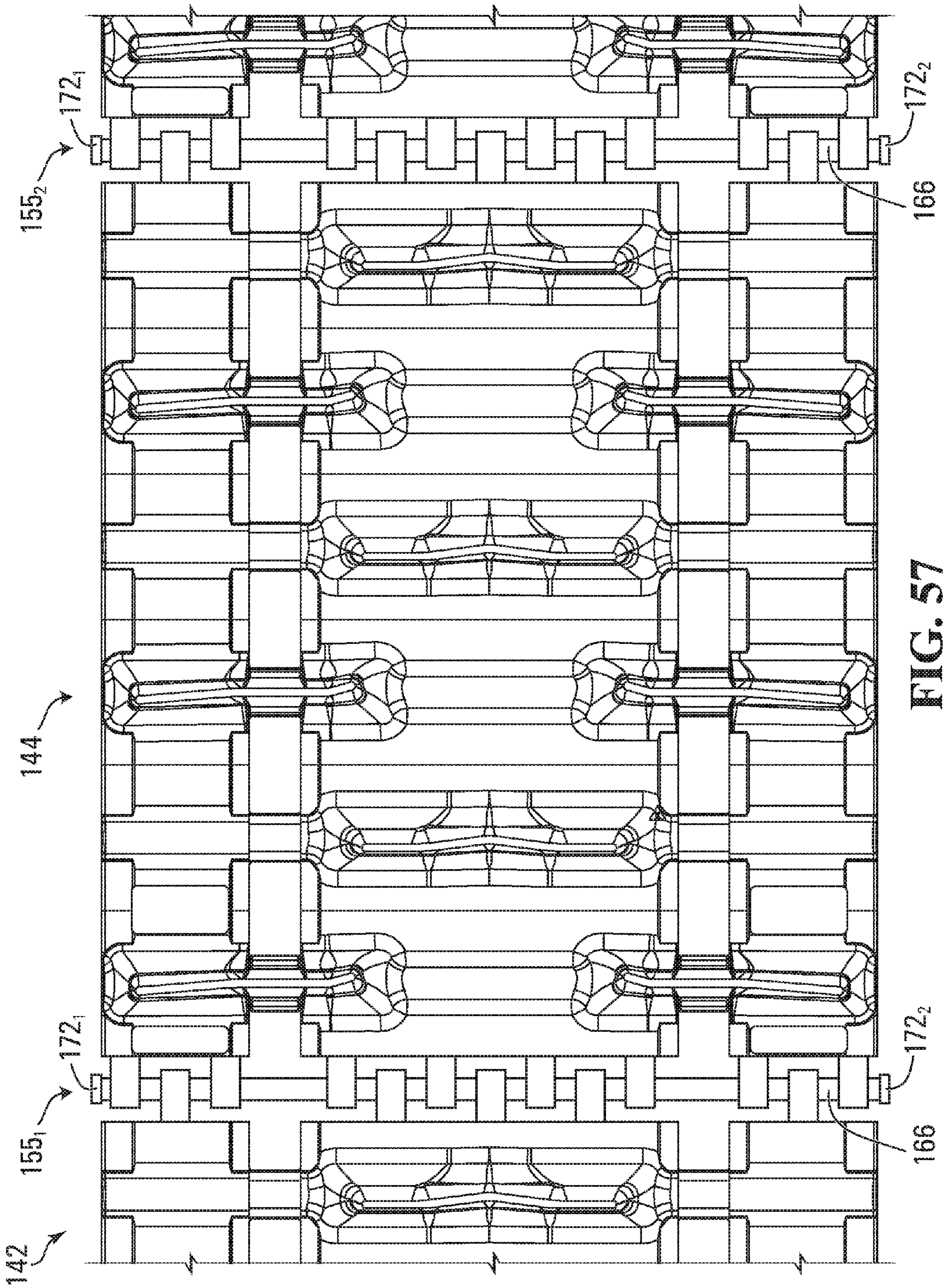

The connectors 149$_1$, 149$_2$ are affixed to the front and rear edges 152, 154 of the track section 144 and are configured to cooperate with the connectors 146$_1$, 146$_2$ to form joints 155$_1$, 155$_2$. In this embodiment, as shown in FIG. 57, each joint 155$_i$ is an "alligator"-type joint. More particularly, the joint 155$_i$ comprises an elongated interlinking member 166 that interlinks a connector 149$_i$ with a connector 146$_i$ to allow the track section 144 to hingedly move relative to the remainder of the track 21 as the track 21 is driven by the drive wheels 22$_1$, 22$_2$. In other words, in this embodiment, the interlinking member 166 acts as a pin and the joint is basically a hinge joint. This motion enables a change in longitudinal curvature (i.e., curvature along the longitudinal direction of the track 21) of a portion of the track 21 as it goes around the drive wheels 22$_1$, 22$_2$.

End fittings 172$_1$, 172$_2$ may be mounted to the interlinking member 166 to ensure it does not move out of the connectors 146$_1$, 146$_2$, 149$_1$, 149$_2$.

In embodiments where the holes 40$_1$-40$_H$ are not used to drive the track 21 (i.e., the drive/guide lugs 34$_1$-34$_D$ are used to drive the track 21), the interlinking member 166 may be a single interlinking member that extends from one lateral edge 156$_1$ to the other lateral edge 156$_2$ of the track section 144, as illustrated in FIG. 57. In other embodiments, particularly where the holes 40$_1$-40$_H$ are used to drive the track 21, the interlinking member 166 may comprise a plurality of interlinking elements engaging the connectors 146$_1$, 146$_2$, 149$_1$, 149$_2$ and not traversing the holes 40$_1$-40$_H$. In such embodiments, end fittings may be provided at the ends of each interlinking element.

Figure 58:
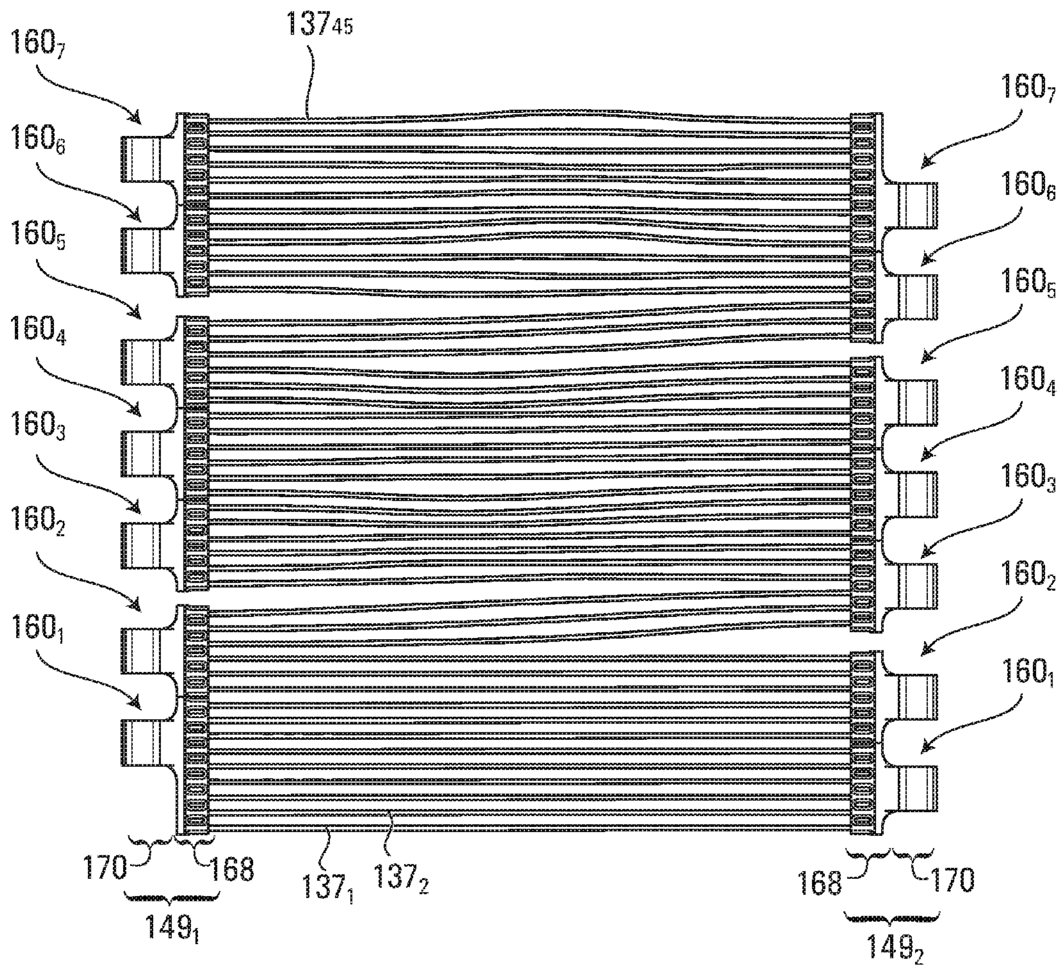
FIGS. 58 and 59 show an example of a connection member of a connector of the adjustment mechanism of FIGS. 53 to 57.

With additional reference to FIG. 58, each of the connectors 149$_1$, 149$_2$ comprises an anchoring portion 168 and a connecting portion 170. The anchoring portion 168 of each connector 149$_i$ is embedded in the rubber 161 of the carcass 158 and anchors the connector 149$_i$ to the carcass 158, while the connecting portion 170 of the connector 149$_i$ lies outside the carcass 158 to be connected to a connecting portion of a connector 146$_i$.

In this embodiment, as shown in FIG. 58, each connector 149$_i$ comprises a plurality of connection members 160$_1$-160$_C$ separate from one another and disposed adjacent to one another. Each connection member 160$_i$ comprises an anchoring part 162 and a connecting part 164. The anchoring part 162 is embedded in the rubber 161 of the carcass 158 and anchors the connection member 160$_i$ to the carcass 158, while the connecting part 164 lies outside the carcass 158 to be connected to the connecting portion of a connector 146$_i$. Thus, the anchoring parts 162 of the connection members 160$_1$-160$_C$ of the connector 149$_i$ collectively constitute the anchoring portion 168 of the connector 149$_i$.

Figure 59:
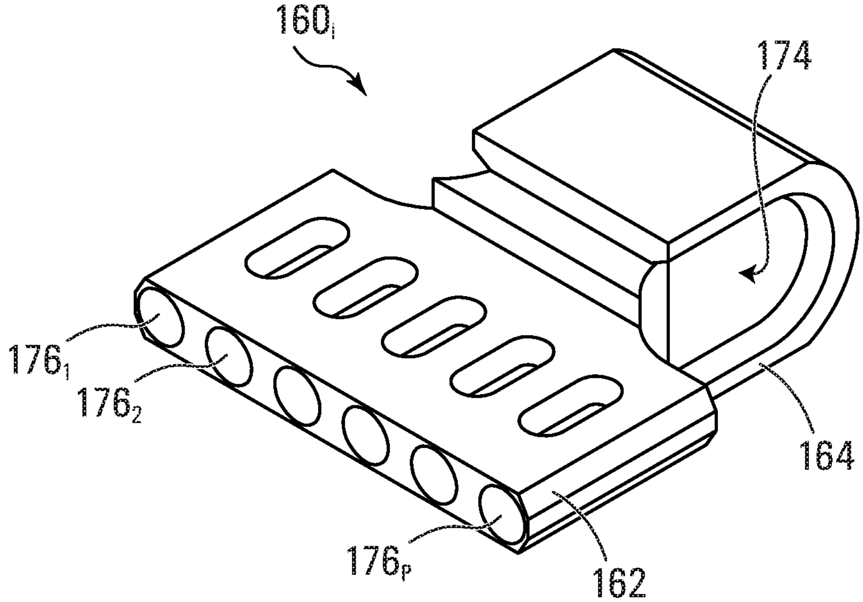

Each of the connection members 160$_1$-160$_C$ is coupled to a subset of the reinforcing cables 137$_1$-137$_M$. More specifically, as shown in FIG. 59 the anchoring part 162 of each connection member 160$_i$ defines a plurality of openings 176$_1$-176$_P$ for receiving therein the corresponding subset of reinforcing cables 137$_1$-137$_M$. The connecting part 164 of each connection member 160$_i$ defines an opening 174 to receive the elongated interlinking member 166.

The adjustment mechanism 140 to change the configuration of the track-engaging assembly 24 may be implemented in any suitable way.

8.1 Toolless Adjustment

Figure 60:
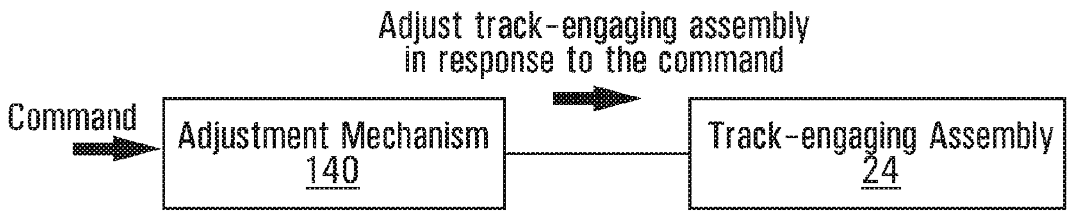
FIG. 60 shows a diagram depicting an adjustment command inputted the adjustment mechanism in order to adjust the configuration of the track-engaging assembly.

In some embodiments, as shown in FIG. 60, the adjustment mechanism 140 may be configured to change the configuration of the track-engaging assembly 24 toollessly, i.e., without use of any tool (e.g., wrench, screwdriver, etc.) separate from and external to the track system 14 that has to be mechanically engaged with the track-engaging assembly 24. More particularly, in this embodiment, the adjustment mechanism 140 is configured to change the configuration of the track-engaging assembly 24 in response to a command. This command, which may be referred to as an "adjustment command", is provided toollessly (i.e., without use of any tool separate from and external to the track system 14 that has to be mechanically engaged with the track-engaging assembly 24). In some cases, the adjustment command may be provided by the user of the snowmobile 10, whereas, in other cases, the adjustment command may be generated automatically.

Figure 61:
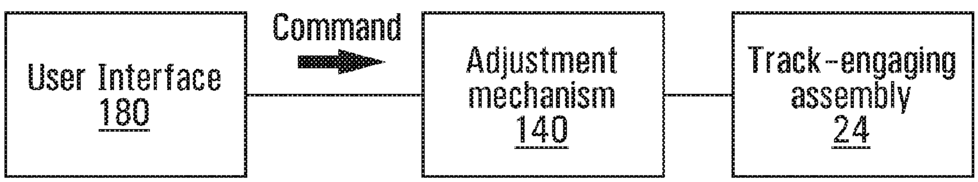
FIG. 61 shows a diagram depicting a user interface of the adjustment mechanism with which the user interacts to input the adjustment command.
Figure 62:
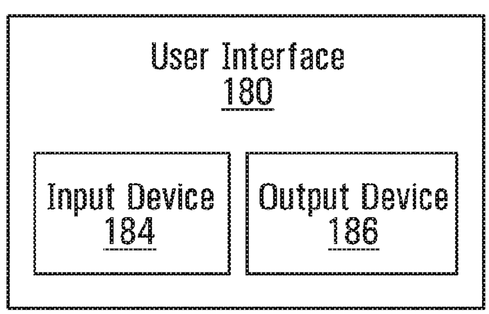
FIG. 62 shows the user interface of the adjustment mechanism.
Figure 63:
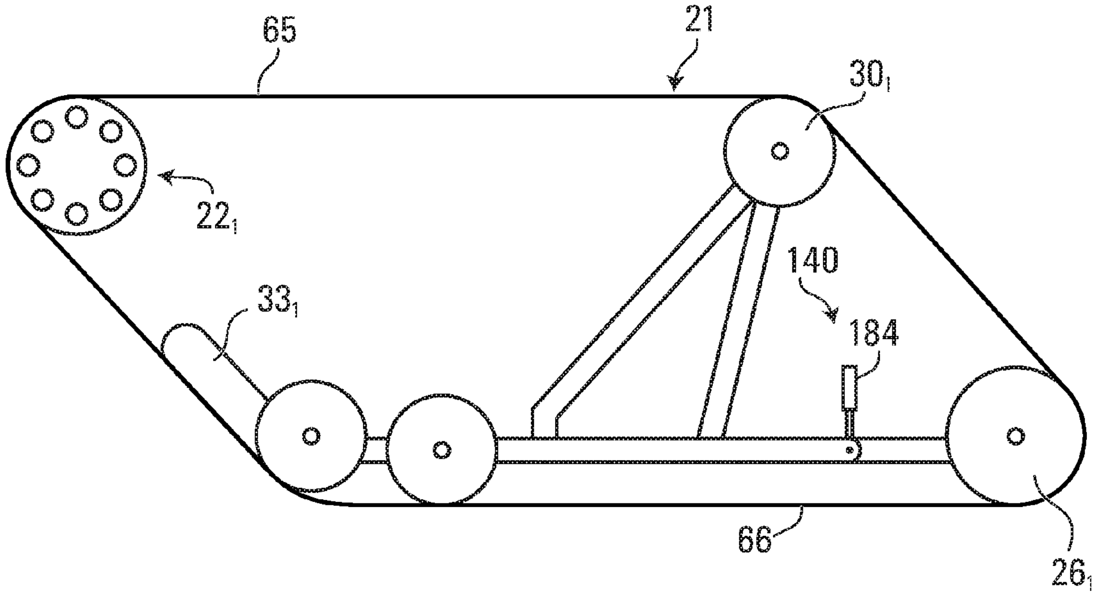
FIGS. 63 to 66 show an example of an embodiment of the adjustment mechanism in which the adjustment mechanism is manually operated.
Figure 64:
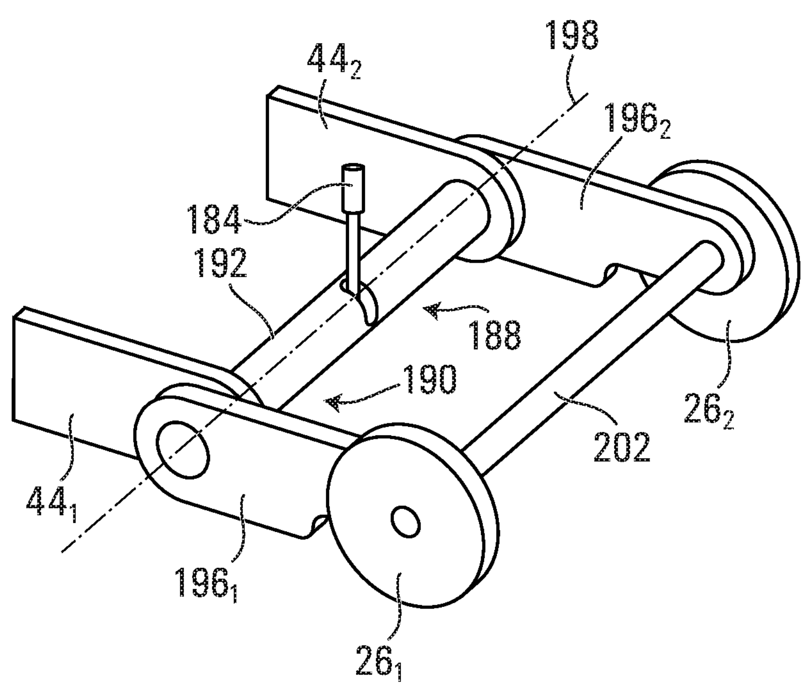
Figure 65:
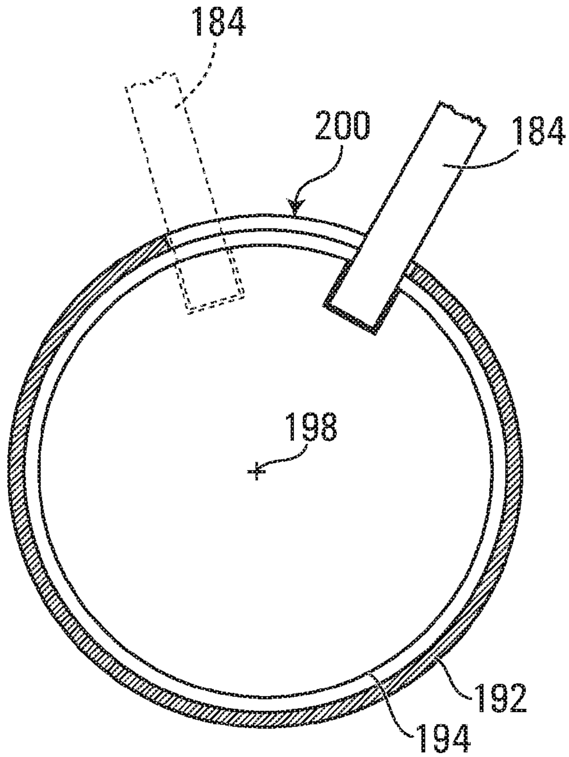
Figure 66:
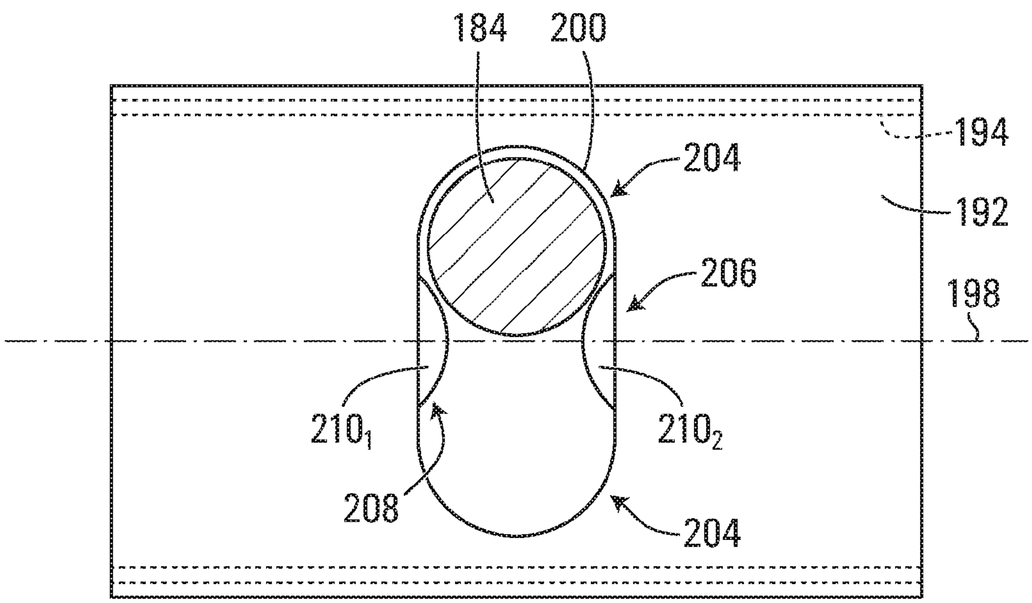

8.1.1. Adjusting Configuration of Track-engaging Assembly with Minimal User Input In some embodiments, as shown in FIGS. 61 to 63, the adjustment mechanism 140 for changing the configuration of the track-engaging assembly 24 may be manually operated to allow changing the configuration of the track-engaging assembly 24 through minimal user input. In other words, the adjustment mechanism 140 may facilitate a manual adjustment of the configuration of the track-engaging assembly 24. To that end, the adjustment command is inputtable by the user of the snowmobile 10 via a user interface 180 configured to allow the user to adjust the configuration of the track-engaging assembly 24. In this embodiment, the adjustment mechanism 140 comprises the user interface 180.

As shown in FIG. 62, the user interface 180 comprises an input device 184 that the user can act upon to adjust the track-engaging assembly 24. The input device 184 may be implemented in any suitable way. For example, in some embodiments, the input device 184 may comprise a mechanical input element, such as a lever, a switch, a button, a dial, a knob, a manual screw, a clamp, or any other physical element that the user can act upon to adjust the track-engaging assembly 24. In other embodiments, the input device 184 may comprise a virtual input element, such as a virtual button or other virtual control, of a graphical user interface (GUI) displayed on a screen.

The user interface 180 may also comprise an output device 186 that can convey information about the track-engaging assembly 24 to the user in order to facilitate the adjustment of the track-engaging assembly 24. For example, in some embodiments, the output device 186 may comprise a display for displaying information to the user of the snowmobile 10. For instance, the display may be configured to display the size of the contact patch 59 of the track 21, or any other parameter related to the track system 14.

When the user acts upon the input device 184 of the user interface 180, the adjustment command is conveyed to the adjustment mechanism 140 to adjust the track-engaging assembly 24. The adjustment mechanism 140 comprises an actuator 188 for adjusting the track-engaging assembly 24 based on the adjustment command.

Figure 67:
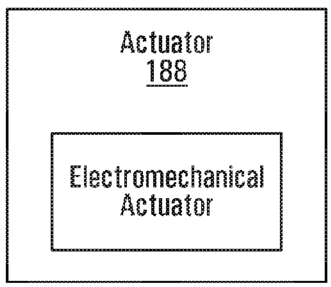
FIGS. 67 and 68 show examples of an actuator of the adjustment mechanism of FIG. 63.
Figure 68:
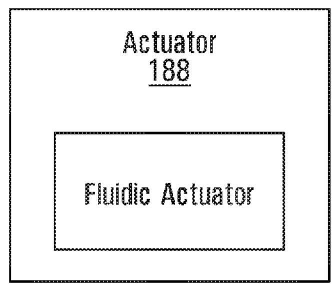

In this embodiment, as will be described in more detail below, the actuator 188 comprises a mechanical actuator. The actuator 188 may comprise other types of actuators in other embodiments. For instance, as shown in FIGS. 67 and 68, in some embodiments, the actuator 188 may comprise an electromechanical actuator (e.g., a linear actuator) or a fluidic actuator (e.g., a hydraulic or pneumatic actuator).

In some embodiments, the adjustment command may be conveyed as a mechanical action. For instance, the adjustment command may constitute a mechanical motion that is transmitted via the actuator 188 of the adjustment mechanism 140. In some cases, the adjustment command may be conveyed via a linkage or any other mechanical transmission.

In other embodiments, the adjustment command may be conveyed as a signal. For instance, the adjustment command may be conveyed as an electrical signal configured to be received by an electromechanical actuator.

With additional reference to FIG. 63, in this embodiment, the input device 184 comprises a lever configured to be acted upon by the adjustment command of the user while the actuator 188 comprises a rotary mechanism 190 that effects an adjustment of the size of the contact patch 59 of the track 21 based on the adjustment command that the user transmits to the lever 184.

The rotary mechanism 190 is configured to enable the rear idler wheels 26$_1$, 26$_2$ to pivot about a pivot axis such as to change the configuration of the track-engaging assembly 24. To that end, in this embodiment, the rotary mechanism 190 comprises a tube 192, a shaft 194 engaged with and rotatable relative to the tube 192, and a pair of linking members 196$_1$, 196$_2$ that connects the rotary mechanism 190 to the rear idler wheels 261, 262.

The tube 192 extends along a longitudinal axis 198 that is generally parallel to the widthwise direction of the track system 14. The tube 192 is fixedly connected to the rails 44$_1$, 44$_2$ of the elongate support 62 (e.g., via a pressure fit) and receives the shaft 194 in its hollow interior. Moreover, the tube 192 comprises a slot 200 extending in its circumferential direction.

The shaft 194 is received within the tube 192 and is rotatable relative to the tube 192 about its longitudinal axis 198 (which can be referred to as a pivot axis). For instance, bearings may be disposed between an outer surface of the shaft 194 and an inner surface of the tube 192 to allow the shaft 194 to rotate relative to the tube 192. The lever 184 is connected to the shaft 194 (e.g., via a threaded connection) such that actuation of the lever 184 results in a rotation of the shaft 194 about the pivot axis 198.

The linking members 196$_1$, 196$_2$ connect the rotary mechanism 190 to the rear idler wheels 26$_1$, 26$_2$. More particularly, the linking members 196$_1$, 196$_2$ are connected to and supported by the shaft 194. The connection between the linking members 196$_1$, 196$_2$ and the shaft 194 is a fixed connection that prevents rotation of the linking members 196$_1$, 196$_2$ relative to the shaft 194. For example, the linking members 196$_1$, 196$_2$ may be connected to the shaft 194 via a pressure fit, welding, a fastener, or any other suitable method. The linking members 196$_1$, 196$_2$ are also fixedly connected to an axle 202 of the rear idler wheels 26$_1$, 26$_2$.

The lever 184 traverses the tube 192 via its slot 200. In this embodiment, as will be explained in more detail below, the slot 200 allows at least two positions of the lever 184. More specifically, in this embodiment, the slot 200 comprises two open portions 204 for receiving the lever 184 and a restricting portion 206 between the open portions 204 for restricting passage of the lever 184. The open portions 204 of the slot 200 accommodate the size of the lever 184 (e.g., its diameter) such that there is a clearance between a periphery of the slot 200 and the lever 184. Conversely, the restricting portion 206 of the slot 200 is configured to bar the passage of the lever 184 from one open portion to the other. In other words, a sizing of the restricting portion 206 is such that the lever 184 does not readily pass from one open portion 204 to the other. For example, the sizing of the restricting portion 206 may be equal to or less than the size of the lever 184. To that end, in this embodiment, a resilient member 208 may be provided at the restricting portion 206 to restrict the passage of the lever 184. The resilient member 208 is deformable from a first configuration to a second configuration in response to a load and can recover its first configuration upon removal of the load. In this example, the resilient member 208 comprises two resilient elements 210$_1$, 210$_2$ opposite one another, each resilient element 210$_i$ comprising an elastomeric material such as rubber.

Thus, in use, the operator of the snowmobile 10 actuates the lever 184 to move it from one open portion 204 of the slot 200 to the other open portion. The restricting portion 206 of the slot 206 allows the passage of the lever 184 due to the force applied by the operator on the lever 184 under which the resilient member 208 deforms to allow passage of the lever 184. This causes a rotation of the shaft 194 about the pivot axis 198 which in turn causes the linking members 196$_1$, 196$_2$ and the rear idler wheels 26$_1$, 26$_2$ to pivot about the pivot axis 198. In this manner, the configuration of the track-engaging assembly 24 can be changed to reduce the contact patch 59 of the track 21.

In a variant, the user interface 180 may be a part of the snowmobile 10 rather than the track system 14. For instance, the user interface 180 may be a part of the user interface 20 of the snowmobile 10 (e.g., a part of the instrument panel of the snowmobile 10). For example, in some cases, the input device 184 of the user interface 180 may comprise a switch on the instrument panel of the snowmobile 10 that can be actuated by the user to transmit an adjustment command to the actuator 188 which adjusts the track-engaging assembly 24. In such cases, the actuator 188 may not be a purely mechanical actuator but rather an electromechanical actuator or a fluidic actuator that is configured to receive the adjustment command provided as a signal (i.e., an electrical signal).

8.1.2. Adjusting Configuration of Track-engaging Assembly Automatically

Figure 69:
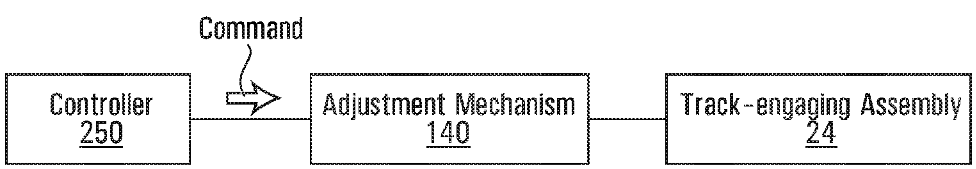
FIG. 69 shows a diagram depicting a controller of the adjustment mechanism for automatically generating the adjustment command.

In some embodiments, as shown in FIG. 69, the adjustment mechanism 140 for adjusting the track-engaging assembly 24 may enable an automatic adjustment of the track-engaging assembly 24, i.e., adjustment of the track-engaging assembly 24 without user input. To that end, the adjustment command is automatically generated by a controller 250. In this embodiment, the adjustment mechanism 140 comprises the controller 250.

Figure 70:
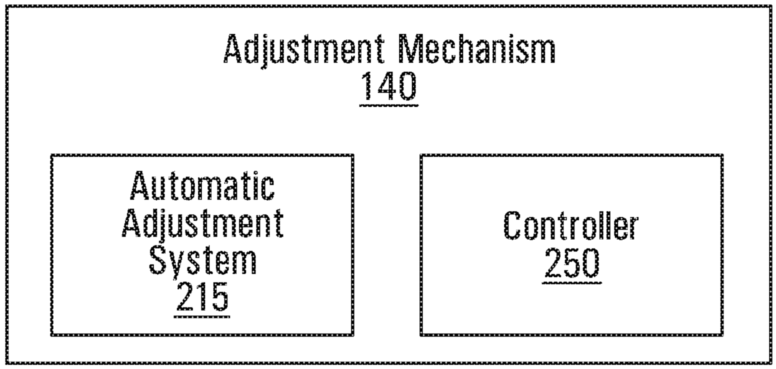
FIG. 70 shows an example of an embodiment in which the adjustment mechanism comprises the controller and an automatic adjustment system for automatically adjusting the configuration of the track-engaging assembly.

For instance, in this embodiment, as shown in FIG. 70, with the controller 250, the adjustment mechanism 140 may comprise an automatic adjustment system 215 configured to automatically adjust the track-engaging assembly 24.

The automatic adjustment of the track-engaging assembly 24 may be effected based on information regarding the track system 14. For example, in some embodiments, the information regarding the track system 14 may include information regarding the environment of the track system 14, such as, for example, the profile (e.g., the slope or steepness or the levelness) of the ground beneath the track system 14, the compliance (e.g., softness or hardness) of the ground beneath the track system 14, and/or any other parameter that pertains to the environment of the track system 14.

Figure 71:
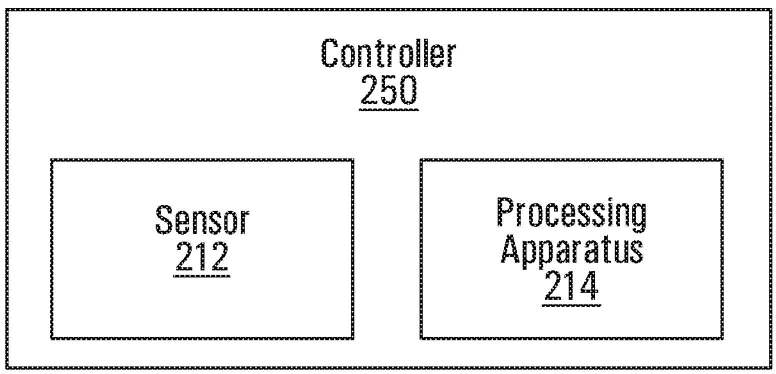
FIG. 71 shows an example of an embodiment of the controller of the adjustment mechanism, including a sensor and a processing apparatus.

In this embodiment, as shown in FIG. 71, the controller 250 for the automatic adjustment system 215 comprises a sensor 212 configured to sense one or more parameters relating to the track system 16$_i$ and a processing apparatus 214 configured to convey the adjustment command to adjust the track-engaging assembly 24 based on these one or more parameters relating to the track system 14. The adjustment mechanism 100 comprises an actuator 216 for adjusting the track-engaging assembly 24 based on the adjustment command from the processing apparatus 214.

The sensor 212 is configured to sense one or more parameters relating to the track system 14. For instance, as discussed above, examples of one or more parameters relating to the track system 14 that can be sensed by the sensor 212 include the profile of the ground beneath the track system 14 and/or the compliance of the ground beneath the track system 14.

Figure 72:
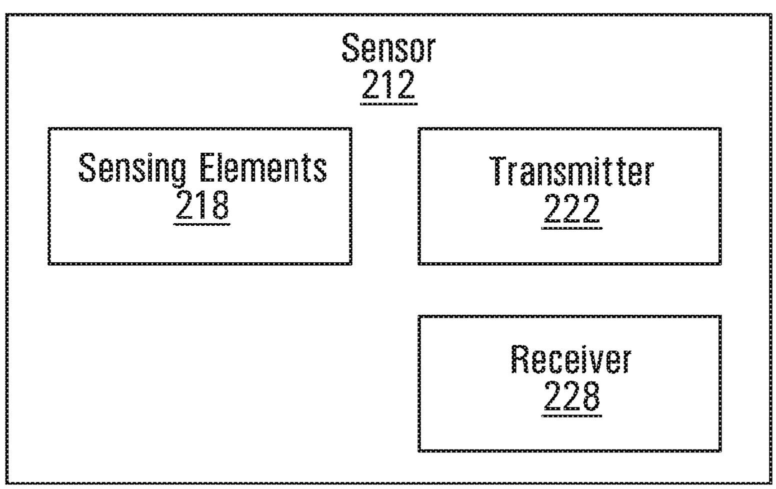
FIG. 72 shows an example of an embodiment of the sensor of the controller.

To that end, as shown in FIG. 72, the sensor 212 may comprise one or more sensing elements 218 to sense these one or more parameters relating to the track system 14. For example, in some embodiments, to sense the profile of the ground beneath the track system 14, a sensing element 252 may be a gyroscope; and to sense the compliance of the ground beneath the track system 14, a sensing element 252 may be an accelerometer.

In some embodiments, the sensor 212 may include sensor elements that are integral to the snowmobile 10. That is, the sensor 212 may include sensor elements that are standard sensor elements installed on the snowmobile 10 by its manufacturer. For example, the sensor 212 may include a speedometer of the snowmobile 10, a transmission state sensor of the snowmobile 10, and/or any other suitable sensor element of the snowmobile 10.

The sensor 212 is configured to communicate the parameter(s) it senses to the processing apparatus 214 via a link 220. To that end, the sensor 152 comprises a transmitter 222 for transmitting the parameter(s) relating to the track system 14 to the processing apparatus 214, which comprises a receiver 224 to receive the sensor signal from the sensor 212.

The transmitter 222 of the sensor 212 and the receiver 224 of the processing apparatus 154 may establish the link 220 between one another in any suitable way. In this embodiment, the link 220 is a wireless link such that the sensor 212 and the processing apparatus 214 are connected wirelessly. Thus, in this embodiment, the transmitter 222 of the sensor 212 is a wireless transmitter that can wirelessly transmit the sensor signal and the receiver 224 of the processing apparatus 214 is a wireless receiver that can wirelessly receive the sensor signal. For example, the transmitter 222 and the receiver 224 may implement radio-frequency identification (RFID) technology. In such an example, the transmitter 222 may be an RFID tag while the receiver 224 may be an RFID reader.

The sensor signal indicative of the parameter(s) of the track system 14 may be issued by the sensor 212 in any suitable manner.

In this embodiment, the sensor 212 is configured to issue the input signal indicative of the parameter(s) of the track system 14 to the processing apparatus 214 autonomously. For instance, the transmitter 222 of the sensor 212 may issue the input signal indicative of the parameter(s) of the track system 14 to the processing apparatus 214 repeatedly (e.g., periodically or at some other predetermined instants). This may allow a short response time for adjustment of the track-engaging assembly 24.

In other embodiments, the processing apparatus 214 may be configured to issue an interrogation signal directed to the sensor 212, which is configured to issue the sensor signal to the processing apparatus 214 in response to the interrogation signal. In such embodiments, the processing apparatus 214 may comprise a transmitter 226 to transmit the interrogation signal to the sensor 212, which comprises a receiver 228 to receive the interrogation signal. In this case, the transmitter 226 of the processing apparatus 214 is a wireless transmitter to wirelessly transmit the interrogation signal and the receiver 228 of the sensor 212 is a wireless receiver to wirelessly receive the interrogation signal. In some examples of implementation, the transmitter 222 and the receiver 228 of the sensor 212 may be implemented by a transceiver and/or the transmitter 226 and the receiver 224 of the processing apparatus 214 may be implemented by a transceiver.

The processing apparatus 214 is configured to issue the adjustment command relating to the adjustment of the track-engaging assembly 24 based on the sensor signal from the sensor 212 and possibly other input and/or information. More specifically, in this embodiment, the processing apparatus 214 issues the adjustment command in the form of a signal (e.g., an electrical signal) directed to the actuator 216 of the automatic adjustment system 215 to control the configuration of the track-engaging assembly 24 based on the sensed parameter(s) of the track system 14. In other embodiments, the adjustment command issued by the processing apparatus 214 may also be directed to an output device (e.g., a display) for outputting information regarding the configuration of the track-engaging assembly 24 to the user of the snowmobile 10.

In some embodiments, the processing apparatus 214 may process information from sources other than the sensor 212 to determine the adjustment command. For instance, in some embodiments, the processing apparatus 214 may process information from an engine control unit (ECU) of the snowmobile 10 to infer that an adjustment of the track-engaging assembly is desirable. In such embodiments, the adjustment command issued by the processing apparatus 214 is therefore unrelated to sensors monitoring parameters of the track system 14.

Figure 73:
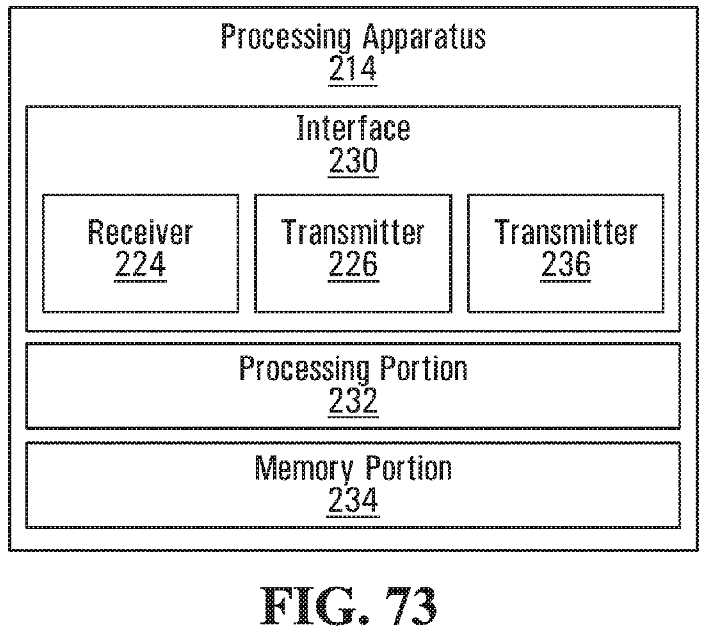
FIG. 73 shows an example of an embodiment of the processing apparatus of the controller.

In this embodiment, as shown in FIG. 73, the processing apparatus 214 comprises an interface 230, a processing portion 232, and a memory portion 234, which are implemented by suitable hardware and/or software.

The interface 230 comprises one or more inputs and outputs allowing the processing apparatus 214 to receive input signals from and send output signals to other components to which the processing apparatus 214 is connected (i.e., directly or indirectly connected). For example, in this embodiment, an input of the interface 230 is implemented by the wireless receiver 224 to receive the sensor signal from the sensor 212. An output of the interface 230 is implemented by a transmitter 236 to transmit the adjustment command to the actuator 216. In some embodiments, another output of the interface 230 is implemented by the wireless transmitter 226 to transmit the interrogation signal to the sensor 212.

The processing portion 232 comprises one or more processors for performing processing operations that implement functionality of the processing apparatus 214. A processor of the processing portion 232 may be a general-purpose processor executing program code stored in the memory portion 234. Alternatively, a processor of the processing portion 232 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 234 comprises one or more memories for storing program code executed by the processing portion 232 and/or data used during operation of the processing portion 232. A memory of the memory portion 234 may be a semiconductor medium (including, e.g., a solid-state memory), a magnetic storage medium, an optical storage medium, and/or any other suitable type of memory. A memory of the memory portion 234 may be read-only memory (ROM) and/or random-access memory (RAM), for example.

In some embodiments, the processing apparatus 214 may determine the adjustment command at least in part based on information contained in the memory portion 234. For instance, the memory portion 234 of the processing apparatus 214 may contain information associating different values of a parameter relating to the track system 14 and/or the snowmobile 10 with different values of a given parameter of the track-engaging assembly 24. For example, the memory portion 234 of the processing apparatus 214 may associate ranges of compliance of the ground beneath the track system 14 with a given configuration of the track-engaging assembly 24. Thus, upon receiving the sensor signal indicative of the compliance of the ground beneath the track system 14, the processing apparatus 214 may consult its memory portion 234 to associate the compliance of the ground beneath the track system 14 with a corresponding configuration of the track-engaging assembly 24. A similar approach may be undertaken for other sensed parameters of the track system 14 and/or the snowmobile 10.

In some embodiments, two or more elements of the processing apparatus 214 may be implemented by devices that are physically distinct from one another and may be connected to one another via a bus (e.g., one or more electrical conductors or any other suitable bus) or via a communication link which may be wired, wireless, or both.

In other embodiments, two or more elements of the processing apparatus 214 may be implemented by a single integrated device.

The processing apparatus 214 may be implemented in any other suitable way in other embodiments.

Figure 74:
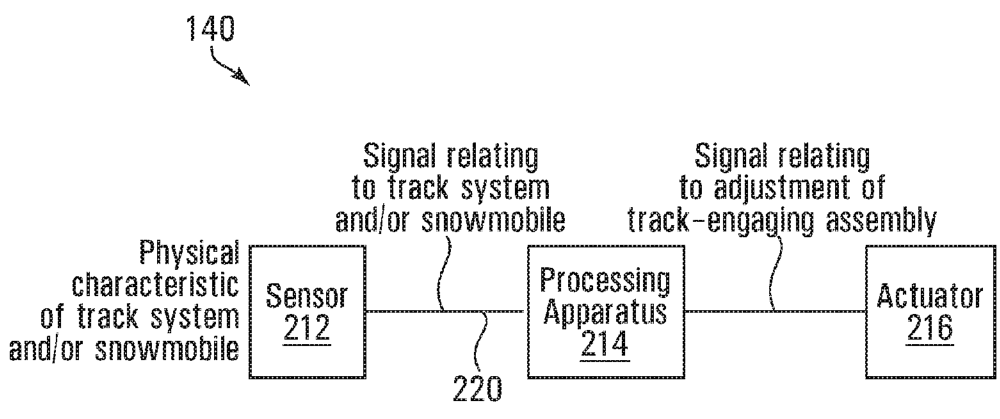
FIG. 74 shows a diagram depicting interactions between the sensor, the processing apparatus and an actuator of the adjustment mechanism.

The adjustment command that is issued by the processing apparatus 214 relates to the adjustment of the configuration of the track-engaging assembly 24. For instance, in this embodiment, with additional reference to FIG. 74, the adjustment command may cause the actuator 216 to increase and/or decrease the contact patch 59 of the track 21. For instance, the adjustment command is configured to cause the actuator 216 to change an angular orientation of the axle 202 of the rear idler wheels $26_1$, $26_2$ about the the pivot axis 198 based on one or more sensed parameters of the track system 14. For example, in this particular embodiment, the actuator 216 is configured to adjust the angular orientation of the axle 202 of the rear idler wheels $26_1$, $26_2$ about the pivot axis 198 based at least in part on the compliance of the ground beneath the track system 14. In some embodiments, the actuator 216 may alternatively or additionally adjust the angular orientation of the axle 202 about the pivot axis 198 based on the softness or hardness of the ground, on the slope or steepness of the ground, and/or any other suitable parameters relating to the track system 14.

More specifically, in this embodiment, as will be described in more detail below, the actuator 216 is configured to rotate the shaft 194 such as to cause the axle 202 of the rear idler wheels $26_1$, $26_2$ to rotate about the pivot axis 198.

The actuator 216 may be implemented in various ways. For instance, in this embodiment, the actuator 216 is an electromechanical actuator. In other embodiments, the actuator 216 may be any other suitable type of actuator such as a mechanical actuator or a fluidic actuator (e.g., a hydraulic or pneumatic actuator).

Figure 75:
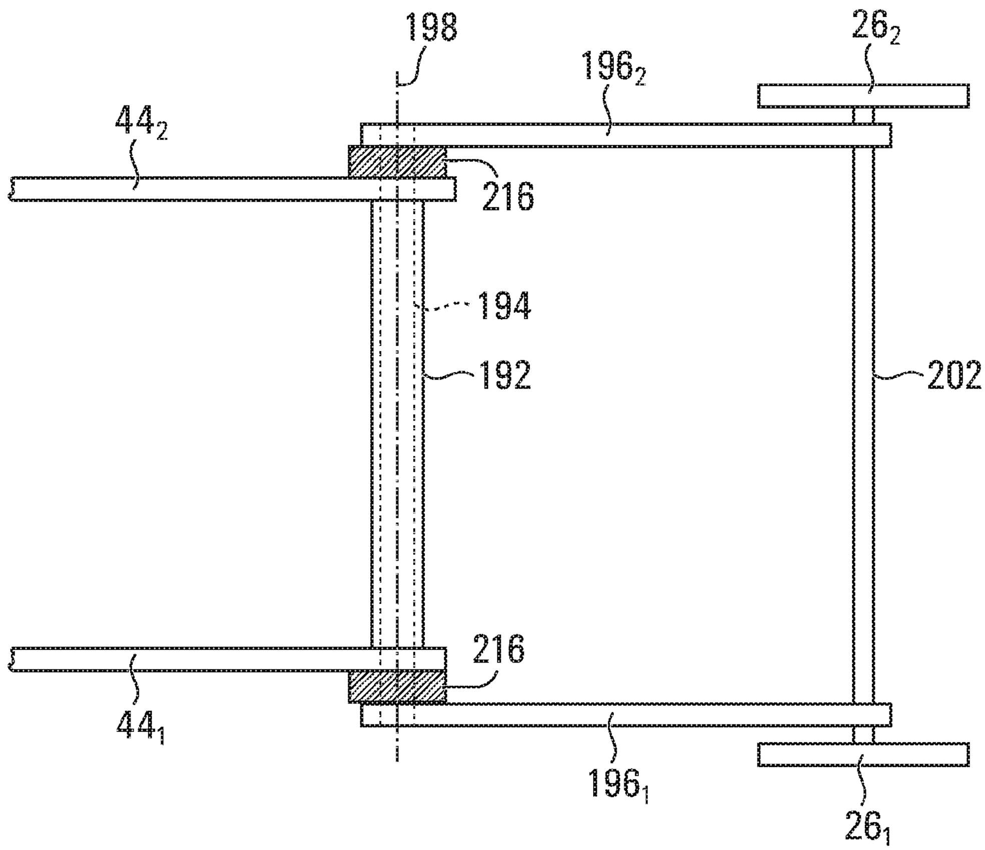
FIG. 75 shows an example of an embodiment of the actuator of the automatic adjustment system.

In this embodiment, as shown in FIG. 75, the actuator 216 is a rotary actuator that is capable of inducing rotary motion. The actuator 216 comprises a motor (not shown) that is responsive to the adjustment command transmitted by the processing apparatus 214.

The actuator 216 comprises a shaft-receiving aperture that is driven by the motor of the actuator 216. Such rotary actuators are well known in the art and their operation will thus not be further described here. The actuator 216 is mounted on the shaft 194 via its shaft-receiving aperture which can cause rotation of the shaft 194 about the pivot axis 198 of the tube 192. In this example, two actuators are used to rotate the shaft 194. In other examples, a single actuator may be used.

Thus, in use, the sensor 212 senses a parameter relating to the track system 14 and issues a signal indicative of the value of the parameter to the processing apparatus 214 which in turn processes the sensor signal to determine and issue the adjustment command to the actuator 216. In this embodiment, the adjustment command relates to the actuation of the shaft 194 to effect a displacement of the axle 202 which, as described above, modifies the configuration of the track-engaging assembly 24.

In this embodiment, the actuator 216 offers a continuous range of adjustment of the angular orientation of the rear idler wheels $26_1$, $26_2$ about the pivot axis 198. In other words, the rear idler wheels $26_1$, $26_2$ may occupy an infinite number of distinct angular positions within a range of displacement of the shaft 194. As such, the track-engaging assembly 24 may have one of an infinite number of different configurations in accordance to the position of the rear idler wheels $26_1$, $26_2$.

In a variant, the controller 250 may be part of the snowmobile 10 rather than the track system 14. For example, the controller 250 may be part of an ECU of the snowmobile 10 or may be part of any other controller of the snowmobile 10.

Figure 76:
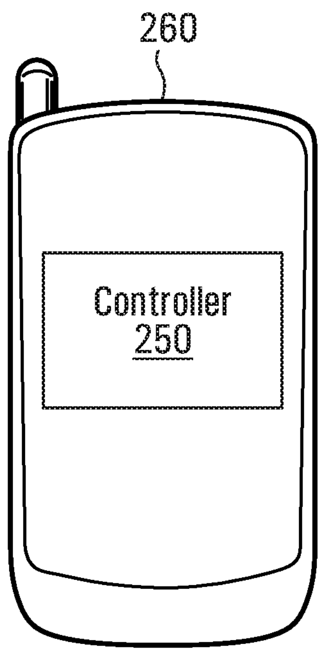
FIG. 76 shows an example of an embodiment in which the controller is part of a communication device.

In another variant, as shown in FIG. 76, the controller 250 may be part of a communication device 260 external to the snowmobile 10). Examples of embodiments of the communication device 260 include but are not limited to a smartphone, a personal digital assistant (PDA), a tablet, a smart watch, a computer, or any other suitable communication device. For instance, in this variant, the controller 250 of the communication device 260 may sense the speed of the snowmobile 10 based on GPS data relayed to the communication device 260. The processing apparatus 214 of the controller 250 may consequently determine the adjustment command based on the sensed profile of the ground (i.e., terrain roughness, unevenness) based on data provided by an accelerometer of the communication device 260. The processing apparatus 214 may consequently determine the adjustment command based on the accelerometer data and transmit the adjustment command to the actuator 216 to adjust the track-engaging assembly 24 accordingly.

8.2 Tool-based Adjustment

Figure 77:
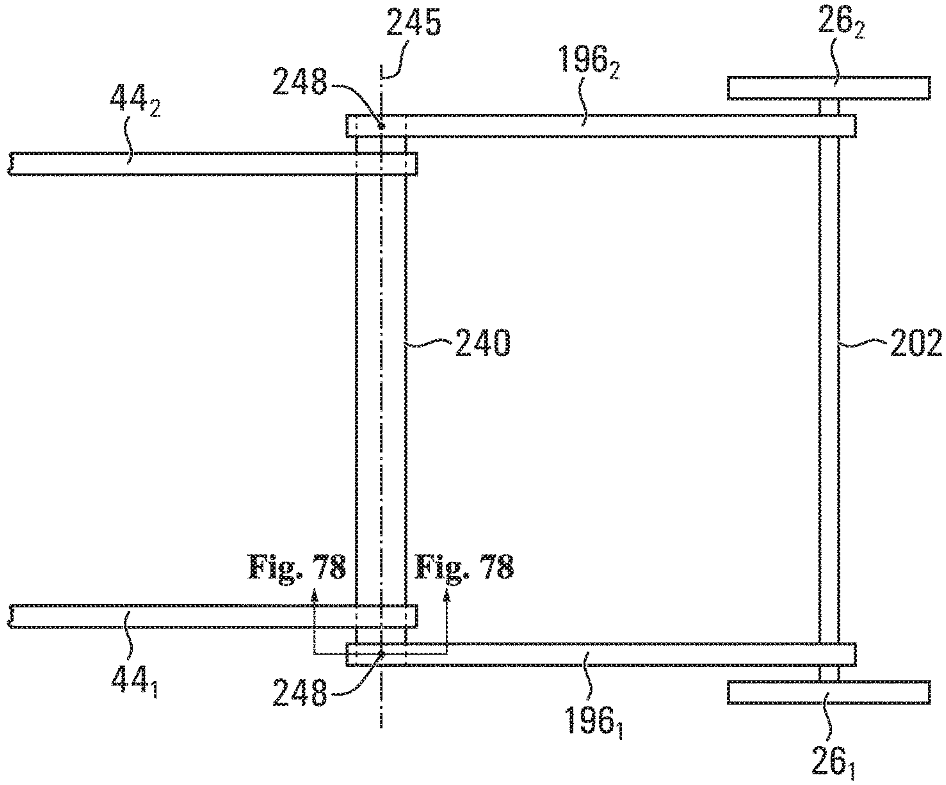
FIGS. 77 and 78 show an example of an embodiment in which the adjustment mechanism is configured to change the configuration of the track-engaging assembly using one or more tools.

In some embodiments, as shown in FIG. 77, the adjustment mechanism 140 may be configured to change the configuration of the track-engaging assembly 24 using one or more tools (e.g., wrench, screwdriver, etc.).

For instance, in some embodiments, the adjustment mechanism 140 may allow the operator of the snowmobile 10 to adjust the positioning of the linking members $196_1$, $196_2$ with a tool such as to modify the configuration of the track-engaging assembly 24.

For example, in such embodiments, the adjustment mechanism 140 may comprise a shaft 240 extending along a longitudinal axis 245 that is transversal to the rails $44_1$, $44_2$. The shaft 240 is connected to the rails $44_1$, $44_2$ (e.g., via a pressure fit) and comprises a plurality of fastening apertures 242 at its longitudinal end portions for securing the linking members $196_1$, $196_2$ to the shaft 240. Each linking member $196_i$ comprises an opening 244 (e.g., a hole) for receiving the shaft 240. Enough clearance may be provided between the opening 244 and the shaft 240 to allow the shaft to rotate within the opening 244. The linking member $196_i$ further comprises an aperture 246 extending from an outer periphery of the linking member $196_i$ to the inner periphery of the linking member $196_i$ defined by the opening 244.

Figure 78:
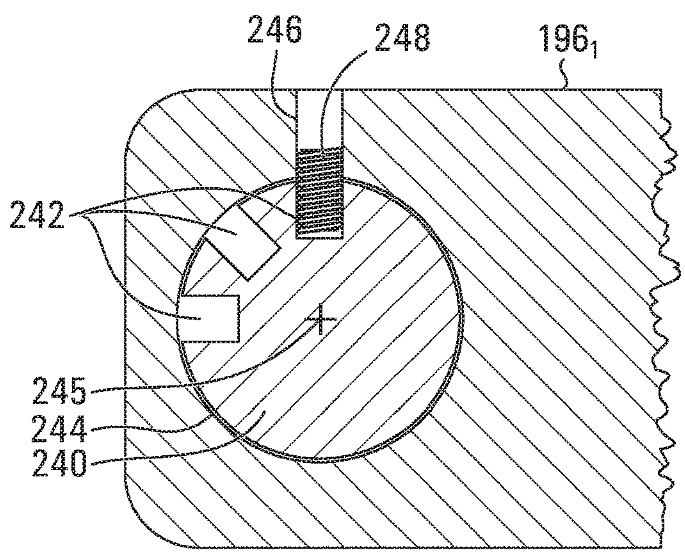

As shown in FIG. 78, when the aperture 246 of the linking member $196_i$ is aligned with one of the fastening apertures 242 of the shaft 240, a fastener 248 is inserted through the aperture 246 and into engagement with the aligned fastening aperture 242. In this example, the fastener 248 is a set screw and the fastening apertures 242 are threaded holes such that a tool (e.g., a screwdriver or a hex key) is used to drive the fastener into engagement with a respective one of the fastening apertures 242. Engaging the fastener 248 with a different fastening aperture 242 modifies the orientation of the linking member $196_i$. More particularly, the linking member $196_i$ is rotated about the longitudinal axis 245 (which may be referred to as a pivot axis) of the shaft 240. This causes the axle 202 and thus the rear idler wheels $26_1$, $26_2$ to rotate about the pivot axis 245 such as to change the configuration of the track-engaging assembly 24.

While in embodiments considered above the track system 14 is part of the snowmobile 10, a track system constructed according to principles discussed herein may be used as part of other off-road vehicles in other embodiments. For example, in some embodiments, a track system constructed according to principles discussed herein may be used as part of an all-terrain vehicle (ATV), as part of an agricultural vehicle (e.g., a tractor, a harvester, etc.), as part of a construction vehicle, forestry vehicle or other industrial vehicle, or as part of a military vehicle.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for traction of a vehicle, the track being movable around a track-engaging assembly comprising a drive wheel to drive the track, the track comprising:

a ground-engaging outer surface for engaging the ground and an inner surface opposite to the ground-engaging outer surface; and a plurality of traction projections projecting from the ground-engaging outer surface, each traction projection comprising a containment space to contain ground matter when the traction projection engages the ground, the containment space comprising a plurality of containment voids to contain respective portions of the ground matter.

2. The track of claim 1, wherein the traction projection is configured to compact the ground matter contained in containment space.

3. The track of claim 1, wherein the containment space of the traction projection is configured to scoop the ground matter.

4. The track of claim 1, wherein the traction projection comprises a plurality of propulsive protrusions and each of the containment voids of the traction projection is defined by a respective one of the propulsive protrusions.

5. The track of claim 4, wherein the propulsive protrusions of the traction projection are curved in a widthwise direction of the track to define the containment voids of the traction projection.

6. The track of claim 4, wherein the traction projection comprises a lateral stabilizer disposed between the propulsive protrusions in a widthwise direction of the track and larger than the propulsive protrusions in a longitudinal direction of the track.

7. The track of claim 4, wherein the traction projection comprises a strengthener configured to reinforce a given one of the propulsive protrusions.

8. The track of claim 7, wherein the strengthener is positioned such as to face away from the ground as the traction projection approaches the ground while the track moves around the track-engaging assembly when the vehicle travels forward.

9. The track of claim 7, wherein the strengthener is disposed on a side of the traction projection that is opposite to the containment space of the traction projection.

10. The track of claim 7, wherein the strengthener comprises an elongated rib extending in a thickness direction of the track.

11. The track of claim 10, wherein a height of the strengthener occupies at least a majority of a height of the traction projection.

12. The track of claim 7, wherein the strengthener is a first strengthener, the given one of the propulsive protrusions is a first one of the propulsive protrusions, and the traction projection comprises a second strengthener configured to reinforce a second one of the propulsive protrusions.

13. The track of claim 1, wherein the containment voids of the traction projection are distributed in a longitudinal direction of the traction projection.

14. The track of claim 1, wherein the containment space of the traction projection occupies at least a majority of a length of the traction projection.

15. The track of claim 14, wherein the containment space of the traction projection occupies at least 70% of the length of the traction projection.

16. The track of claim 14, wherein the containment space of the traction projection occupies at least 90% of the length of the traction projection.

17. The track of claim 14, wherein the containment space of the traction projection occupies substantially an entirety of the length of the traction projection.

18. The track of claim 1, wherein each containment void of the traction projection occupies at least 10% of a length of the traction projection.

19. The track of claim 1, wherein each containment void of the traction projection occupies at least 20% of a length of the traction projection.

20. The track of claim 1, wherein a ratio of an effective length of the traction projection defined by the containment space of the traction projection over a length of the traction projection is at least 1.1.

21. The track of claim 20, wherein the ratio of the effective length of the traction projection defined by the containment space of the traction projection over the length of the traction projection is at least 1.2.

22. The track of claim 20, wherein the ratio of the effective length of the traction projection defined by the containment space of the traction projection over the length of the traction projection is at least 1.3.

23. The track of claim 20, wherein the ratio of the effective length of the traction projection defined by the containment space of the traction projection over the length of the traction projection is at least 1.4.

24. The track of claim 1, wherein the containment space of the traction projection occupies at least a majority of a height of the traction projection.

25. The track of claim 24, wherein the containment space of the traction projection occupies at least 70% of the height of the traction projection.

26. The track of claim 24, wherein the containment space of the traction projection occupies at least 90% of the height of the traction projection.

27. The track of claim 24, wherein the containment space of the traction projection occupies substantially an entirety of the height of the traction projection.

28. The track of claim 1, wherein a ratio of a volume of the containment space of the traction projection over a length of the traction projection is at least 0.3 in3/in.

29. The track of claim 1, wherein a ratio of a volume of the containment space of the traction projection over a length of the traction projection is at least 0.5 in3/in.

30. The track of claim 1, wherein a ratio of a volume of the containment space of the traction projection over a length of the traction projection is at least 0.8 in3/in.

31. The track of claim 1, wherein a volume of the containment space of the traction projection is at least 0.8 in3.

32. The track of claim 1, wherein a volume of the containment space of the traction projection is at least 1 in3.

33. The track of claim 1, wherein a volume of the containment space of the traction projection is at least 1.2 in3.

34. The track of claim 1, wherein a volume of the containment space of the traction projection is at least 1.4 in3.

35. The track of claim 1, wherein a volume of a given one of the containment voids of the traction projection is least at least 10% of a volume of the containment space of the traction projection.

36. The track of claim 1, wherein a volume of a given one of the containment voids of the traction projection is least at least 15% of a volume of the containment space of the traction projection.

37. The track of claim 1, wherein a volume of a given one of the containment voids of the traction projection is least at least 20% of a volume of the containment space of the traction projection.

38. The track of claim 1, wherein the traction projection is curved in a widthwise direction of the track to define the containment space of the traction projection.

39. The track of claim 1, wherein the containment voids of the traction projection are U-shaped.

40. The track of claim 1, wherein the containment space of the traction projection is open facing the ground as the traction projection approaches the ground while the track moves around the track-engaging assembly when the vehicle travels forward.

41. The track of claim 1, wherein the traction projection tapers in a thickness direction of the track.

42. The track of claim 41, wherein a top portion of the traction projection is smaller in a longitudinal direction of the track than a bottom portion of the traction projection.

43. The track of claim 42, wherein a ratio of a dimension of the bottom portion of the traction projection in the longitudinal direction of the track over a dimension of the top portion of the traction projection in the longitudinal direction of the track is at least 1.1.

44. The track of claim 42, wherein a ratio of a dimension of the bottom portion of the traction projection in the longitudinal direction of the track over a dimension of the top portion of the traction projection in the longitudinal direction of the track is at least 1.5.

45. A track for traction of a vehicle, the track being movable around a track-engaging assembly comprising a drive wheel to drive the track, the track comprising:

a ground-engaging outer surface for engaging the ground and an inner surface opposite to the ground-engaging outer surface; and a plurality of traction projections projecting from the ground-engaging outer surface, each traction projection comprising a plurality of scooping portions that respectively comprise voids configured to scoop and compact ground matter when the traction projection engages the ground.

* * * * *